United States Patent [19]

Ackeret

[11] Patent Number: 4,647,117

[45] Date of Patent: Mar. 3, 1987

[54] CONTAINER FOR STORING RECORDING MEDIA THAT ARE SUBSTANTIALLY PLATE-LIKE

[76] Inventor: Peter Ackeret, Allmendstr. 18, CH-8700 Kusnacht, Switzerland

[21] Appl. No.: 645,057

[22] Filed: Aug. 28, 1984

[30] Foreign Application Priority Data

Aug. 29, 1983 [EP] European Pat. Off. ........ 83108481.9
Aug. 3, 1984 [DE] Fed. Rep. of Germany ....... 8423125

[51] Int. Cl.⁴ .............................................. G11B 33/02

[52] U.S. Cl. ........................................ 312/12; 312/16; 312/19; 211/40

[58] Field of Search ..................... 312/8, 9, 10, 12, 15, 312/18, 19, 216; 211/40

[56] References Cited

U.S. PATENT DOCUMENTS

| | | | |
|---|---|---|---|
| 1,127,091 | 2/1915 | Kingman | 312/19 |
| 1,366,427 | 1/1921 | Smith | 312/19 |
| 1,574,319 | 2/1926 | Vincent | 312/19 |
| 2,539,647 | 1/1951 | Williams | 312/19 |
| 3,275,158 | 9/1966 | Glass | 211/40 |
| 3,836,222 | 9/1974 | Kuntze | 312/10 |
| 4,399,913 | 8/1983 | Gelardi et al. | 312/10 |

FOREIGN PATENT DOCUMENTS

| | | | |
|---|---|---|---|
| 1131026 | 6/1962 | Fed. Rep. of Germany . | |
| 2307410 | 8/1974 | Fed. Rep. of Germany . | |
| 381705 | 9/1907 | France | 312/12 |
| 1113766 | 4/1956 | France . | |
| 396797 | 6/1933 | United Kingdom | 312/19 |
| 794216 | 4/1958 | United Kingdom . | |
| 1433859 | 4/1976 | United Kingdom | 312/12 |

*Primary Examiner*—Kenneth J. Dorner
*Assistant Examiner*—Gerald A. Anderson
*Attorney, Agent, or Firm*—Prutzman, Kalb, Chilton & Alix

[57] ABSTRACT

A container suitable for storing compact discs conveyed in motor vehicles comprises a housing from which the stored discs can be ejected by means of a single transporter associated with a plurality of discs. The transporter may be selectively coupled to only one disc holder. The transporter is preferably a slider member which is arranged to slide in the housing, can be locked in the housing against a spring bias and unlocked manually, and has a front wall to cover the open front of the housing when the slider member is inserted. The selector mechanism and the unlocking operation can be actuated from the outside of this front wall.

54 Claims, 101 Drawing Figures

200
202
204
206
208
210
212
214
216
222
224
226

162
160
166
164
172
170
168
9
175
176
1
2
3
4
5
6

174
1
2
3
4
5
6

177
178
178
178
178
1
2
3
4
5
6

18
13
13
250
252
254
260
262
264
266
268
270
272
274
276
278
280
282
284
286
288
290
292
294
296
298
300
302
304
306
308
310
314
332
334
336

17b
334
338
336
330
270
340
332
340

276
274
338
268
276
274
270
272
272
334
332

19
340
336
340
19
322
322
322
324
324
324

302
314
310
252
320
320
296
304
316
262
302
310
294
314
316
296
318
264
262
294
310
320
324
312
302
324
310
310
320
324
318
306
304
304
304
302
252
296
306
308

308
306

450
464
464
454
462

452
22
22
456
450
468
460
458
470
454
466
472

474
456
450
472
458
470
468
452
466
23
23
454
462
464
464
24

474
450
485
456
452
472
470
458
456
454
464
464
474
468
466
462

484
490
488
498

494
486
486
27b
27b
484
490
488
480
506
506
504
502
500
508
510
482
490
488
484

482
484
484
492
492
500
506
506
480
504
502
506
510

482
494
484
496
496
496
500
480
510

522
528
528
528
520
520
520
524

520
520
522
528
528
528
526
532
526
532
530'
530
524
530'
534

540
544
542
544

31
30
540

542
544

554
552
554
550
556

568
564
566

570
566
560
568
562
564

Fig. 34
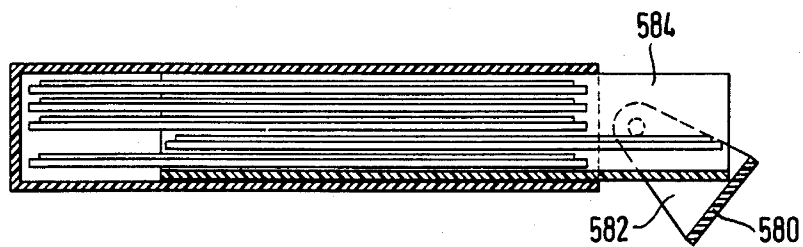
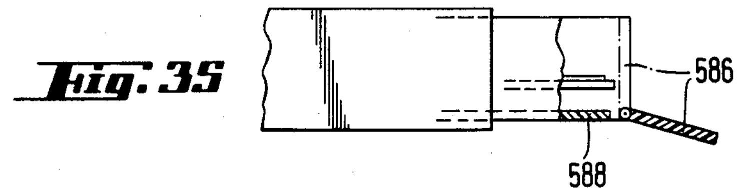
590
592
Fig. 36

600

630
632
634
636
638
640
642

382
380
402
396
390
394
400
x
x
390
396
392
394
390
366
398

366
400
384
382
384
386
398
396
402
394
392
388
380

345
400
394
382
384
366
396
408
392
380

404
354
386
382
366
384
408
380
388
388
410
409
390
392
386
400
412
396
384
47
x
406
x
47
390
416
394
390
402
388
414
402
384
386

702
730
700
728
724
700
726
732
734
706
722
712
710
738
708
736
718
716
720
704
704
714

730
702
700
700
728
738
734
732
712
712
736
708
710
706
722

730
702
728
728

752
756
764
762
754
758
760
756
756
752
752
764
754
764
754
762
762
754
750

752
752
756
764
(334)
754
762
764
(334)
762
752
756
754

782
780
774
782
780
774
780
778
782
780
776
770
774
778
778
778
774
772
776
786
786
784
784
786
784

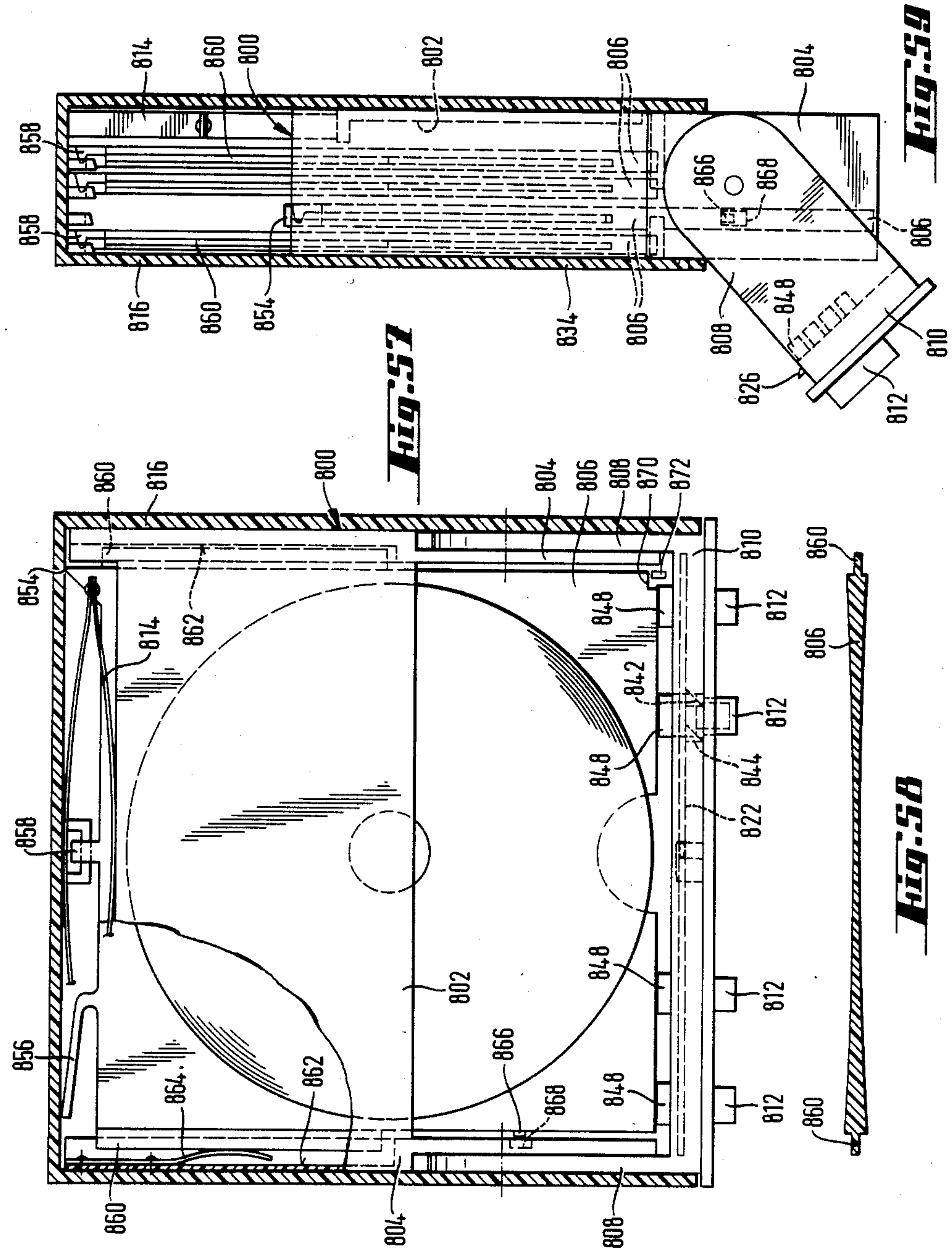

1008
1004
1006
1006
1004
1018
1002

1006
1018
1008
1006
1004
1004
1002
1020
1018
1014
1016
1012
1008
1010
1000
1024
1026
1004
1006
1004
1002
1022
1006
1004
1026
1006
1004
1002

1030
1032
1034
1036
1038
1040
1042
1044
1046
1048

1030
1034
1036
1036a
1038
1040
1042
1044
1046
1048
a 1030
1032
1034
1038

1066
1062
1060
1064
1085
1054
1052
1056
1050
69
1085
1060
1064
1062
1066

1066
1060
1062
1064
1085
1052
1050
1054
1085
1060
1064
1066
1062

1140
1142
1144
1146
1148
1150
1152
1154
1156
1158
1160

82
82
81
81
1218
1210
1234
1232
1230
1240
1240
1238
1236
1216
1222
1220
1224
1226
1212
1228

1304
1304
1322
1300
1334
1316
1306
1318
1320
1308
1338
1302
1310
1314
1328
1336
1330

1302
1322
1324
1326
86
86
1332
1300
1304
1328
1310
1304
1312
1314
1336
1330

1300
1302
1324
1312
1314
1310

1334
1326
1332
1332
1302
1322
1300
1338
1314
1328
1336
1330

88
88
1352
1346
1348
1350
1340
1344
1342

1352
1346

1352
1348
1346
1350
1340
1344
1342

1376
1378
1364
1370
1374
1366
1372
1360
1362
1369
1368
92
91

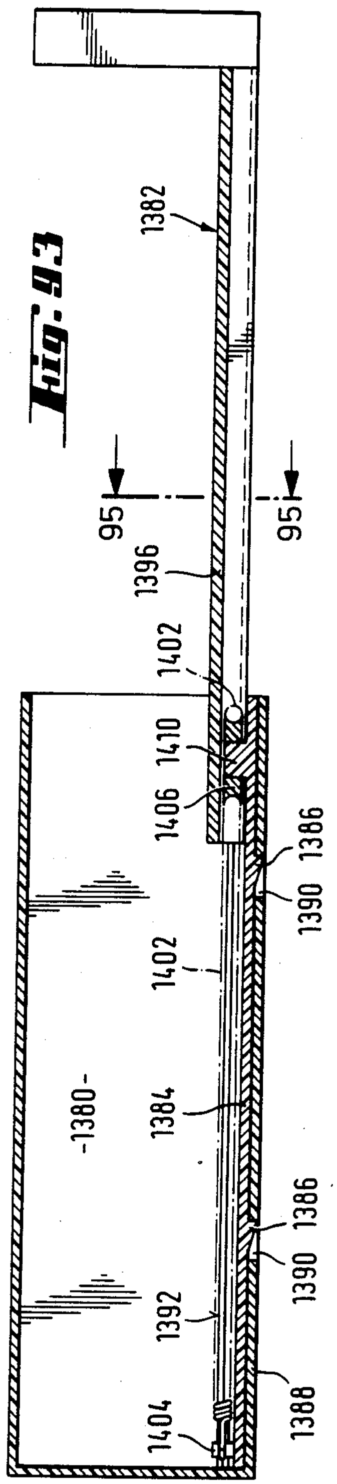
Fig. 93
1382
95
95
1396
1402
1410
1406
1386
1390
1402
1380
1384
1386
1390
1392
1388
1404
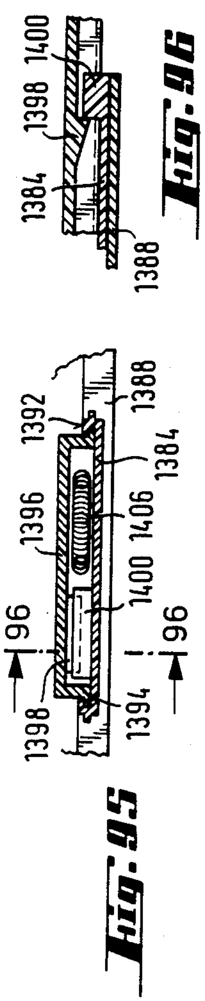
Fig. 96
1400
1398
1384
1388
Fig. 95
1392
1388
1384
1396
1406
1400
96
96
1398
1394
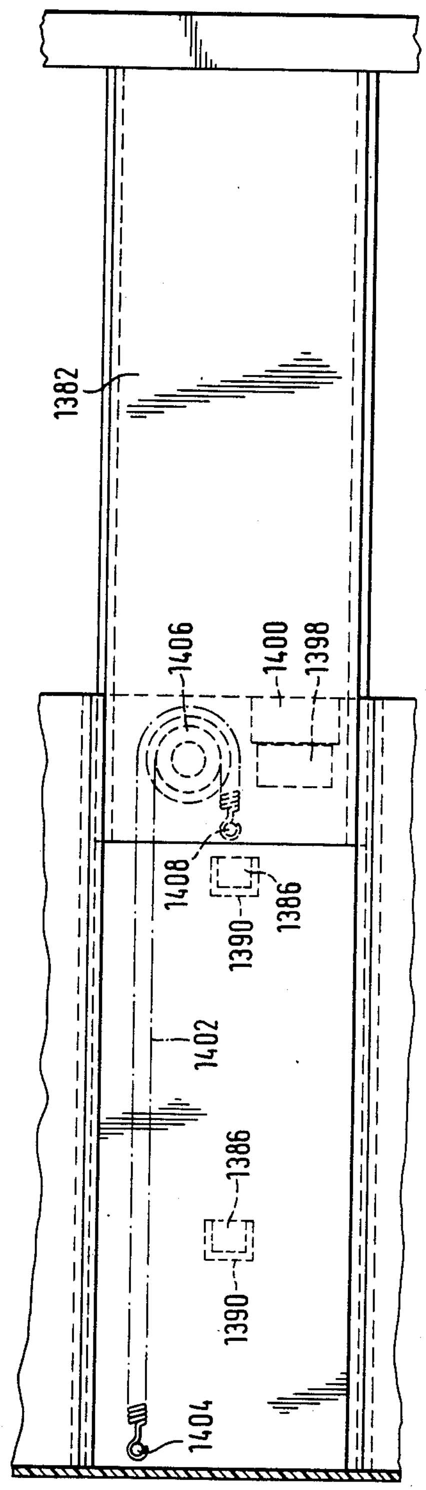
Fig. 94
1382
1406
1400
1398
1408
1386
1390
1402
1386
1390
1404

1436
1434
1432
1434
1420
1430
1428
1428
1426
1440
1422
1438
1426

1426
1432
1424
1430
1422
1420
1440
1428
1422
1432
1426
1434
1432
1436
1430
1434
98
98
1426
1428
1426
1422
-1420-
1440
1438

CONTAINER FOR STORING RECORDING MEDIA THAT ARE SUBSTANTIALLY PLATE-LIKE

BACKGROUND OF THE INVENTION (1) Field of the Invention

The present invention relates to containers for use in the storage of disc-shaped recording media and particularly to magazines for storing multiple discs wherein selected individual discs may be ejected from the magazine. More specifically, this invention is directed to the storage of plate-like, i.e., flat, recording media and especially to the selection and retrieval of individual of such media from a magazine in which plural media are stored. Accordingly, the general objects of the present invention are to provide novel and improved apparatus and methods of such character.

(2) Description of the Prior Art

Apparatus for the storage of plural record media is known in the art. In its most common form, such prior art apparatus is designed to hold, and to present for use upon selection, standard magnetic tape cassettes. The apparatus of the prior art includes a housing, having an access opening at one side thereof, and plural slider members on which the stored cassettes are supported. The slider members are guided for movement relative to the housing between an inserted or storage position and an ejected or cassette removal position. The slider members will be locked in the storage position and the selection process comprises unlocking an individual slider so that the cassette supported thereon is presented at least partly outside of the housing for removal from the slider and subsequent use. The prior art cassette storage apparatus is characterized by convenient operation resulting, in part, from the location of the means for achieving the unlocking of the slider members on the front face of the apparatus.

A container or magazine of the type briefly and generally described above would be desirable for other types of recording media, for example records or video discs, and especially for so-called "compact" discs which are laser scannable discettes or other magnetic discs. Recording media such as compact discs and discettes are very thin in relation to their diameters. If the approach to cassette storage is implemented in the storage of such thin discs, whereby each disc would be associated with a separate slider member, the storage apparatus would be characterized by a high degree of volumetric inefficiency. On the other hand, any attempt to reduce the thickness of the prior art storage containers would render such apparatus difficult to operate and contribute to instability.

SUMMARY OF THE INVENTION

The present invention overcomes the above-briefly discussed and other deficiencies and disadvantages of the prior art by providing a novel and improved storage technique and apparatus which is particularly well-suited for use in the storage of thin plate-like recording media such as compact discs and discettes. Apparatus in accordance with the present invention is characterized by convenient operation, stable construction and a high degree of utilization of the available space in the housing of the apparatus. Apparatus in accordance with the present invention is also capable of comparatively low cost manufacture since it is formed from injection moulded plastic parts.

Apparatus in accordance with the present invention comprises a housing which is open on a front side and a transporter for conveying the stored recording media from the storage position within the housing to a removal position wherein the recording media are at least partly extended from the housing. A plurality of carrier members, which receive individual compact discs or other flat recording media, are arranged in a stack in the housing and the apparatus includes a selector system by means of which a single disc may be conveyed into the removal position by means of the transporter.

The present invention makes it possible to accommodate compact discs or other flat recording media in a very dense stack in the housing while maintaining the ease of operation which characterizes the prior art devices for storing magnetic tape cassettes. Thus, in accordance with the invention each individual disc which is ejected from the housing can easily be removed from and returned to its carrier member. This ease of use is of particular importance if the recording media storage apparatus is to be carried in a motor vehicle where it must be capable of being operated with one hand and without prolonged visual contact by the vehicle operator.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 34 is a cross-sectional side elevation view of another embodiment of the present invention;

FIG. 35 is a partial side elevation view, partly in section, of another embodiment of the present invention;

FIG. 36 is a cross-sectional side elevation view of another embodiment of the present invention;

FIGS. 55–59 show a further embodiment of the present invention, FIG. 55 being a schematic perspective view, FIG. 56 being a partial exploded view; FIG. 57 being a cross-sectional top plan view; FIG. 58 being a side elevation view of a disc holder, and FIG. 59 being a cross sectional side elevation view;

FIGS. 93–96 show yet another transporter guide arrangement for use in the present invention.

DESCRIPTION OF THE DISCLOSED EMBODIMENTS

While not limited thereto in its utility, the present invention is particularly well-suited for use in the storage of "compact", i.e., laser scannable, discs. Thus, in the descriptions below of the various embodiments which have been disclosed reference will be made primarily to such compact discs. Those skilled in the art will recognize that the present invention is suitable for use in the storage of other flat, i.e., "plate-like," recording media. The recording media will hereinafter be referred to merely as a "disc".

Figures 1, 2:
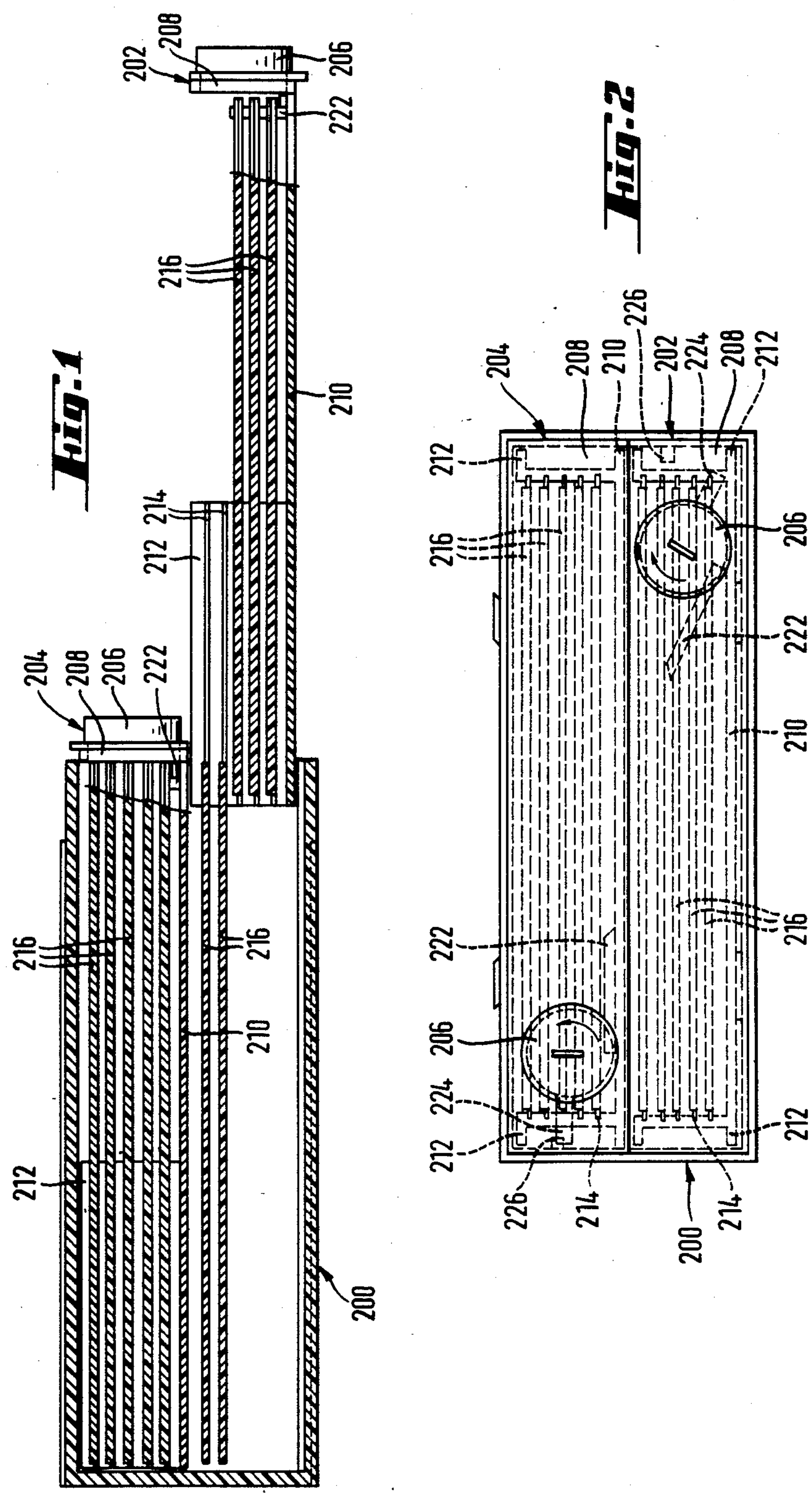
FIG. 1 is a cross-sectional side elevation view of apparatus in accordance with a first embodiment of the invention, the apparatus of FIG. 1 including two slider or transporter members.
FIG. 2 is a schematic front elevation view of the apparatus of FIG. 1.
Figure 3:
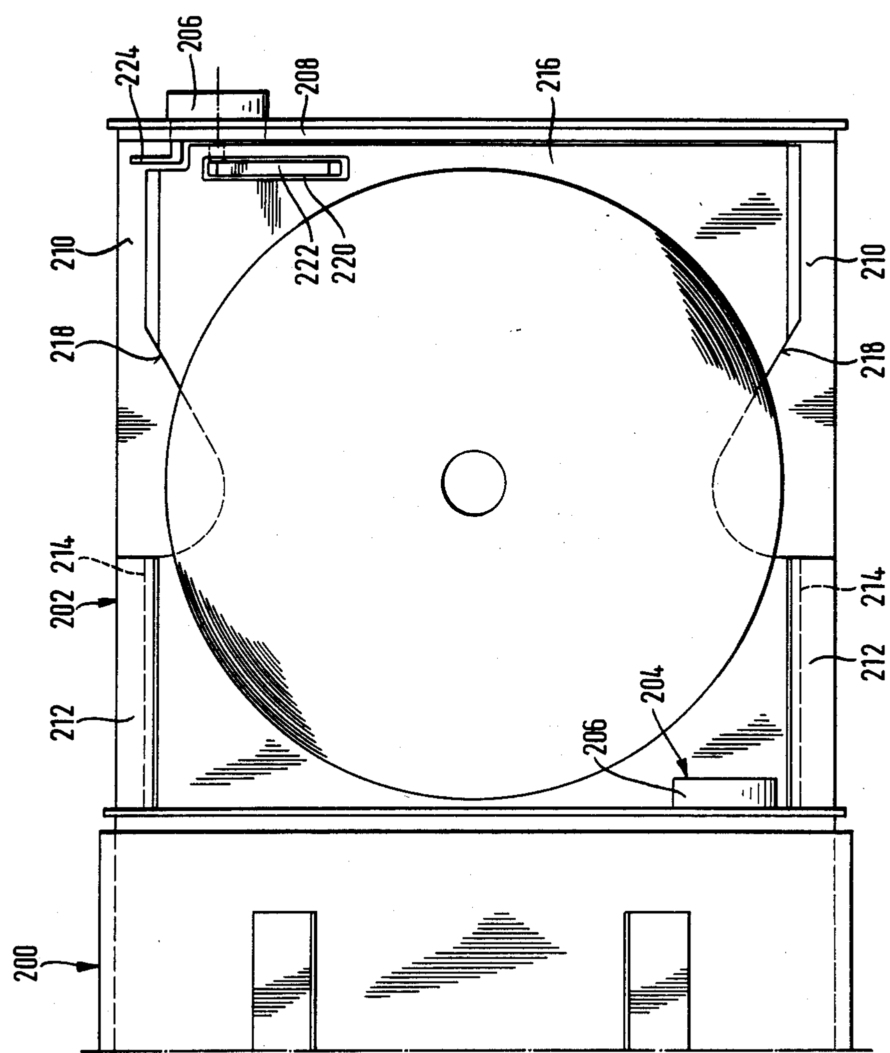
FIG. 3 is a top plan view of one of the record media carrier members of the embodiment of FIGS. 1 and 2.

In accordance with a first embodiment of the present invention, as shown in FIGS. 1–3, each one of a plurality of stored discs is supported on its own carrier. When the user desires to retreive a disc, the "stack" of carriers is separated in such a manner that upon opening, i.e., upon ejection, the selected carrier member will be positioned at the top of a group of carrier members which are transported from the storage position to the exterior of the housing. The implementation of a second possibility, wherein only the carrier commensurate with a selected disc will be ejected from the housing with the transporter, is implemented by various of the other disclosed embodiments.

Referring now jointly to FIGS. 1–3, a box-like or cuboid housing, having an open side, is indicated generally at 200. A pair of transport slider members, respectively indicated generally at 202 and 204, are mounted for movement relative to housing 200 between an inserted or storage position, shown for slider 204, and an ejected or disc removal position which has been shown for slider 202. In order to facilitate understanding of the invention, the ejection springs, stops, guides, locking mechanism, etc. which are supported on the housing and the slider members have not been shown in detail.

In the interest of facilitating use of the disc storage and retrieval apparatus of FIGS. 1–3, selector knobs 206 are rotatably supported on the slider members. Knobs 206 ar offset from one another with the selector knob on slider 202 being at the right side thereof and rotating clockwise and the selector knob on slider 204 being located at the left side thereof and being rotated counter-clockwise. The operation of the selector mechanisms on the two sliders is, however, substantially identical and will be described in detail below.

Each slider member comprises a bottom plate 210 and a pair of oppositely disposed side members 212, the side members 212 extending forwardly from the trailing end of the slider in the direction of movement during an ejection stroke and terminating short of the leading end or front of the slider. The side members of the slider members and the individual disc carriers or holders 216 are slidably coupled to one another, for example by a tongue and groove arrangement. In the manner to be described below, the disc holders 216 may either move with an associated slider member or remain supported in the housing 200 when the associated slider member is ejected. The disc-holders 216 are of platter-like construction and are provided with lateral access openings 218 (FIG. 3) so that the user can grasp a disc lying on a holder and lift it upwardly for purposes of removal from the storage system. The means by which the non-selected holders 216 are supported within the housing upon ejection of the associated slider member will be described below in the discussion of the embodiment of FIG. 10.

Each of disc holders 216 has, adjacent the end which is disposed nearest to the front or leading edge of the slider member, a slot 220 which extends in a direction which is parallel to the front of the slider member. A selector arm 222 extends in a direction which is generally tangential with respect to an extension of the diameter of each of the selector knobs 206, the selector arms 222 being disposed rearwardly with respect to the fronts of the slider members. The selector arms 222 have a rest position, to which they may be spring biased, wherein they lie flush with the bottom plate 210 of the slider member. This rest position is shown on FIG. 2 for slider member 204. It is also possible that, in the rest position, the selector arm 222 may engage the lowest disc holder 216, i.e., the holder closest to the bottom plate 210. Upon rotation of the selector knob 206 the arm 222 will engage the disc holders 216 by entering the slots 220, the number of disc holders engaged being a function of the degree of rotation of the selector knob.

It is to be noted that the individual disc holders 216 may be of identical construction, i.e., the disc holders may be provided with slots 220 on both sides so that, in a two-slider member arrangement as shown in FIG. 1, the same disc holders may be used in both the upper and lower housing compartments.

With the selector knob 206 in the "rest" position, a catch 224 operated thereby engages a locking projection 226 on the housing and thus locks the slider member against movement. The slider member may be unlocked by pushing it inwardly with the selector knob in the rest position whereupon the catch 224 will spring outwardly. In order to insure locking, and thus prevent undesired ejection of a slider member, the selector knobs may be biased to the "rest" positions by means of torsion springs. When the user rotates the slector knob out of the rest position into any actuating position, the slider member will be unlocked and one or more of the disc holders 216 will travel out of the housing with the slider member, the selected disc being that which is carried by the most upwardly positioned of the ejected disc holders. When the ejection stroke is complete, if the user releases the selector knob, the knob will return to its rest position. When the slider is pushed into the housing during reinsertion the front wall thereof will push all of the disc holders which have been ejected with the slider back into the housing.

As may be seen from FIG. 2, each selector knob may be provided with a key operated lock, keyhole apertures thus being provided. If lock cylinders are provided in the selector knobs 206, only the key-holder will have access to the stored discs.

FIGS. 4–9 diagramatically depict various selector mechanisms which may be used as alternatives to the arrangement described above. Employing the techniques of FIGS. 4–9 the user can select, for ejection from the housing, a single disc holder. Thus, in accordance with the embodiments of FIGS. 4–9, the selector mechanism couples a single disc holder to the slider (transporter) member.

Figures 4, 5, 6, 9:
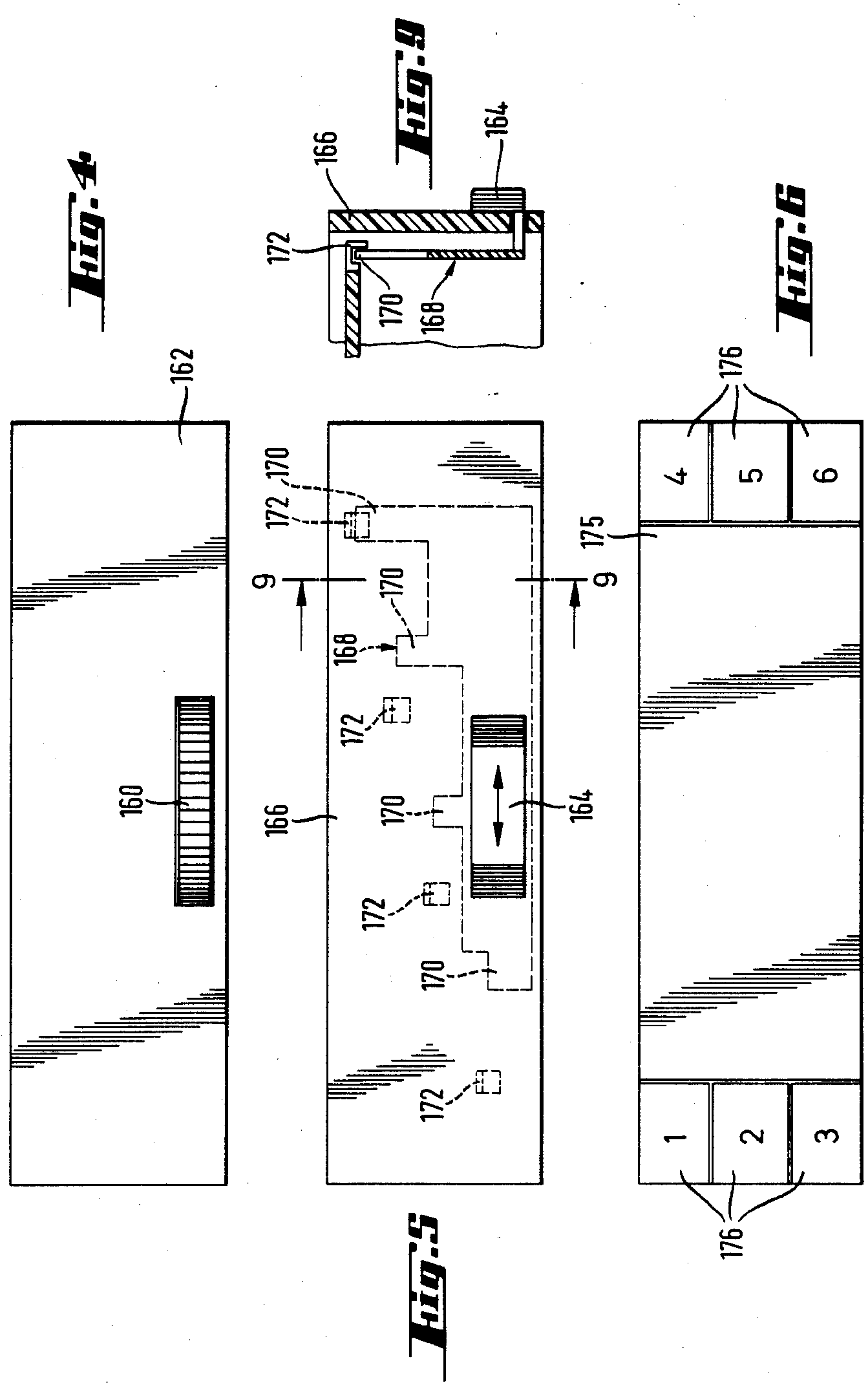
FIGS. 4–8 are schematic front elevation views of further embodiments of the present invention.
FIG. 9 is a partial cross-sectional side elevation view of apparatus in accordance with the embodiment of FIG. 5.

In the embodiment of FIG. 4 a knurled knob 160 functions as a the control for the selector member. The knob 160 is mounted such that a segment thereof projects beyond the front plate 162 of the slider member. The knob 160 may be employed to translate a selector of the type which will be described below in the discussion of FIG. 5.

FIGS. 5 and 9 show an embodiment in which the selector mechanism comprises a slidable selector button 164 having four locking positions, each position being associated with a different one of four disc holders. The selector button 164 is movable in a transverse direction with respect to the direction of motion of the associated slider member and, on the inside of the front wall 166 of the slider member, selector button 164 is coupled to a translatable locking bar 168. Bar 168 is configured, as shown in phantom in FIG. 5, so that a projection 170 may be positioned behind a "claw" 172 provided on each of the disc holders, the claws 172 being laterally staggered as shown.

In the embodiment of FIG. 6 the slider member front plate 175 supports six push-button-type actuators 176. The buttons 176 are arranged, in two rows, adjacent the outside edges of front plate 175. Each of the push-buttons 176 operates a coupling mechanism, for example of the projection/claw-type discussed above with respect to FIG. 5, so that a mechanical connection may be established between the slider member front plate and a desired disc holder.

Figure 7:
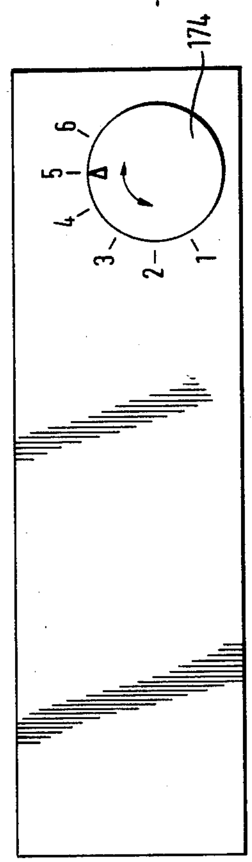

In the embodiment of FIG. 7 the selection of a disc holder is effected through the use of a rotary knob 174 which has a locking position for each holder. The knob 174 may operate a selector mechanism of the general type described in the discussion of FIG. 5.

Figure 8:
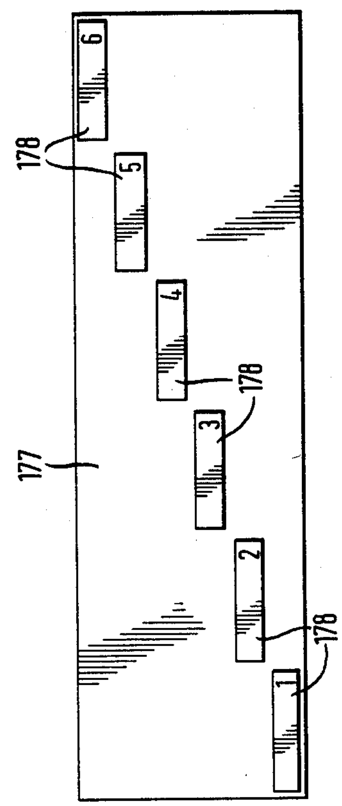

In the FIG. 8 arrangement the front plate 177 of the slider member carries selector buttons 178 which may operate in the same manner as the selector buttons of the embodiment of FIG. 6.

Referring to FIGS. 10–20, a preferred embodiment of the present invention will now be described. It is initially to be noted that the selector button arrangement in the embodiment of FIGS. 10–20 may be as depicted in FIG. 8 or, conversely, the actual selection mechanism of the embodiments of FIGS. 6 and 8 may be of the type to be described in the discussion of FIGS. 10–20. If push button type selectors are to be used, such selectors will be spring loaded in such a manner that the selector button can be fully depressed before the associated slider member is itself moved.

The embodiment of FIGS. 10–20 comprises a housing, indicated generally at 250, in which a pair of transporters or slider members, indicated generally at 252, are supported for movement. As may be seen from FIG. 13, a pair of guide rails 254 are provided in housing 250 for each of the slider members 252. The guide rails 254 are mounted so that they are capable of movement, in the direction of slider member travel, relative to housing 252. The guide rails 254 can be extended by approximately half their length with the limits of travel being determined by means of mechanical stops, not shown. The slider members have side plates 260 with outwardly extending flanges or projections, as may be seen from FIG. 13, which slidably couple the slider members to both the movable guide rails 254 and the housing 250. The slider members can move relative to the guide rails along a path length which is approximately equal to that of the guide rails. Accordingly, a telescopic arrangement is provided which allows the slider members 252 to be extended from the housing by almost their entire depth while being guided and supported. The slider members 252 are biased to the open or ejected position by means of springs 256 and 258, a pair of springs being provided on each side of each slider member. The springs 256 bias the slider members in the forward direction relative to the guide rails 254 while the springs 258 bias the guide rails 254 in the forward direction relative to housing 250. The slider member side plates 260 extend forwardly from the end of the slider members which faces the rear wall 282 of housing 250. The side plates 260 are shorter than one half the depth of housing 250. The side plates 260 of each of the slider members 252 are connected to one another, and to the slider member front wall 262, by means of a base plate 266.

Figures 10, 11, 12:
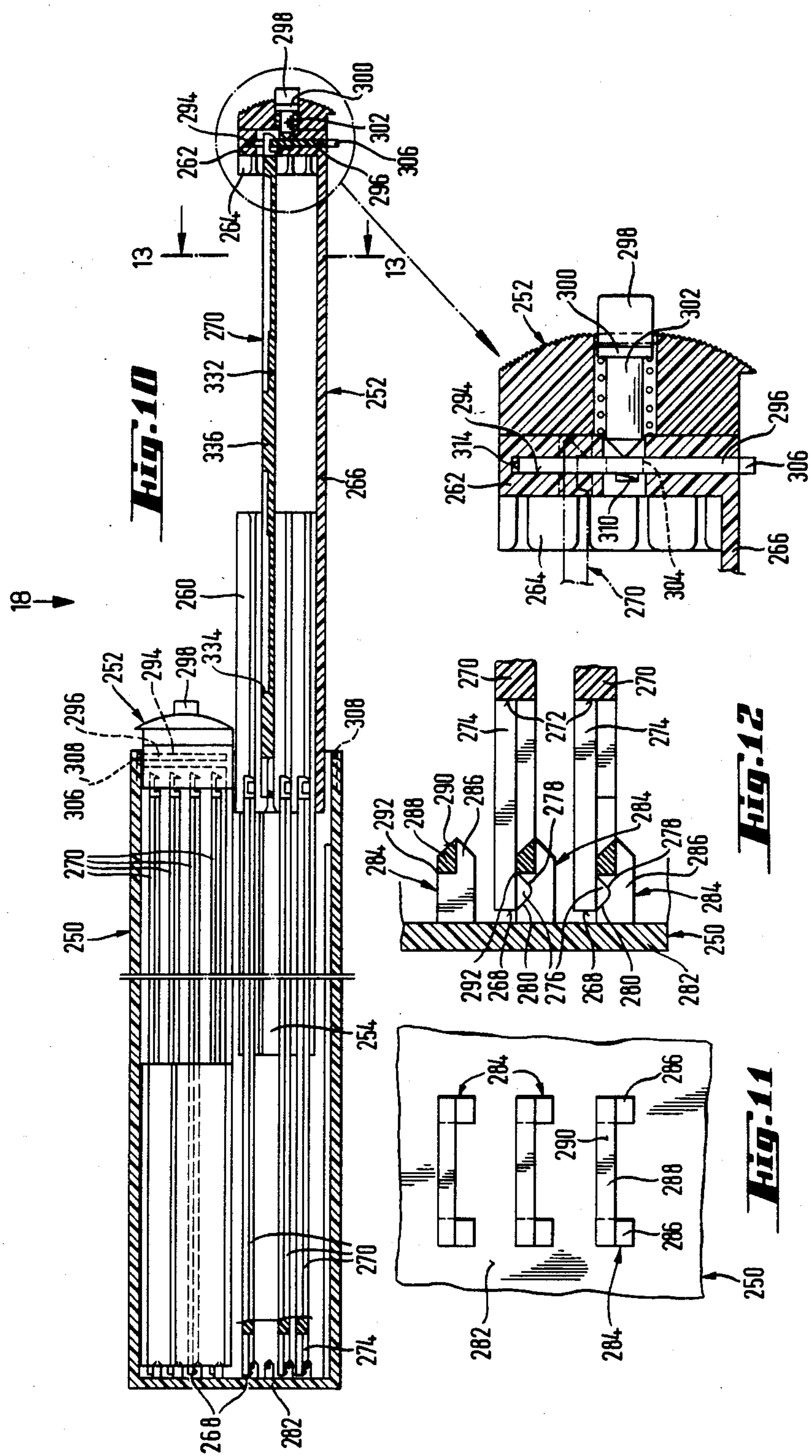
FIG. 10 is a schematic cross-sectional side elevation view of flat recording media storage apparatus in accordance with yet another embodiment of the present invention, the selector mechanism being shown further in an enlarged cross-sectional view.
FIG. 11 is a partial plan view, taken from the inside of the apparatus, of the rear wall of the housing of the apparatus depicted in FIG. 10.
FIG. 12 is a cross-sectional side elevation view of that portion of the apparatus of FIG. 10 which is shown in FIG. 11, FIG. 12 also showing portions of the recording media holders.
Figure 15:
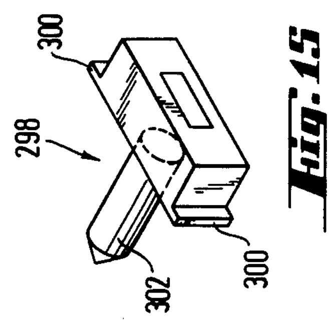
FIG. 15 is a perspective view of a selector button for use in the embodiment of FIGS. 10–13.
Figure 16:
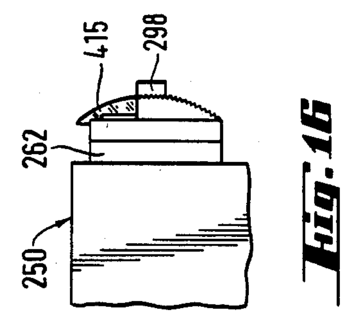
FIG. 16 is a partial side elevation view of the apparatus as shown in FIG. 14.

The side plates 260 of the slider members are provided with slide guides, for example pairs of parallel grooves, which receive parallel ribs which extend outwardly from disc holders 270. The disc holders are, accordingly, supported within housing 250 for movement relative to the housing with their associated slider member. In the manner which will be described below, the disc holders 270 are also movable relative to each other i.e., as shown in FIG. 10 a selected disc holder may be ejected from housing 250 along with a slider member 252 while the other holders remain in the housing.

The operation of the disc storage system of FIGS. 10–20 relies upon the fact that the individual disc holders 270 are frictionally held in housing 250 with a force which is less than the force of the bias which will act on a slider member when it is pushed in the insertion direction, i.e., toward the rear wall 282 of housing 250, and the pairs of traction springs 256, 258 accordingly tensioned. In order to select a particular disc holder 270 for ejection, its associated slider member 252 will be coupled to that holder and the holder will subsequently be withdrawn from the housing as the slider member moves forward under the influence of the biasing springs.

The manner in which the individual disc holders 270 are frictionally coupled to and supported in housing 250 will now be explained. Each of holders 270 has, on its inwardly disposed edge 268, two pair of closely spaced, inwardly extending slots 272. As may be seen from FIG. 17*b*, the slots 272 define, therebetween, leaf-type springs 274 which can be deflected upwardly out of the plane of the holder. The leaf-springs 274 are provided, at their free ends, with lugs 276. The lugs 276 are each provided with an anchoring surface 278 and a deflection surface 280 (see FIG. 12). Capture members, indicated generally at 284, are integral with the rear wall 282 of the housing and each include a pair of arms 286 and a cross piece 288. The cross piece 288 has an oblique deflection surface 290 and a locking edge 292. When a holder 270 is inserted in the housing the lugs 276 on the springs 274 will be deflected by the oblique deflection surfaces 290 of the capture members and, subsequently, the anchoring surfaces 278 of the lugs 276 will engage the locking edges 292 on the cross pieces 288 of the capture members 284. The shape of the lugs 276, however, is such that the above-mentioned spring bias which acts upon a pushed-in holder is sufficient to free the holder from its anchorage, the leaf-springs 274 with the lugs 276 being deflected upwardly to cause the lugs to pass over the cross pieces 288. Those disc holders 270 which are not coupled to the slider when it is ejected will remain stationary as the slider moves and will be supported at one end by the slider and at the other end by the cooperation between the leaf springs 274 and the capture members 284.

The front wall 262 of each of slider members 252 is provided with a slot 294 which extends inwardly from one of the horizontal edges of the front wall. In the embodiment of FIGS. 10–20 the slot 294 in the lower of the slider members extends from the bottom of the front wall while in the case of the upper slider member the slot extends downwardly from the top of the front wall. As may be seen from FIG. 18, the slots 294 extend across the major portion of the width of the front walls of the slider members. The slots 294 serve as slide guides for slide-type selectors 296. Selector buttons 298, which can be pushed inwardly against a spring bias, are provided in the slider member front walls 262. As may be seen from the enlargement portion which constitutes part of FIG. 10, the selector buttons 298 have stops 300 and are coupled to control pins 302 which, at their inwardly disposed ends, are of conical shape.

Figures 17A, 17B, 19, 20:
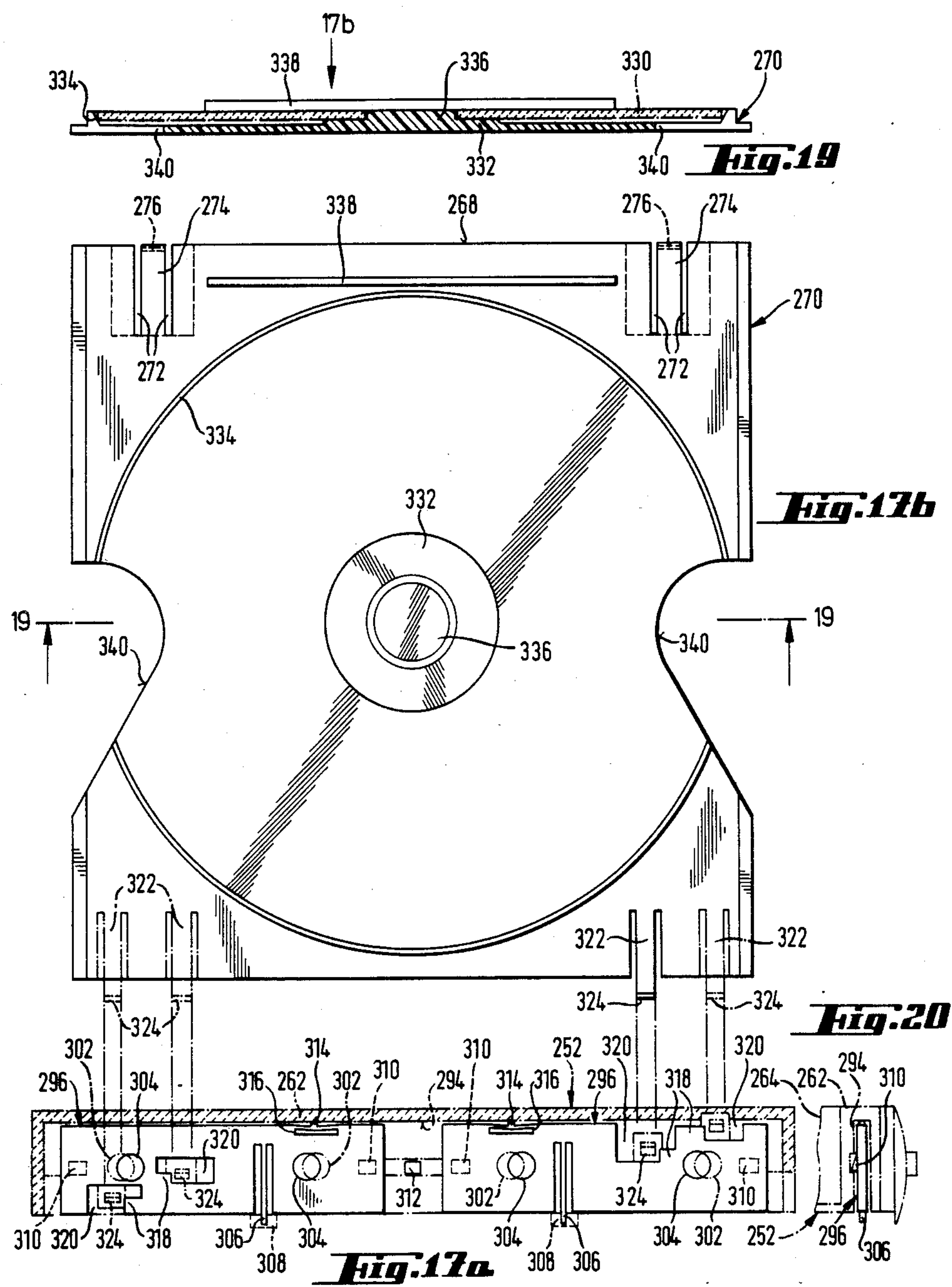
FIGS. 17*a* and 17*b* are schematic views which explain the operation of a recording media selection system for use in the present invention.
FIG. 19 is an enlarged cross-sectional view of one of the recording media carriers of the embodiment of FIG. 10.
FIG. 20 is a partial diagramatic view which illustrates the assembly of a selector slider in accordance with the present invention.

The unactuated positions of control pins 302 are indicated schematically, by means of broken lines, in FIG. 17*a*. The selector sliders 296 are provided with round holes 304 for the control pins 302. The axes of the holes 304 are laterally offset with respect to the axes of the pins 302. Actuation of the control buttons 298 will establish general alignment between the axes of pins 302 and holes 304. A return spring 306 is mounted on each of the selector sliders 296. The springs 306 normally hold the sliders in a position where they are not in axial alignment with any of the pins 302. The free ends of the springs 306 which project beyond the edge of the front wall 262 are engaged in a recess 308 in the base of the housing. The recesses 308 extend, in the form of slots, rearwardly from the front wall of the housing.

Figure 18:
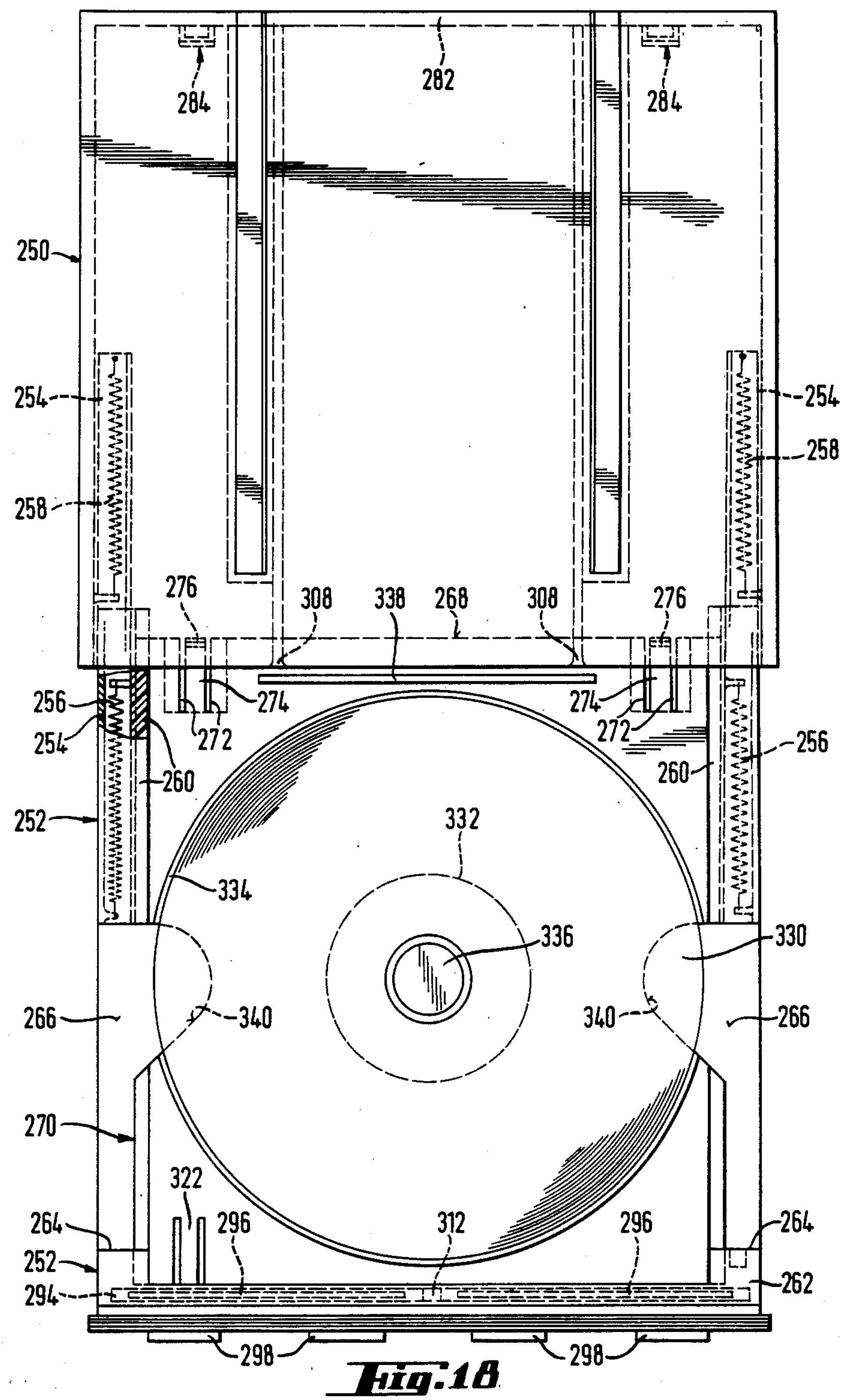
FIG. 18 is a top plan view, partly in section, of the apparatus of FIG. 10.
Figure 24:
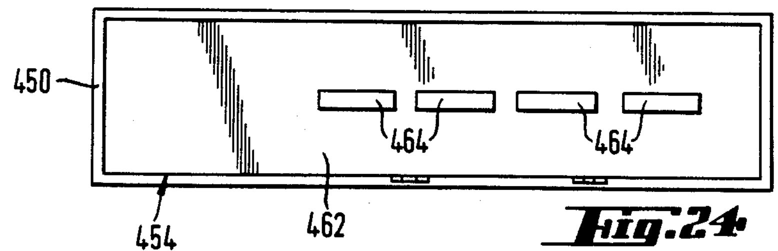
FIG. 24 is a front elevation view of the apparatus of FIGS. 21 and 22.
Figure 23:
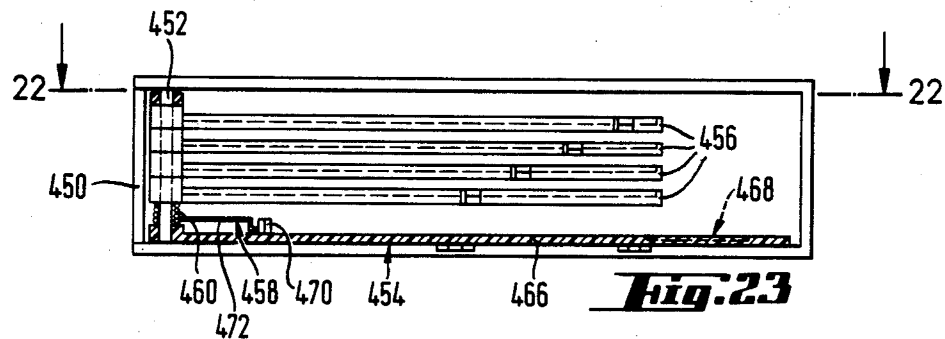
FIG. 23 is a simplified cross-sectional side elevation view of the apparatus of FIGS. 21 and 22.
Figure 21:
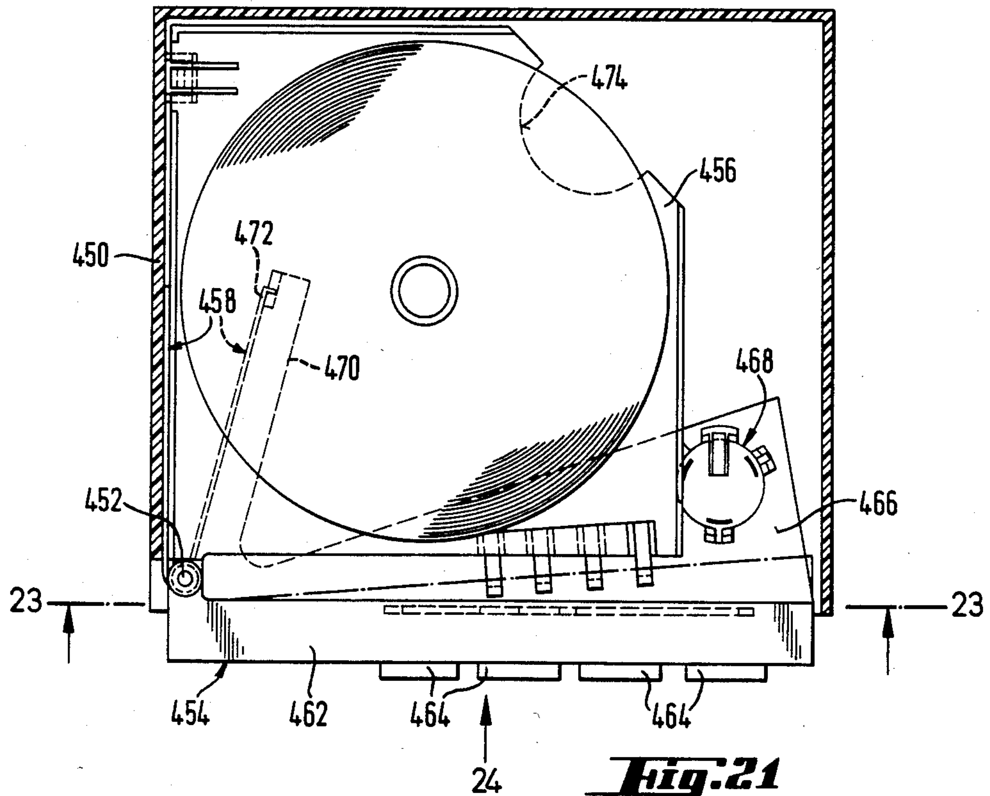
FIG. 21 is a schematic top plan view, partly broken away, of apparatus in accordance with still another embodiment of the present invention.
Figure 22:
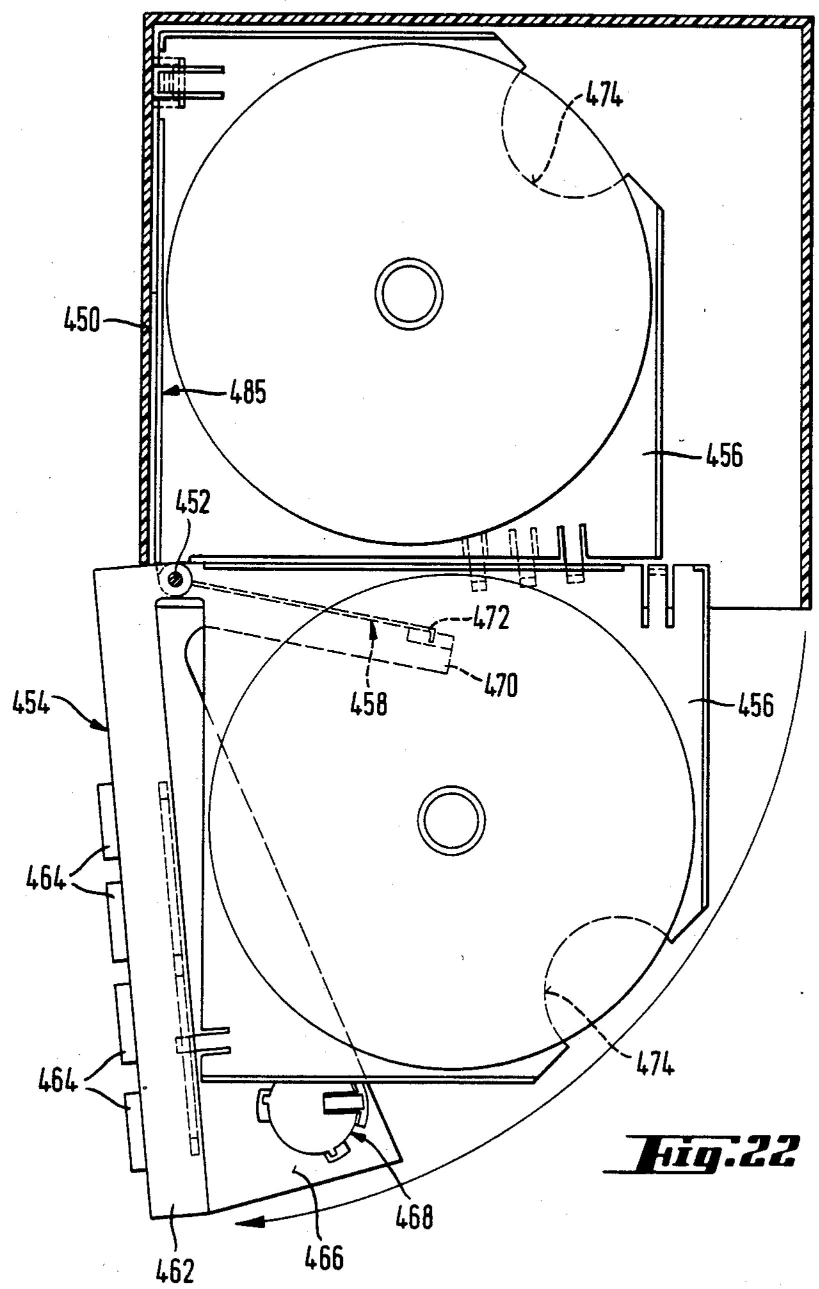
FIG. 22 is a view similar to FIG. 22 but showing the apparatus in the ejected position.

As may be seen from FIG. 20, lugs 310 are formed during the moulding of the selector sliders 296. These lugs serve to capture the selector sliders in the slots 294 but permit free lateral movement thereof. The degree of travel of the selector sliders is limited in on direction by the ends of the slots 294 and in the other direction by separating ribs 312 (FIGS. 17*a* and 18). Each selector slider 296 also has a braking head 314 which rests on the bottom of the slot. These braking heads, as a result of the provision of an aperture 316, can spring inwardly. Accordingly, the braking heads 314 retard but do not prevent movement of the selector sliders, i.e., a predetermined amount of pressure is required to move the selectors sliders and these members will not move because of vibration.

As will be recognized by those skilled in the art, FIG. 17*a* depicts the lower of the two slider members of the disc storage system of FIG. 10. The return springs 306 on the upper slider member will extend upwardly while the braking heads 314 thereof face in the direction of the floor of the slot. The lugs 310 on the upper slider member will have a mirror image with respect to the lugs of the lower slider member.

Each of the selector sliders 296 has a pair of "claws" 318. There are, accordingly, four "claws" which correspond respectively to a disc holder 270. Since the disc holders 270 are disposed at different levels within the housing, the claws 318 will also be vertically staggered and, accordingly, the selector sliders will differ from one another with respect to the shape and location of the "claws" 318. Additionally, apertures 320 are provided adjacent to the "claws" 318. These apertures allow the passage of hooks of the disc holders which have not been coupled to the slider member.

With reference now to FIG. 17*b*, each disc holder 270 is provided at its forward or leading end with an integral leaf spring member 322 which, at its free end, is formed into a hook 324. The leaf springs and hooks are similar to those described above, and located at the opposite side of the holders, which establish the frictional connection between the holders and the housing. In the case of the springs/hooks 322, 324, however, a positive drive connection rather than a frictional connection is established. If it is assumed that the slider member is in the closed position, as shown for the upper slider member in FIG. 10, the "claws" 318 of both selector sliders 296 will assume the position shown in FIG. 17*a*. In this position the "claws" 318 are laterally offset from the hooks 324 and in front thereof. Accordingly, none of the disc holders 270 are coupled to the slider member. If the user now presses one of the selector buttons 298, the pin 320 will, because of its conical tip portion, penetrate the corresponding hole 304 thus causing the selector slider to be displaced laterally. When the selector slider has been so displaced, the "claw" 318 commensurate with the holder 270 which the user has selected will be in alignment with the hook 324 of that selected holder. Further inward pressure on the selector button, which at this time will be depressed to its full extent of travel, will transfer force to the front wall 262 of the slider member. Accordingly, the selector button and slider member will move further into the housing to cause unlocking of the slider member. The manner in which unlocking is accomplished will be described below.

The slider member, during the above-described inward movement, will be displaced relative to the disc holders 270. Accordingly, the hook 324 of the selected disc holder will snap over the corresponding "claw" 318 on the selector slider. If the user now releases the selector button, the slider member will be ejected from the housing under the influence of the springs 256, 258. The slider member will, as it moves to the extended position, carry the selected disc holder 270. Since the return spring 306 of the selector slider exits the depression 308 in the housing floor during the forward movement of the slider, the selector slider will no longer be biased to the uncoupled position. During forward movement of the slider the braking heads 314 will insure against lateral displacement of the sliders as a result of vibration.

When the slider member is reinserted, for example after a selected disc has been removed from the holder 270 on which it was stored, it will automatically lock in the inserted position in the housing. It is immaterial whether the insertion of the slider results from pressure on its front face or on one of the selector buttons. That is, a driving connection cannot be established with any of the holders which have remained in the housing during the reinsertion motion and thus, upon reinsertion, all of the elements return to their initial or preparatory position.

FIG. 19 shows the contour of the disc holders 270 of the embodiment of FIGS. 10–20. A disc 330 is depicted as mounted on holder 270. The disc is supported only in its central, track-free region, by means of an annular rim portion 332 which extends about the base of the hub 336. The hub 336 passes through the central aperture in disc 330. The holder 270 is also provided with a rim region 334, which may have a frustoconical shape as shown, which supports the recording track-free outer peripheral region of the disc 330. Accordingly, when mounted on holder 270, the portions of the disc 330 which contain recorded information cannot be damaged by contact with another surface.

The discs 330 are, of course, very thin and, in order to provide sufficient space for the selector mechanism as described above, there will be sufficient room between the individual disc-holders 270 to accommodate the booklet which is usually supplied upon purchase of the disc. The booklet, which is not shown, will be supported on a bar 338.

In order to permit the disc 330 to be grasped at a pair of oppositely disposed points on its periphery, so that the disc may be lifted upwardly off of the hub 336, the holders 270 are provided with cut-away portions 340 and the floor of the slider member will be provided with corresponding cut-outs.

Figure 13:
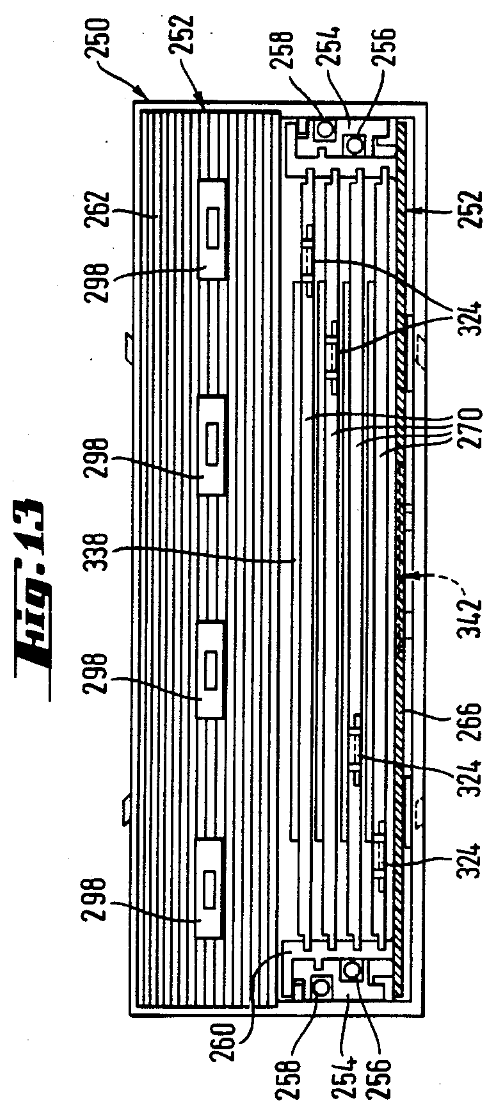
FIG. 13 is a front elevation view, partly in section, of the apparatus of FIG. 10.
Figure 14:
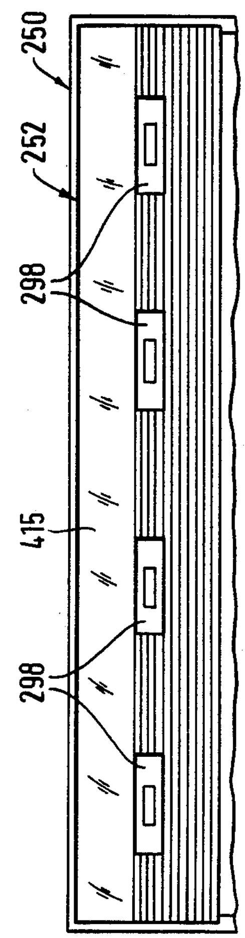
FIG. 14 is a partial front view which depicts an alternative to the arrangement shown in FIG. 13.

The locking mechanism for the sliders has been indicated generally at 342 in FIG. 13 and will be described in detail below in the discussion of FIGS. 45–48.

In the preferred embodiment of the present invention the holders which carry the discs and the transporter, which is selectively coupled thereto, are in the form of sliders. FIGS. 21–24 depict, in schematic form, an alternative wherein the carriers and transporter are pivotal with respect to the housing. In FIGS. 21–24 the housing is indicated at 450 and is provided, adjacent one end of its open front side, with a spindle 452. A transporter 454 and a plurality of disc-holders 456 are pivotally supported on spindle 452. A "leg and collar" spring 458, which extends between the housing 450 and the transporter 454, biases the transporter to the open or ejected position shown in FIG. 22. The spindle 452 passes through the spiral portion 460 of spring 458. The transporter 454 comprises a front wall 462 and a floor or base member 466. The disc holder selector buttons 464 are mounted on front wall 462. Part of a locking mechanism indicated generally at 468, is provided on the base member 466 of transporter 454, the locking mechanism being described below in the discussion of FIGS. 45–48. The base 466 of transporter 454 is also provided with an integral arm 470 which is engaged by the leg portion 472 of spring 458. The individual disc holders 456 will be mechanically coupled to the front wall 462 of transporter 454 in the manner described above in the discussion of FIGS. 4–10. The selector sliders will, however be somewhat shorter in length so as to provide space to accommodate a pivoting movement of the transporter and insure that the dimensions of the housing 450 do not become too great. The disc holders and transporter will, in the embodiment of FIGS. 21–24, be provided with a single cut-away portion 474 which permits the user to grasp and remove a disc from a selected disc-holder 456.

Figures 25, 26:
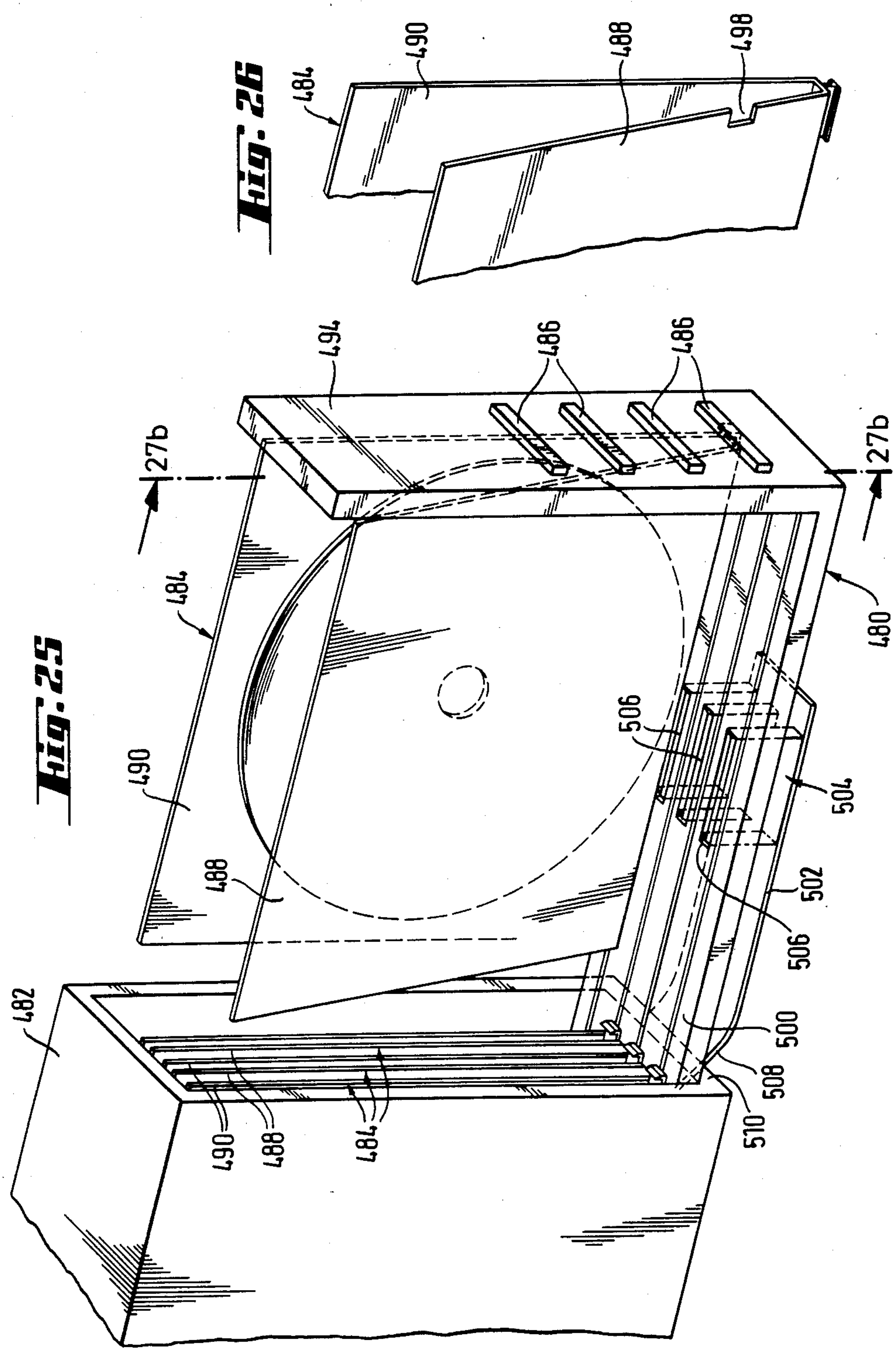
FIG. 25 is a partial, perspective view of apparatus in accordance with another embodiment of the present invention.
FIG. 26 is a partial perspective view of one of the recording media carriers of the apparatus of FIG. 25.
Figure 27A:
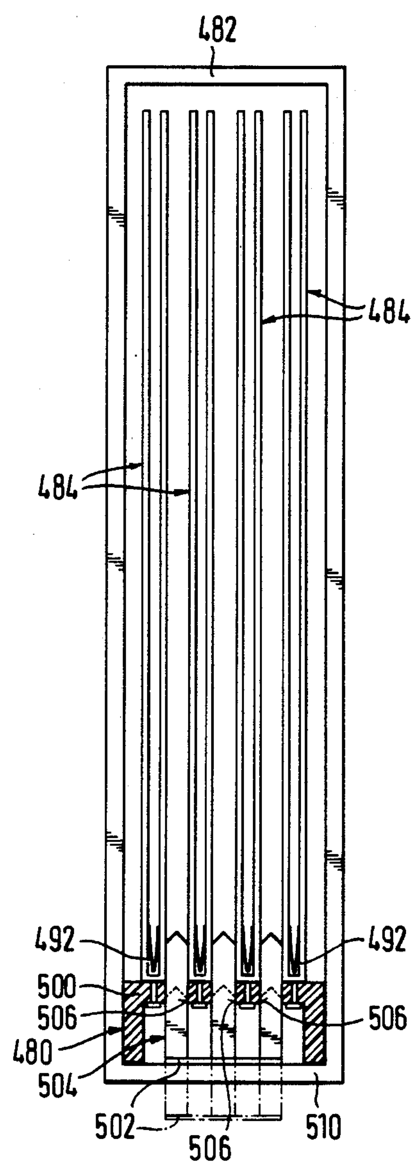
FIGS. 27*a* and 27*b* diagramatically illustrate, in the form of vertical section views, recording media receiving pocket closing mechanisms for use in the embodiment of FIG. 25.
Figure 27B:
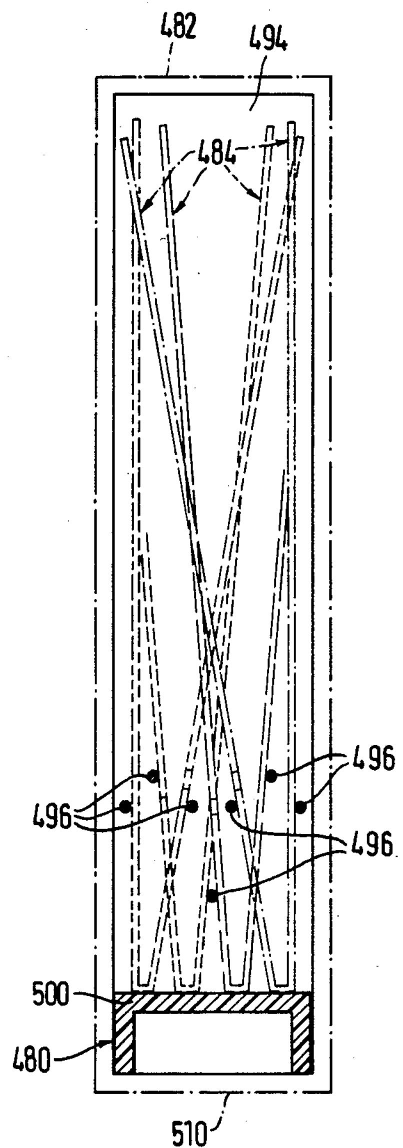

A further embodiment of the present invention is shown schematically in FIGS. 25–27. In this further embodiment the transporter or slider member, which has been indicated generally at 480, is arranged to move between stops provided in a housing 482. The storage system of FIGS. 25–27 includes four disc-holders 484 which can be selectively coupled to the slider member 480 by means of operation of associated selector buttons 486. Each of the disc-holders 484 comprises a pair of plate members 488, 490 which are biased to a spread-apart position by means of V-shaped leaf springs 492 (FIG. *27a*). The inside of the front wall 494 of the slider member 480 is provided with integral stops 496 which are staggered in height, as shown in FIG. *27b*. The stops 496 are associated with the plates 488 490 of the holders 484, the plates being provided with cut-outs 498, as shown in FIG. 26, in their front edge at the level where the stops 496 associated with other plates are situated. As an alternative, the slider 480 could be provided with side walls which would serve as stops for all of the disc-holder plates.

A leaf spring 502 is coupled to the floor 500 of the slider member 480. The leaf spring is supported such that, when the slider member is moved to the ejected position of FIG. 25 the spring 502 pivots downwardly. A comb-like divider 504 is affixed to spring 502 and passes through slots 506 provided in the base 500 of the slider member. The downward pivoting motion of spring 502 withdraw the "comb" 504 from the slots 506. The leaf spring 502 is deflected upwardly, along its wedge-shaped angled section 508, by the floor 510 of housing 482 when the slider member 480 is reinserted into the housing. Upward deflection of leaf spring 502 cause the "comb" 504 to move upwardly through slots 506 and to press the plate members 488, 490 of each disc-holder 484 together.

Figure 28:
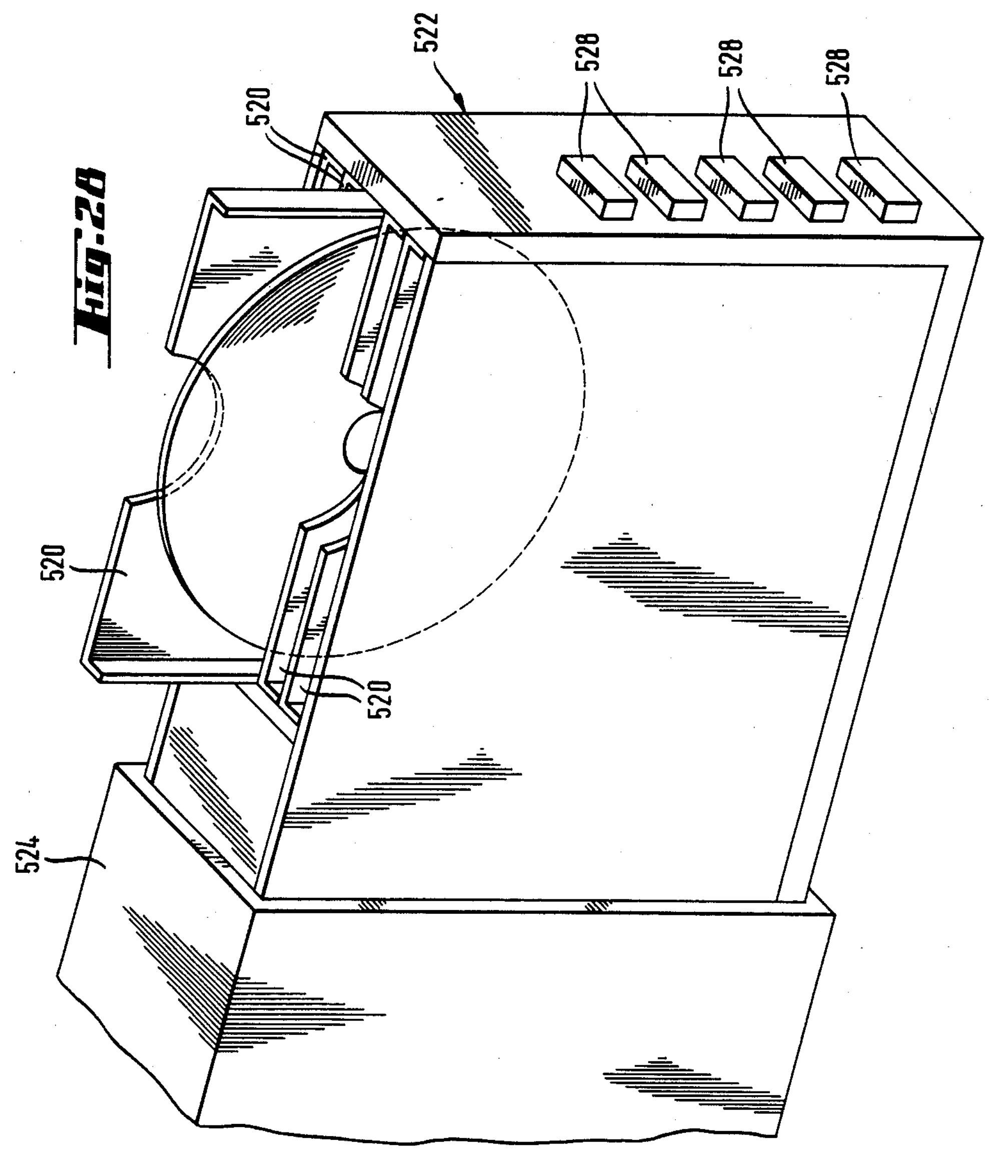
FIG. 28 is a partial perspective view of a further embodiment of the present invention.
Figure 29:
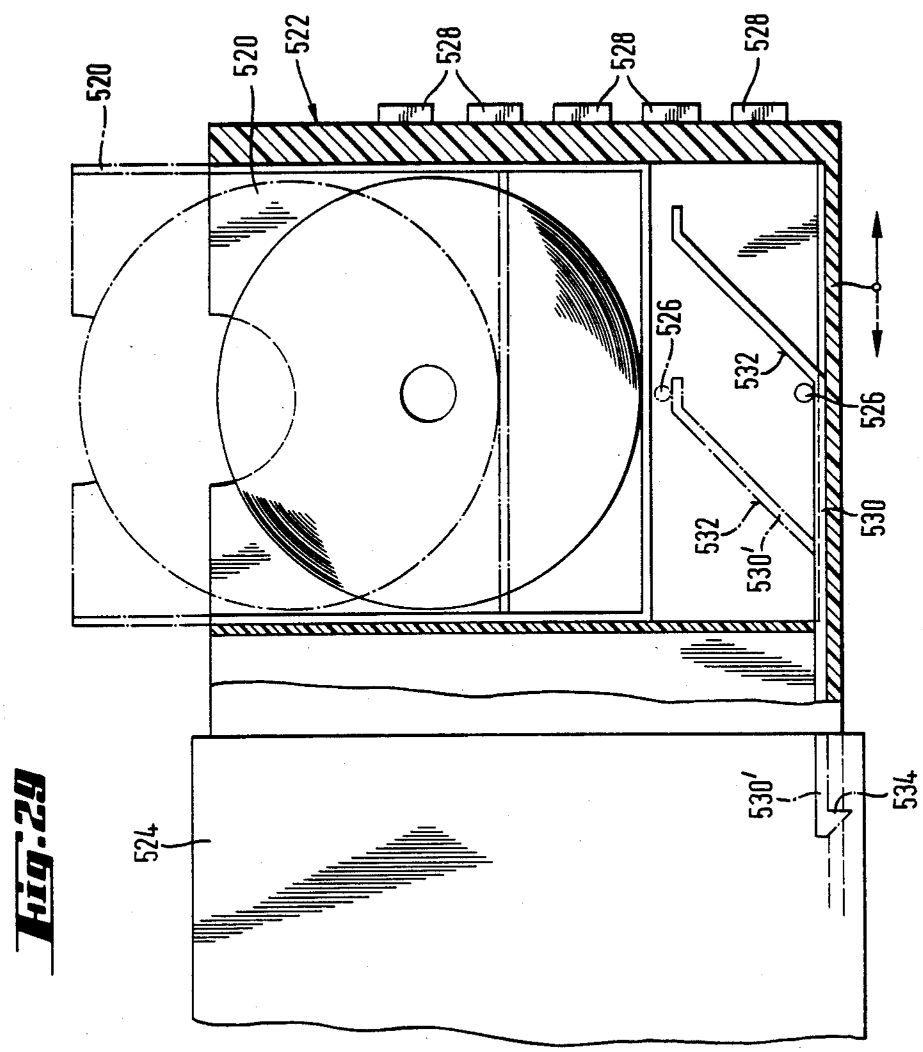
FIG. 29 is a partial cross-sectional side elevation view of the apparatus of FIG. 28.

In the embodiment of FIGS. 28 and 29 the disc-holders 520 are arranged for movement in a direction which is transverse to the direction of movement of the slider member 522 relative to housing 524. In order to enable this transverse motion, each disc-holder 520 is provided with a lifting pin 526. A rail 530, which defines an angled cam path 532, is associated with each selector button 528. The unselected rails 530 will be transported out of the housing together with the slider member, as indicated by the solid line showing in FIG. 29, while the rail associated with the selector 528 which has been actuated, indicated in phantom at 530', will move only to the position where a hook 534 at the inwardly disposed end thereof contacts a stop in housing 524. Accordingly, the lifting pin 526 of the selected disc holder will ride up the cam-path 532 so that the disc will be presented for removal from the magazine as depicted in FIG. 28.

In the embodiments described above the selected disc is transported to a position where it is completely outside of the housing so that it may be removed from its holder by being lifted upwardly. In some cases, for example where space is limited, it may be desirable to employ a shorter ejection stroke for the transporter and to move the selected disc out of the housing only far enough for it to be grasped and pulled, in a generally forward direction, from its holder. In both cases, however, it is desirable to close the open side of the housing in the storage position. FIGS. 30–37 depict schematically various arrangements wherein the ejected position of the disc is such that the disc is only partly extended from the housing while the open side of the housing through which the slider transporter moves is closed when in the storage position.

Figure 31:
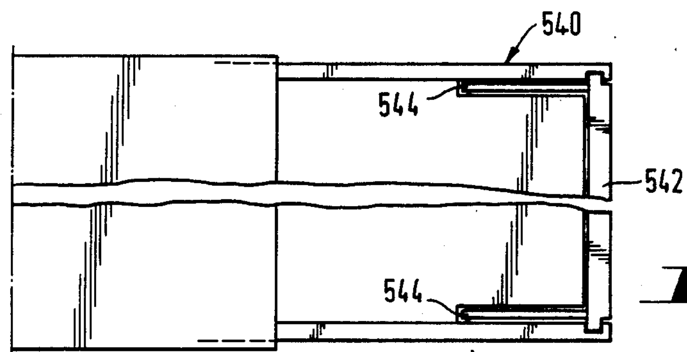
FIGS. 30 and 31 are respectively partial side elevation and top plan views which diagramatically explain a further embodiment of the present invention.
Figure 30:
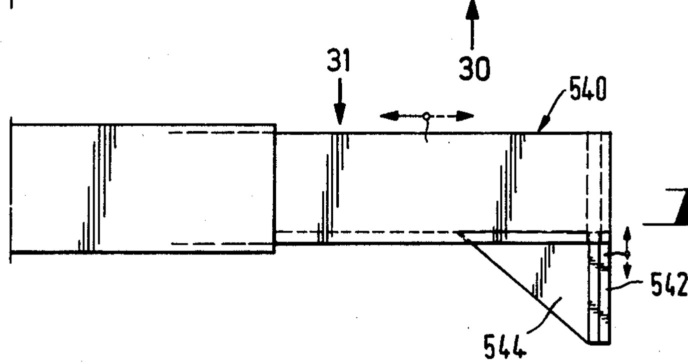

FIGS. 30 and 31 depict an arrangement wherein the transport slider member 540 has a front wall 542 which is displaceable normal to the direction of movement of the slider member. In the open condition, as represented by FIG. 30, the front wall 542 will be displaced downwardly, either under the influence of gravity or a spring bias, so as not to interfer with removal of the disc in the direction of motion of the slider member. During insertion, the wedge-shaped arms 544 which are attached to front wall 542 will contact the lower front edge of the housing 540 to thereby cause the front wall 542 to be cammed upwardly to the closed position.

Figure 32:
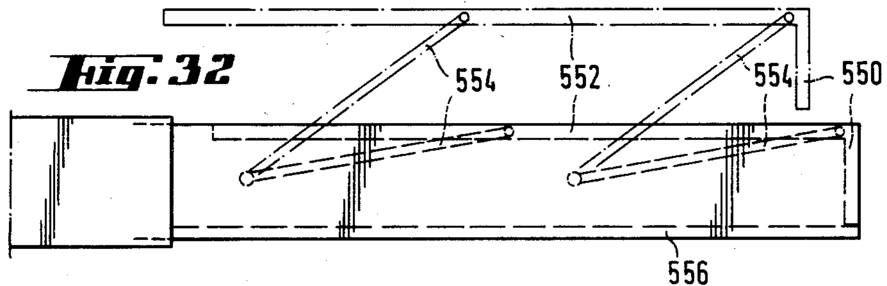
FIG. 32 is a schematic partial side elevation view of another embodiment of the present invention.

FIG. 32 depicts an arrangement wherein the front wall 550 of the slider member 556 is integral with a cover 552 and is linked to the base of the slider member by connecting rods 554. The connecting rods 554 define a parallegram-type linkage which may be spring biased to the open position.

Figure 33:
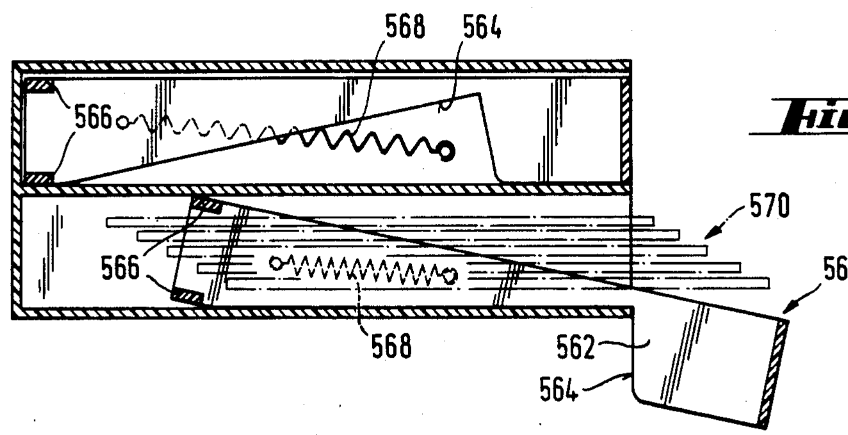
FIG. 33 is a schematic cross-sectional side elevation view of another embodiment of the present invention.

FIG. 33 shows a construction wherein the slider member 560 is provided with a front wall, two lateral cheeks or side walls 562 and a pair of transverse ribs 566 at the end opposite to the front wall. The side walls 562 are provided with triangular cut-outs 564. The slider member 560 is biased to the ejected position by means of springs 568. When the slider member is unlocked, the lower of the rearwardly disposed transverse ribs 566 will move forward until it contacts a stop, not shown, and the turning moment subsequently developed by the spring force will cause the entire slider member to pivot about this stop. Accordingly, because of the space provided by the cut-outs 564, the front and sides of the slider member will rotate downwardly out of alignment with the housing access opening and a disc can be removed in the forward direction from the holder 570 which has been selected. The holders 570 will not be pivoted downwardly with the slider member.

In the arrangement of FIG. 34 the front wall 580 is hinged to the slider member 584 by means of two lateral arms 582 and a spiral spring, not shown, built into one of the pivot joints will bias the front wall into the position shown. In order to insert the slider member the front wall 580 may, for example, be brought into alignment with the housing access opening and then pushed inwardly.

In the arrangement of FIG. 35 the front wall 586 is hinged, along one of its lower edges, to the slider member 588.

In the arrangement of FIG. 36 the base of the slider member is provided with a hinged joint and the front wall 590 and the part 592 of the slider base located forwardly with respect to the hinge may be pivoted downwardly as a unit.

Figure 37:
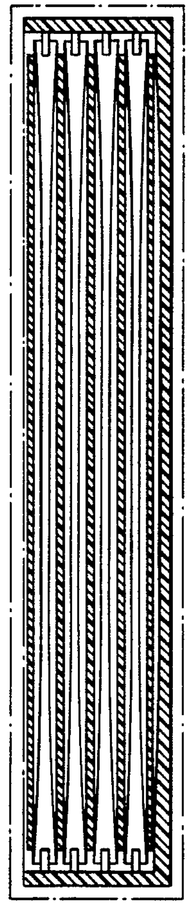
FIG. 37 is a schematic cross-sectional front elevation view through a stack of carrier members which may be used in any of the embodiments of FIGS. 30–36.

In order to facilitate the forward removal of a disc from the selected holder, as permitted in the embodiments of FIGS. 30–36, it is preferable that the disc-holder not include a disc engaging hub but rather that it have a double-dished profile, as shown in FIG. 37, wherein the disc will be supported only at its peripheral regions which do not bear recorded information. Disc holders having the appropriate concave profile, both above and below a disc inserted therein, are shown in cross-section in FIG. 37.

Figure 38:
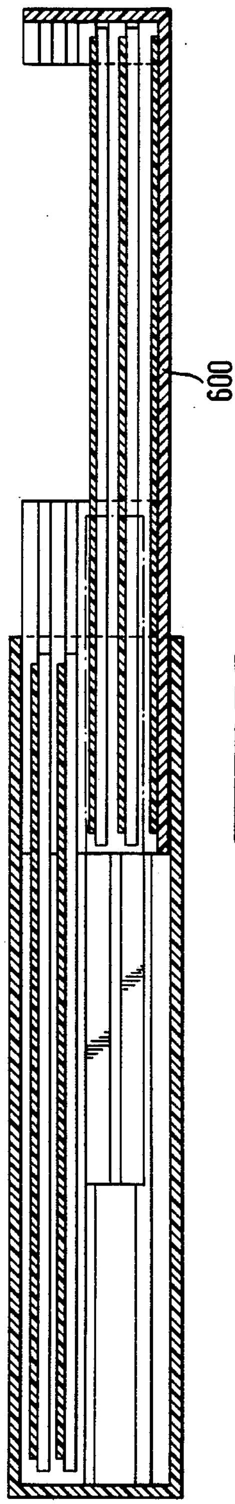
FIG. 38 is a schematic cross-sectional side elevation view of apparatus in accordance with another embodiment of the present invention.

FIG. 38 shows that the slider member, indicated at 600, may function both as a transporter and as the lower one of the disc-holders.

Figure 39:
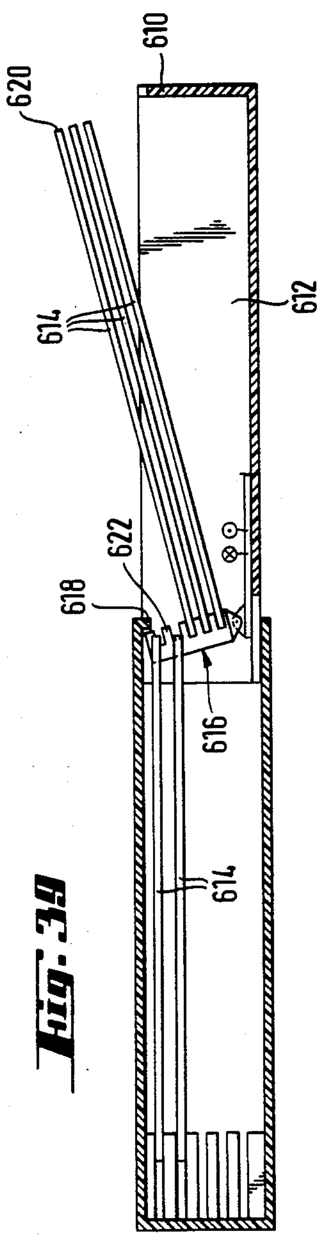
FIG. 39 is a schematic cross-sectional side elevation view of another embodiment of the present invention.
Figure 40:
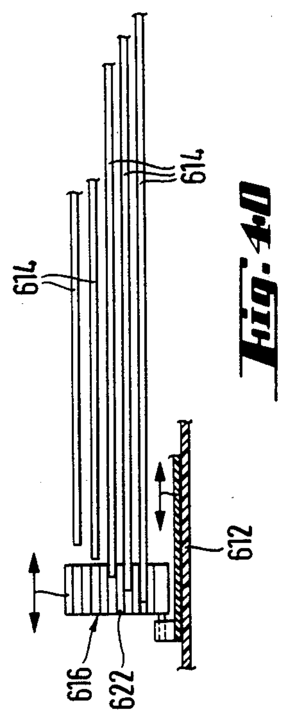
FIG. 40 is an enlarged view of a portion of the apparatus of FIG. 39.

FIGS. 39 and 40 schematically show a variant of the embodiment of FIG. 33. In the embodiment of FIGS. 39 and 40, rather than translate the front wall 610 of the transporter 612 out of the path of disc removal, the selected disc holder may be tilted by means of a tilt lever mechanism 616 which moves forward with the slider member, the tilting action resulting from the establishment of contact between the upper end of the tilt lever 616 and a stop 618 on the inside of the housing. The tilting action results in an edge of the selected disc being positioned outside of the housing and above the top of the front wall 610 of the transporter. The disc selection mechanism, in the embodiment of FIGS. 39 and 40, may be similar to that described above with respect to the embodiment of FIGS. 1–3. Thus, as may be seen from FIG. 40, the dimension of the disc holders in the direction of travel of the transporter becomes progressively smaller from the bottom to the top of the housing and the selector mechanism will cause the tilt lever 616 to move forward until the uppermost of the holders 614 which has been engaged by the grippers 622 of tilt lever 616 will be commensurate with the disc selected by the user. Thus, as shown in FIG. 39, if a disc other than the lowest one in the arrangement is selected, the selected disc and all discs positioned beneath the selected disc will be moved to the ejection position and tilted subsequent to unlocking of the transporter (slider member).

Figures 41, 42, 43, 44:
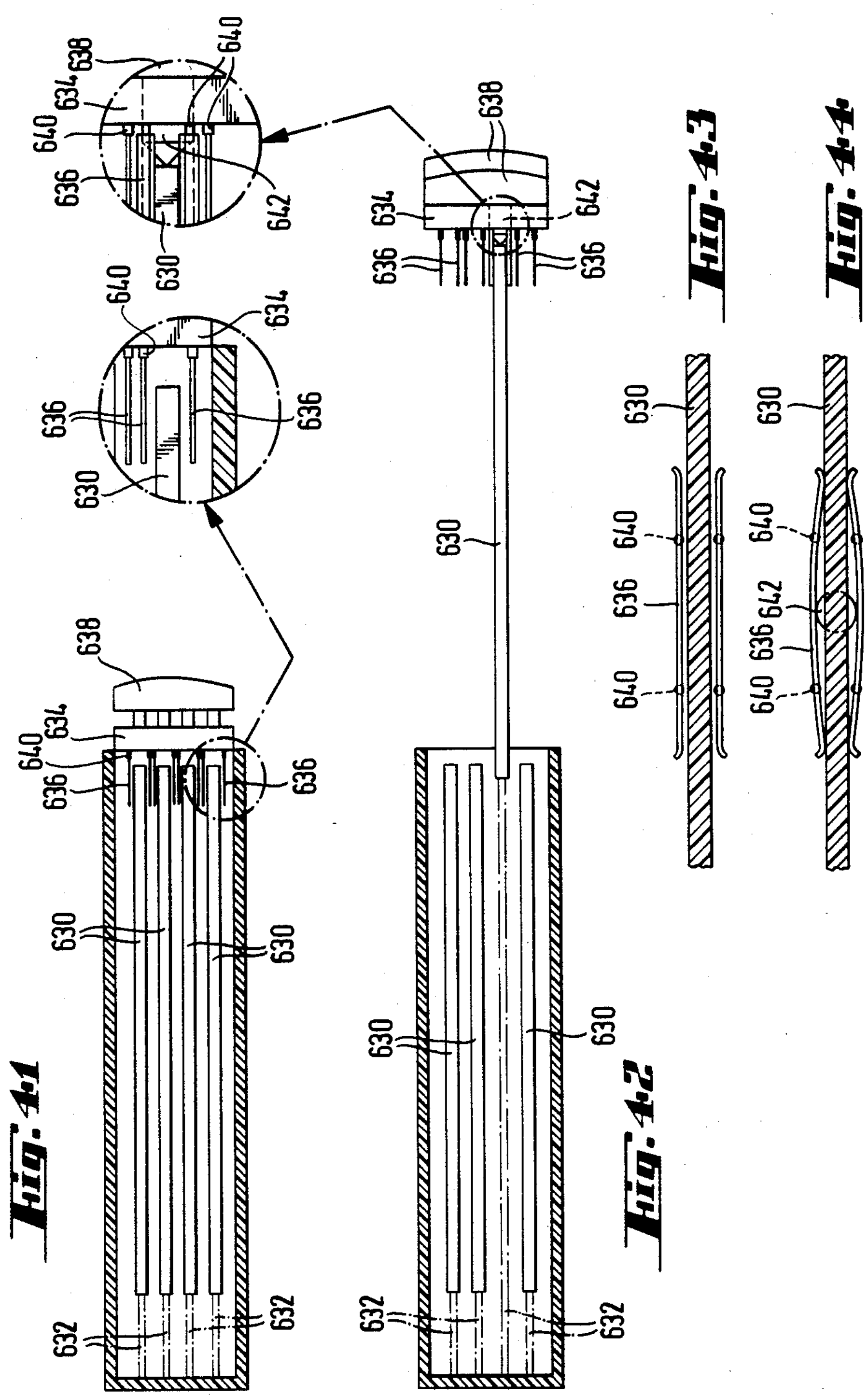
FIGS. 41–44 are various schematic views of apparatus in accordance with another embodiment of the present invention, FIGS. 41 and 42 being cross-sectional side elevation views and FIGS. 43 and 44 being enlarged cross-sectional views of a record media carrier.
Figure 45:
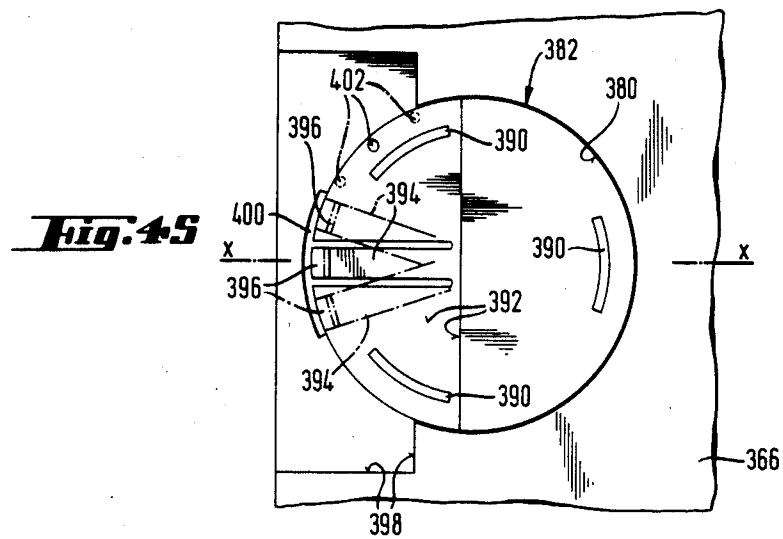
FIGS. 45–48 are several views of a locking mechanism which may be employed in the practice of the present invention, FIG. 45 being a partial bottom plan view of a base plate of a transporter, FIG. 46 being a partial top plan view similar to FIG. 45 and also showing the locking components mounted on the housing and FIGS. 47 and 48 being partial side elevation views.
Figure 48:
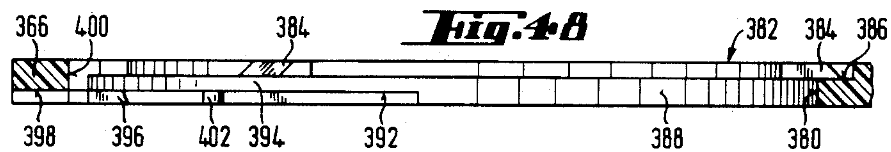
Figure 47:
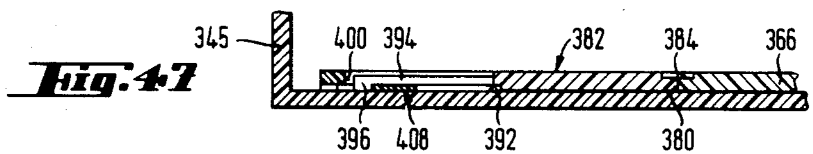

Referring now to FIGS. 41–44, an embodiment is depicted wherein the selected disc holder 630 forms part of the transporter In this embodiment each disc holder is provided with its own biasing spring 632 and its own locking system which can be unlocked by exerting pressure toward the inside of the housing on the outer end face of the holder. The selector arrangement and the remainder of the transporter consists of a front wall 634 provided with gripper springs 636 and selector buttons 638. The gripper springs 636 comprise cooperating pairs of leaf springs which are pivotable about bearings 640 provided in the front wall 634. Referring to FIGS. 43 and 44, the springs 636 of each pair are spread in such a manner that their free ends will be anchored in the selected disc holder 630 when a drive cone 642, mounted inside of a selector button 638, pushes the springs associated with the selected holder apart.

A slider member locking system which requires little space, can be manufactured and assembled at low cost, locks itself automatically when the slider member is inserted into the housing and unlocks when inward pressure is exerted on the inserted slider member is shown in FIGS. 45–48. It is to be understood, however, that other locking mechanisms may be used in the practice of the present invention.

Referring now to FIGS. 45–48, the slider member has a base plate 366. The base plate 366 has a circular aperture 380 therein. A catch 382 is inserted in aperture 380. The catch 382 configured and mounted so that it can be rotated through a limited angle. Three "claws" or guide members 384 are integrally formed with and extend radially outwardly from the upper side of the catch 382. The claws 384 are off-set from one another by 120°. The catch 382 is relieved, by the provision of slots 390 therein, so that the "claws" 384 may be sprung inwardly when the catch is inserted into aperture 380. After insertion of the catch 382 in aperture 380 each of "claws" 384 drops into an arcuate recess 386 which is formed on the upper side of the base plate 366 of the slider member. The length of the arcuate recesses 386 is determined by the maximum angle of rotation desired for catch 382. The catch 382 is supported by inwardly projecting circumferential portions of the aperture 380 in the slider member which are located between the recesses 386. A further recess 398 is provided on the underside of base plate 366 of the slider member. The depth of recess 398 is commensurate with the height of a camming plate 408 and a control projection 414 which are provided on the floor of the housing. The length and width of recess 398 is indicated on FIG. 45.

The base plat 366 of the slider member is also provided with an aperture 400 in the region between those two of recesses 386 that are positioned at the opposite sides of the central plane of the slider member. In the region of aperture 400, the catch 382 is provided with a pair of slots which cooperate to define therebetween a resilient catch, i.e., a leaf spring 394, which includes a catch projection 396. The catch projection 396 is undercut as shown. A space, corresponding to the height of camming plate 408 and control projection 414, is provided under the resilient catch. This space is limited, at a first end, by a shoulder 392. In addition, a control cam 402 is formed integrally with and on the underside of catch 382.

The camming plate 408 and the control projection 414 respectively cooperate with the catch projection 396 and the control cam 402. As schematically indicated on FIG. 46, this results in a pattern of motion wherein the catch 382 turns first in the clockwise direction and then in the counter-clockwise direction and the catch projection 396 is deflected in the direction of the axis of rotation of catch 382 when it runs over the ramps 408 and 416 of the camming plate 408 respectively during locking and unlocking.

The undercut of catch projection 396 cooperates with a complementary undercut on edge 412 of camming plate 408 to prevent the projection 396 from sliding off the camming plate when in the locked position and also insures that the catch projection will not, as a result of forces acting thereon, deform as a result of cold flow. For a more detailed description of the operation of the locking mechanism, reference may be had to U.S. Pat. No. 4,538,729 entitled "RECORDING MEDIA STORAGE APPARATUS AND TECHNIQUE".

In order to provide an indication as to the identity of the record media stored on any disc holder, it is desirable that an inscription area be provided on the exterior of the storage system. Referring again to FIGS. 14 and 16, labels may be inserted behind a transparent snap-action window which is provided above the selector buttons.

Figure 49:
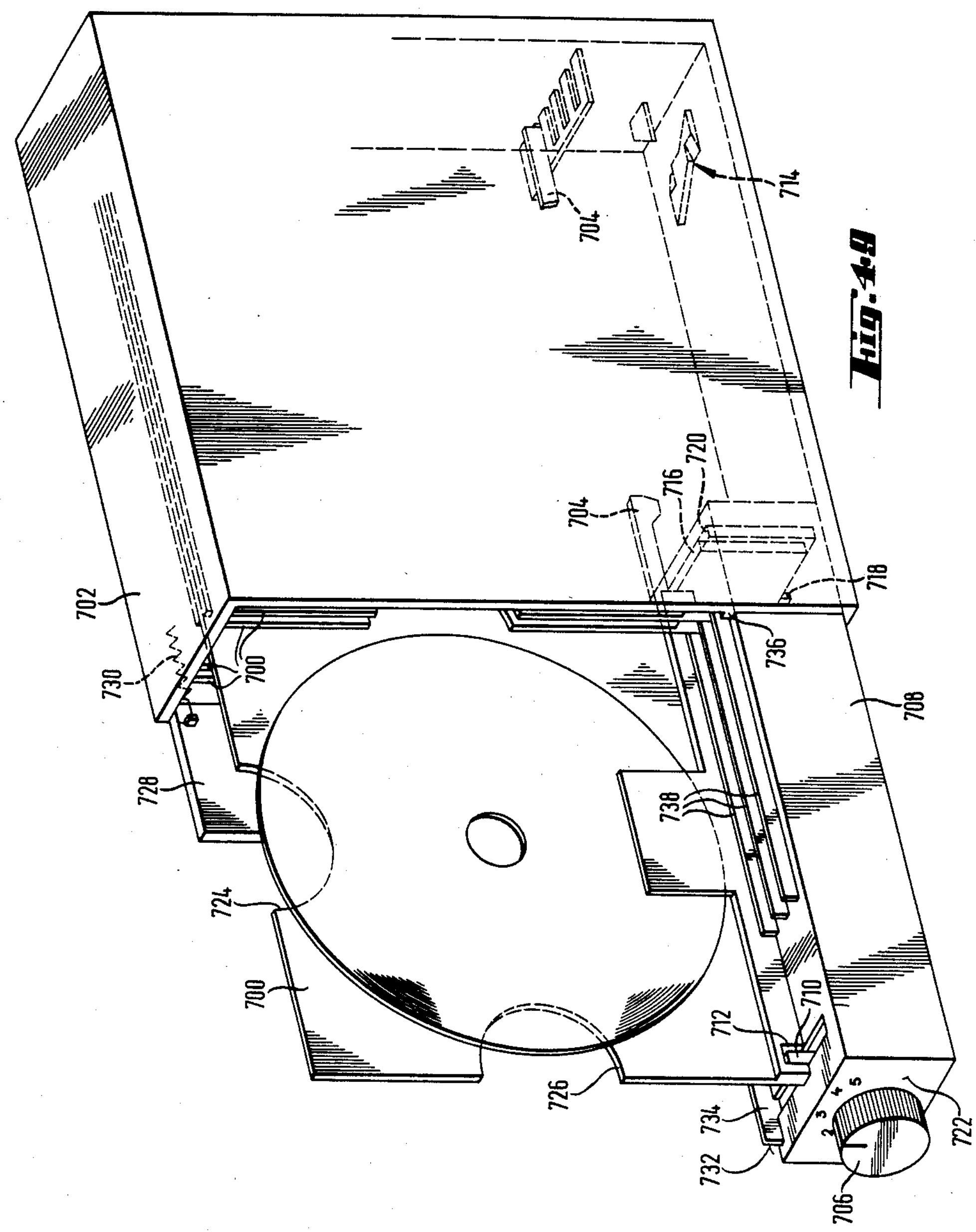
FIG. 49 is a perspective view, with internal parts being shown in phantom, of apparatus in accordance with another embodiment of the present invention.
Figure 50:
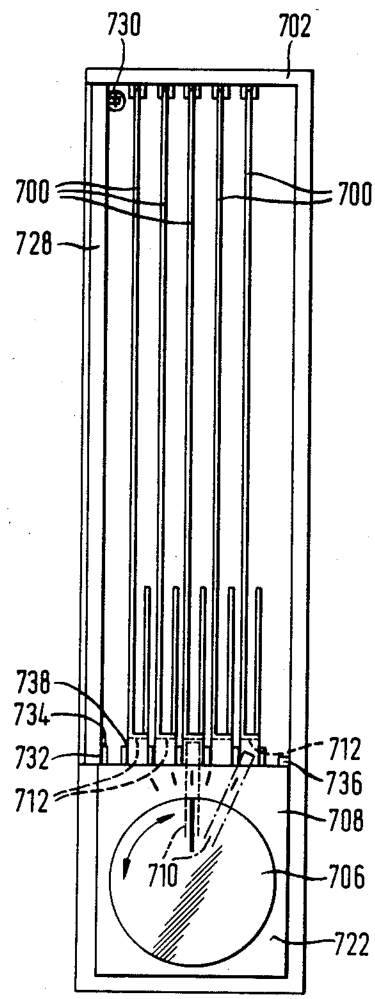
FIG. 50 is a front elevation view of the apparatus of FIG. 49.
Figure 51:
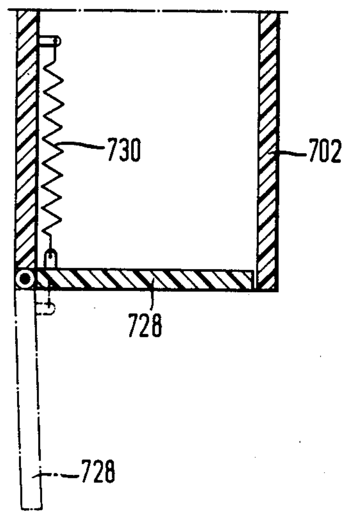
FIG. 51 is a partial cross-sectional top elevation view of the apparatus of FIGS. 49 and 50.

Another embodiment of the present invention may be seen from FIGS. 49–51. In this embodiment compact discs are received in holders 700. Each holder, in the manner described above in the discussion of the embodiment of FIGS. 10–20, is held in the housing 702 by means of a frictional connection. This frictional connection includes a spring arm 704 extending from the holder and engaging a detent in a cone-like catch member which is integral with the inside of the rear wall of the housing. Each of holders 700 can be positively coupled to a carriage-like slider member 708 by means of the operation of a selector mechanism which includes a selector dial 706. The selector dial 706 operates a selector arm 710 which, according to the rotary position of the dial, will engage an actuating slot 712 in the selected disc holder. Locking and unlocking of the slider member 708 in housing 702 may be accomplished in the same manner as discussed above with respect to FIGS. 45–48, the locking mechanism including a camming plate 714 mounted within housing 702. Alternatively, a locking mechanism which operates in a similar manner but includes a catch having a locking projection 718, the catch being movable within a cage 720 formed on the slider member 708, may be employed. In the alternative arrangement, the locking means 716 carried by the slider member will be both pivotal and movable transversely with respect to the direction of motion of the slider member, rather than being rotatable. For a further description of such alternative locking arrangement, reference may be had to the above-referenced U.S. Pat. No. 4,538,729 entitled "RECORDING MEDI STORAGE APPARATUS AND TECHNIQUE."

When the container of the embodiment of FIGS. 49–51 is closed, the open front side of the housing 702 is covered in the lower region by the front wall 722 of slider member 708. In order to provide full protection for the discs, which will be removed in the upward direction from the holders 700, or alternatively in the forward direction, the remainder of the front of the housing 702 is closed by a flap 728 which is biased into the closed position by a spring 730. Upon unlocking of the slider member, by inward pressure on the selector button 706, the end face 732 of a rib 734 provided on the upper side of the slider member will push the flap 728 to the open position and the rib 734 will hold the flap 728 in the open position when the slider member is in the ejected position. Guide ribs 738 are provided on the slider member for the holders 700 while guide rails 736 are provided on the housing 702 for the slider member and the outwardly disposed holders. Guiding arrangements as disclosed in any of the other embodiments may, of course, be employed in the embodiment of FIGS. 49–51.

Figure 52:
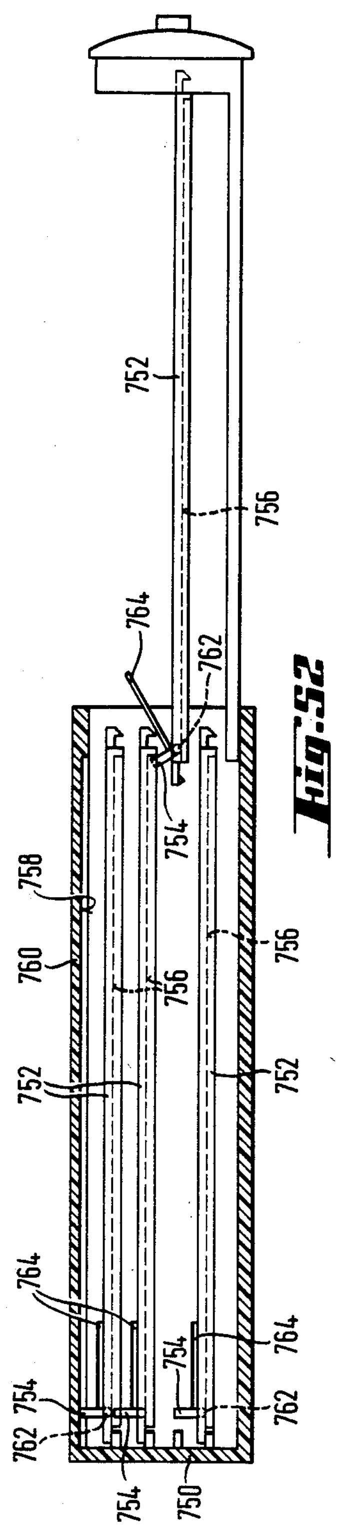
FIG. 52 is a schematic cross-sectional side elevation view of apparatus in accordance with another embodiment of the present invention.
Figure 53:
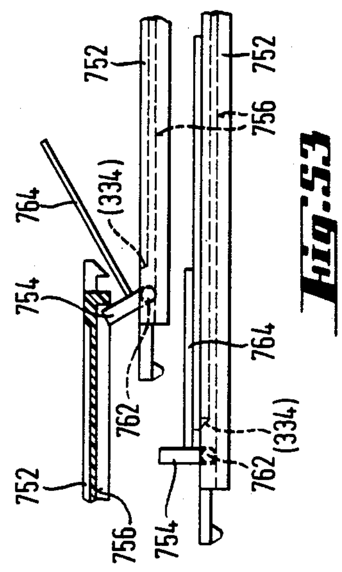
FIG. 53 is a partial, enlarged view of the apparatus of FIG. 52.

FIGS. 52 and 53 disclose a modification which may, for example, be incorporated in the preferred embodiment of FIGS. 10–20. If a recording media storage system in accordance with the present invention is mounted in a motor vehicle, space requirements may dictate that the transporter operate in other than a horizontal plane. For example, referring to FIG. 52, it may be necessary to install the magazine such that it stands on the rear wall 750 of the housing. Under such circumstances there would, of course, be a risk that the disc carried by the selected holder, indicated at 752, may slide downwardly over the rim 334 of the receiving compartment of the holder and become jammed between the holder and an adjacent holder or the top panel of the housing. This potential problem may be overcome by providing, adjacent the trailing edge of the holders, prong-type members 754. The members 754 engage slots 756 provided on the facing underside of the adjacent holder or, in the case of the uppermost holder, slots 758 provided on the underside of the cover panel 760 of the housing.

As may be seen from FIG. 53, which is an enlarged view of the ends of the holders showing the prongs, when the holder is almost fully extended the free ends of prongs 754 strike an end face of the cooperating depression. The prongs on each holder are mounted so as to be capable of pivoting rearwardly about a journal bearing 762. Contact between the end faces of the depressions and the prongs does not, accordingly, interfer with complete extension of the holder. When the selected holder is fully withdrawn, the prongs 754 will be pivoted to the position shown in the case of the upper prongs in FIG. 53. The prongs are provided with an outwardly extending arm or arms 764 and, with the associated holder in the ejected position, the arms 764 define a generally funnel-shaped guide opening for the above-mentioned booklet which accompanies a purchased compact disc. With the booklet being prevented from sliding off the holder by the arms 764, the associated compact disc is similarly prevented from becoming separated from the selected holder and falling downwardly into the housing.

Figure 54:
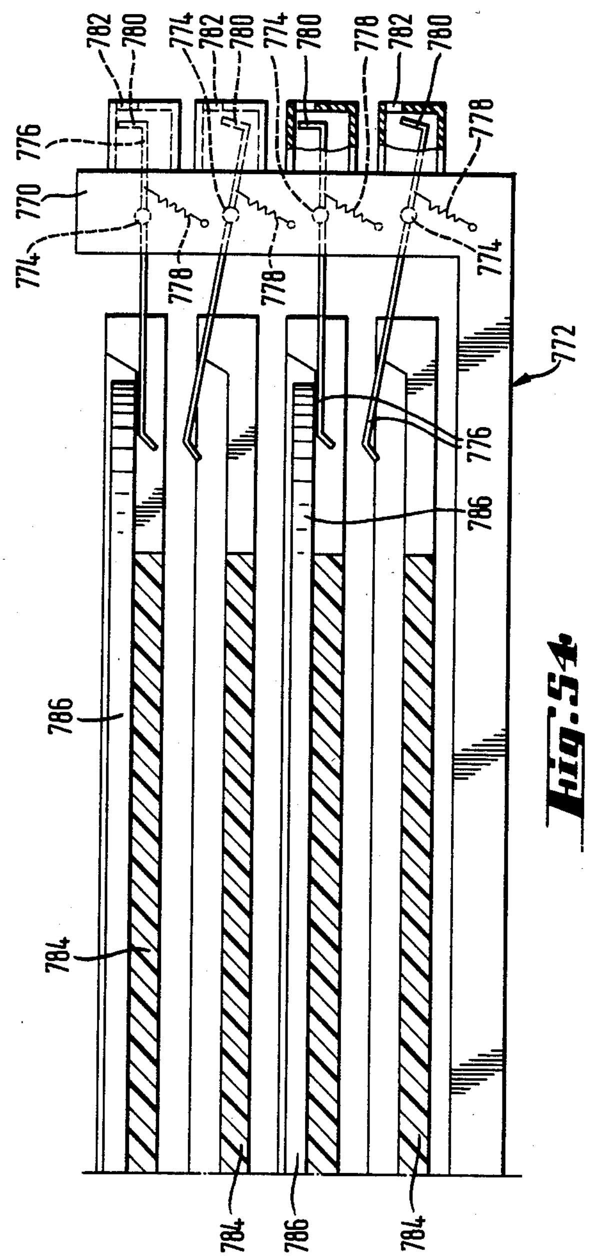
FIG. 54 is a partial, cross-sectional schematic side elevation view which depicts a disc holder status indicator arrangement which may be employed in the present invention.

FIG. 54 schematically represents an indicating arrangement which may, for example, be incorporated in the embodiment of FIGS. 10-20 to enable the presence or absence of a disc on the holders to be determined visually. In the arrangement of FIG. 54 the front wall 770 of slider member 772 pivotally supports a plurality of signal levers 776. The levers 776 are capable of rotation about axes 774 which are parallel to front wall 770. The lever 776 are biased to the "empty" position by springs 778. In the "empty" position, a "signal angle" 780, which extends from the forwardly disposed ends of each of the levers 776, is not visible through a window 782. The springs 778 are sufficiently weak that the signal levers will be pivoted against the bias thereof by the weight of a disc 786 placed on a holder 784. The "signal angle" 780 of the lever 776 associated with a holder which has a record disc 786 disposed thereon will be visible through the window 780.

FIGS. 55-59 schematically represent an embodiment of the present invention in which the selector buttons are arranged on a front side panel of a transporter and may be rotated out of the path of movement of the transporter along with the transporter front wall in order to facilitate access to the disc carried by a selected holder. Thus, referring to FIG. 55, the slider or transporter is indicated generally at 800 and includes a top cover panel 802 and a pair of side panels 804. The side panels 804 define, by appropriate means such as guide channels 862, the path of movement of recording media carrier members 806. The side walls 804 of the slider are provided with extensions of reduced thickness so as to accommodate arms 808 which extend from the slider front wall 810, the arms 808 being pivotally connected to the slider side wall extensions. The selector buttons 812 which are associated with respective of the carrier members 806 are carried by the front wall 810. At the end opposite to front wall 812, and at the level of the cover panel 802, the slider is provided with a double leaf spring arrangement 814 which biases the slider to the ejected position which is shown in FIG. 59, FIG. 59 also depicting a housing 816 for the slider.

Figure 55:
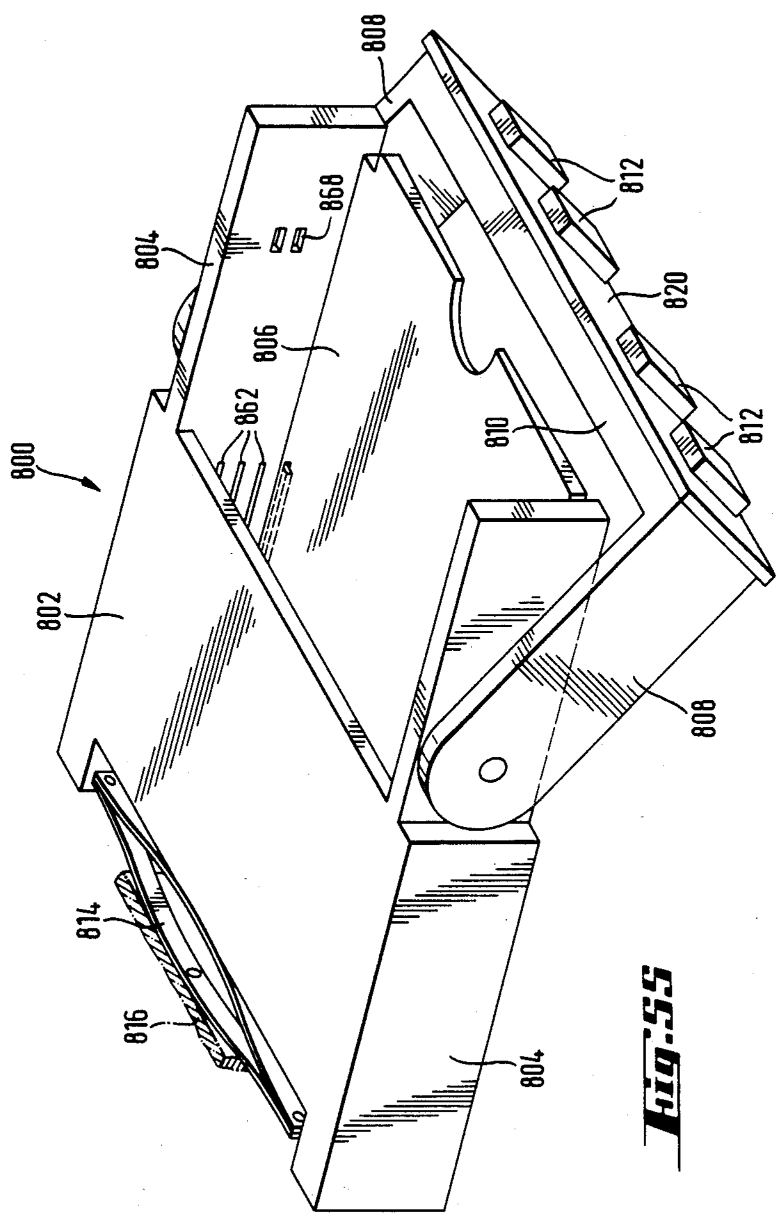
Figure 56:
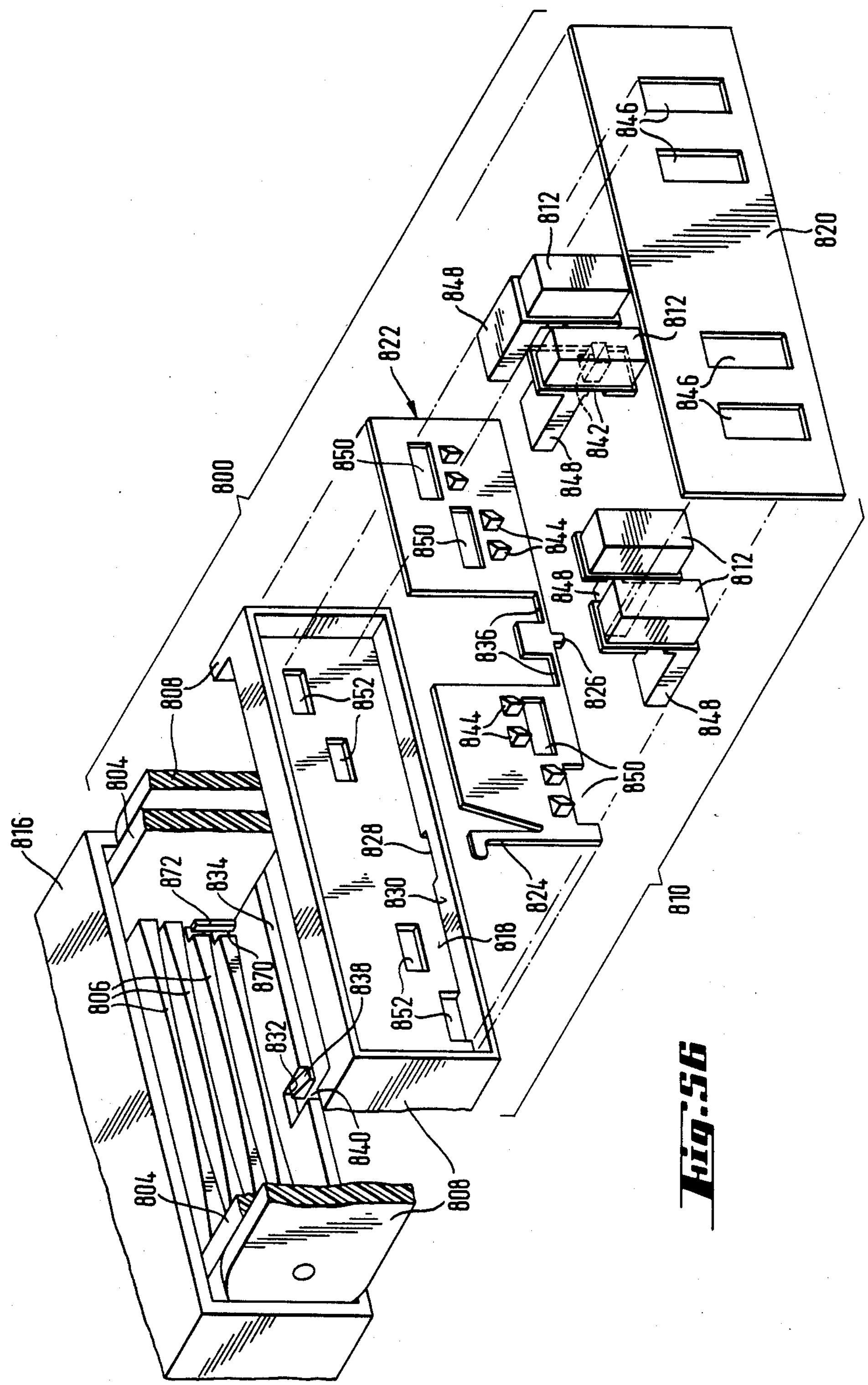

FIG. 56 is a partial exploded view of the slider of FIG. 55, a portion of the housing 816 and the locking mechanism for the slider also being shown.

The selector buttons 812 perform two functions. Firstly, they cause coupling of a selected carrier member 806 to the side walls 804 of slider 800. Secondly, the selector buttons cause the unlocking of the locking system whereupon the slider 800 may be ejected from housing 816 under the influence of the biasing spring system 814.

Continuing to refer to FIG. 56, an inner plate 818 and a cover plate 820 cooperating to define a space in the front wall 810 of slider 800. A slide lock 822 is housed within this space and is transversely displacable. The slide lock 822 is held in the locking position by means of an integral return spring 824. When the slide lock 822 is in the locked position, an integral catch 826 is engaged behind a locking edge 832 in the floor 834 of housing 816, catch 826 extending through a hole 828 in a base member 830 which interconnects the inner plate 818 and the cover plate 820. The catch 826, because of the resiliency of the connecting bars 836 to either side thereof, may be deflected upwardly relative to the remainder of slide lock 822 when the slider 800 is pushed into housing 816. This upward deflection results from the camming action of an inclined wedge surface 838 on floor 834 of housing 816. In order to unlock the slider 800, the catch 826 must be displaced transversely which, of course, requires that the slide lock 822 also be displaced transversely against the bias of the return spring 824. Such transverse motion will free catch 826 from the locked position behind edge 832, i.e., the catch 826 is free to move forwardly along the cutout 840 formed in the floor of the housing.

Each of the selector buttons 812 can be employed to cause the transverse unlocking displacement of the slide lock 822. The transverse displacement of the slide lock results from cooperation between integral wedge surfaces 842 on the buttons and counter-wedges 844 on the slide lock 822. Thus, when the buttons 812, the buttons being guided in apertures 846 in cover plate 820, are pushed inwardly the wedge surfaces on the buttons, which cannot move transversely, will contact the complementary wedge surfaces 844 on the slide lock and drive the slide lock in the appropriate direction. The cooperating wedging surfaces 842/844 are staggered in height from button to button in order to allow alignment of the control finger 848 of each button with the corresponding carrier member 806. An aperture 850 in the slide lock 822 and an aligned aperture 852 in the inner plate 818 provide for passage of the control fingers which cause the mechanical coupling between the slider and the selected carrier member.

FIG. 57 is a top plan view of the embodiment of FIGS. 55-61 taken at the level of the lowest or second lowest disc carrier member. The carrier members 806 are of generally rectangular shape, when viewed from above. Considering the carrier shown in FIG. 57, a projection 854 is provided in the corner which is disposed the greatest distance away from the selector button associated with the carrier member. The projection 854 has a knife-edge shape and functions as a pivot bearing. An integral return spring 856 is provided at the opposite corner of the inner edge of the carrier member. A friction brake 858 is positioned between knife-edge 854 and spring 856, the friction brake 858 corresponding to the frictional coupling arrangement described above in the discussion of FIGS. 10-12. The profile of the friction brake 858 may clearly be seen from FIG. 59. The profile of the carrier members, as may be seen from FIG. 58, is concave at least on the recording media supporting surface.

Integral ribs 860 extend outwardly from the side edges of the carrier members 806. The ribs 860 are received in the guide channels 862 of the carrier member side walls 804. A leaf spring 864, FIG. 57, is inserted in the guide channel which is most closely spaced to the selector button. The leaf springs 864 bias the carrier members into the rest position shown in FIG. 57. On the same side of the carrier member as the leaf spring 864 a drive projection or tooth 866 is provided. The drive tooth 866 is in registration with a drive aperture 868 in the side panel 804 of the carrier member. As may also be seen from FIG. 57, the carrier member with their ribs 860 have a fair degree of lateral play in the channels 862.

When pressure is exerted on the associated selector button, either the first or the second selector button 812 from the left in FIG. 57, the carrier member will pivot about the knife-edge 854 against the bias of its return spring 856. This pivoting motion causes the drive tooth 866 to move into the hole 868. Simultaneously, the front corner 870 located remotely from the selector button will be freed from a stationary stop 872. The slider member will now be unlocked and may begin to move forwardly under the influence of the biasing spring 814. During forward movemen the drive tooth 866 will be contacted by the trailing edge of the hole 868 and thus the selected carrier member will be caused to move along with the unlocked slider member. Since a mechanical connection is not established between the control finger 848 and its associated selected carrier member, the front wall 810 of the carrier is free to pivot downwardly about the pivot connection between its arms 808 and the extensions of the side walls 804 of the slider member 800. During reinsertion, the leaf spring 864 will press the carrier member back into the rest position. The stop 872 projects upwardly toward the lowest two carrier members while it projects downwardly in front of the corners of the carrier members for the upper two carrier members.

Figures 60, 61:
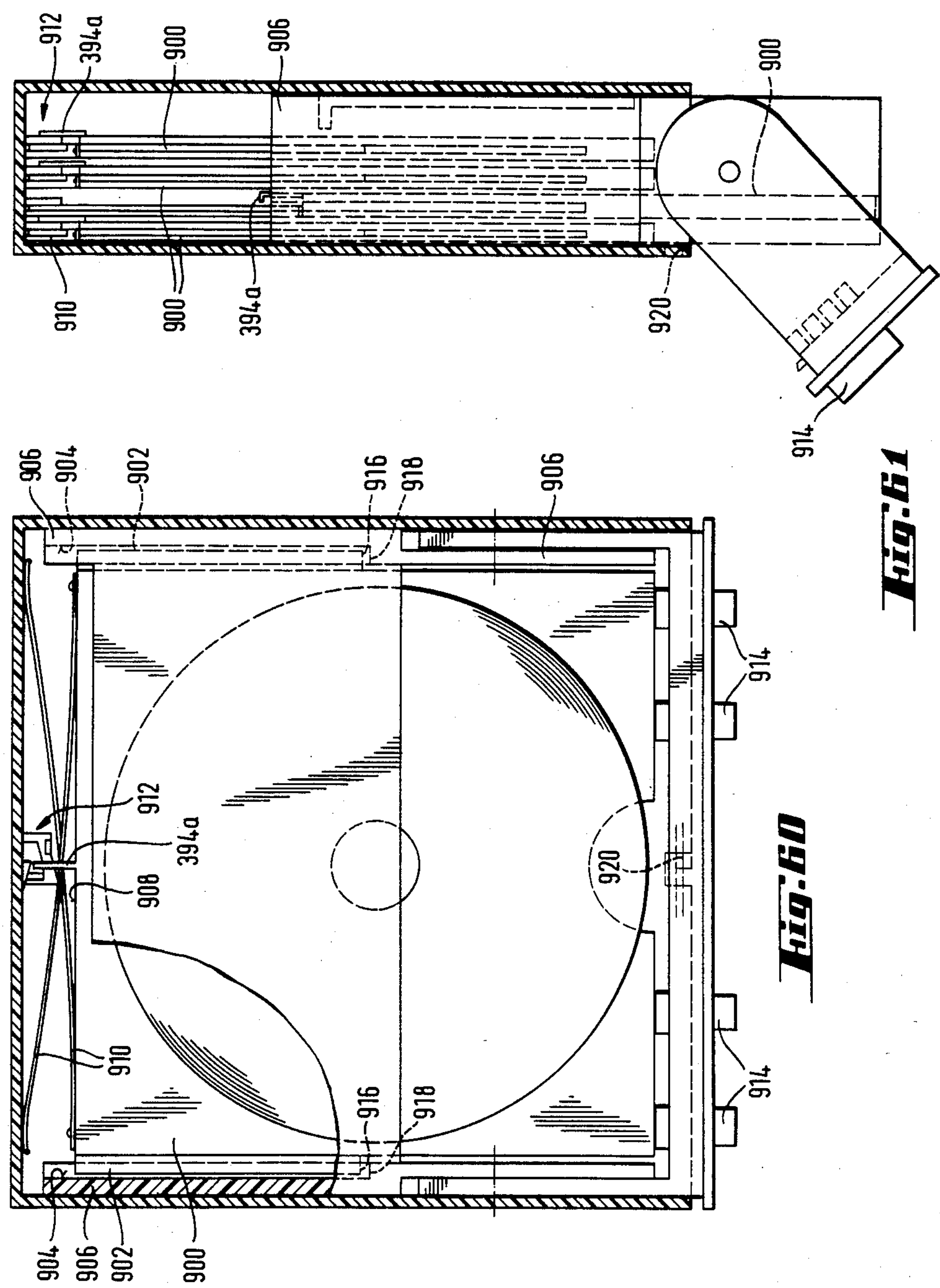
FIGS. 60 and 61 are respectively a schematic cross-sectional top plan view and a cross-sectional side elevation view of yet another embodiment of the present invention.

FIGS. 60 and 61 show schematically a further embodiment of the present invention, FIGS. 60 and 61 respectively being similar to the above-discussed FIGS. 57 and 59. In the embodiment of FIGS. 60 and 61 the slider member has a drop-down front wall and may be unlocked by inwardly directed pressure on any of the selector buttons 914. As in the case of the embodiment of FIGS. 55–59, each individual carrier member 900 is platter-like in construction and guided, by means of integral lateral ribs 902, in channels 904 formed in the side walls 906 of the slider member. An ejector spring arrangement 908 is mounted on the rear edge 908 of each individual carrier member, the ejector spring arrangements consisting of a pair of leaf springs 910. Each carrier member is also provided with its own locking system as indicated generally at 912. This locking system will be functionally equivalent to the locking system described above in the discussion of FIGS. 45–48. In the arrangement depicted in FIG. 60, however, the locking hook 394*a* is moulded integrally with the carrier member and is capable of deflection both vertically and horizontally. In operation, the carrier member associated with a depressed selector button 914 will be unlocked while all of the other carrier members will remain in the locked condition in the housing. During the forward motion of an unlocked carrier member, when the end faces 916 of its lateral guide ribs meet the end faces 918 of the guide channels 904, movement of the unlocked carrier member will be transmitted to the slider member which will also move forwardly. It will be understood by those skilled in the art that, in the region of the locking wedge 920 of the front wall of the slider member, sufficient clearance is provided to enable the over-travel which is necessary to accomplish locking upon reinsertion of the slider member and unlocked carrier member.

Figures 62, 63, 64:
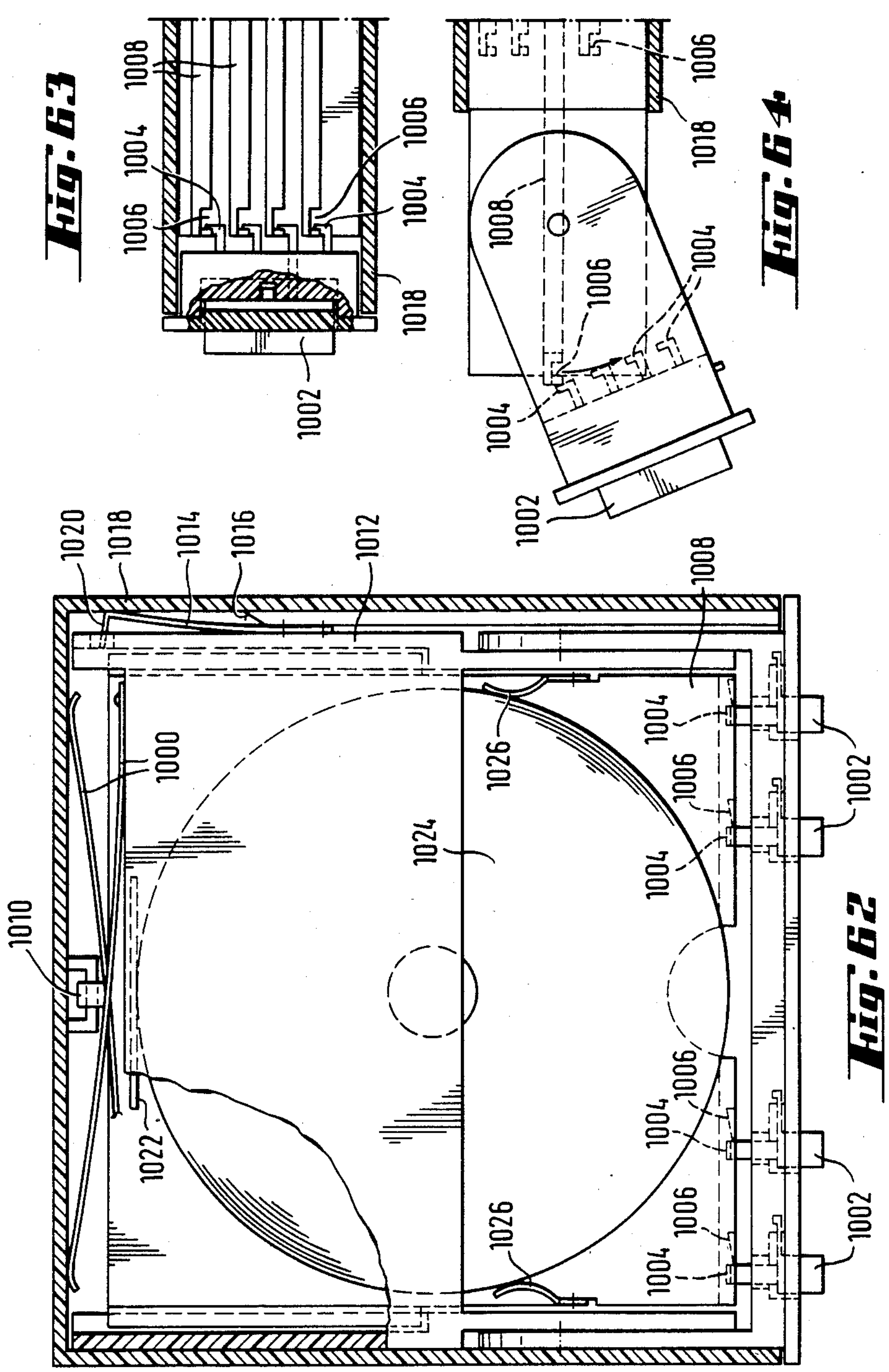
FIGS. 62–64 depict still another embodiment of the present invention, FIG. 62 being a schematic cross-sectional top plan view, FIG. 63 being a partial cross-sectional side elevation view, and FIG. 64 being a view similar to FIG. 63 showing the apparatus in a different state of operation.

The embodiment of FIGS. 62–64 is also similar to the embodiment described above in the discussion of FIGS. 55–59. Thus, FIG. 62 is a view analagous to that of FIG. 57. FIGS. 63 and 64 are partial vertical sections in the region of the front wall of the slider member which is shown respectively in the storage and removal positions, the front wall being pivoted downwardly in the removal position.

As described above, the slider member has an ejector spring system 1000. The slider member is also provided with a locking arrangement, similar to that shown in FIG. 56. However, in the embodiment of FIG. 62–64 the selector buttons 1002 pivot about an axis which is perpendicular to the planes defined by the carrier members rather than executing a sliding movement. When the selector buttons pivot, the coupling hooks 1004 which extend therefrom engage coupling recesses 1006 in the underside of the carrier members 1008, this arrangement being most easily seen from FIG. 64 wherein the second carrier member 1008 from the bottom has been ejected from the housing. The coupling hooks 1004 are staggered in height from button-to-button. A friction brake 1001, corresponding to that shown in FIGS. 55–59, is associated with each carrier member 1008.

The individual carrier members 1008 are provided, in their respective front edges, with recesses which allow passage of those coupling hooks 1004 which are associated with carrier members located higher in the "stack" when the front wall of the slider member pivots downwardly. The coupling hook 1004 associated with the selected carrier member will, when the front wall of the slider pivots downwardly, disengage from the coupling recess 1006 and thus provision must be made to insure that the forward movement of the selected carrier member does not terminate before the fully ejected position is achieved. This is accomplished by providing, on the outside of one of the side walls 1012 of the slider member, a leaf spring 1014 for each carrier member. When the slider and a selected carrier member begin to move in the forward direction, the leaf spring 104 will, through cooperation with a control wedge 1016 on the inside of housing 1018, pivot inwardly so that an angled portion 1020 of the spring will engage the selected carrier member from behind.

A low end wall 1022 will be provided on each of the carrier members 1008. A compact disc 1024 will contact the end wall 1022 when inserted on to the carrier member, the end wall 1022 thus determining the limit of insertion of the disc 1024. In addition, each carrier member carries a pair of lateral leaf springs 1026, arranged in the front half of the carrier member, which are deflected by the disc during insertion. The leaf springs 1026 are shaped and positioned such that, after the maximum diameter of the disc passes the springs during insertion, the springs will insert a inwardly directed force against the edge of the disc 1024 which both aids insertion and holds the disc on the carrier so that it will not move forwardly during the ejection procedure. It will be understood that the end wall 1022 and the capture springs 1026 may be employed in various of the other above-described embodiments.

Figures 65, 66, 67:
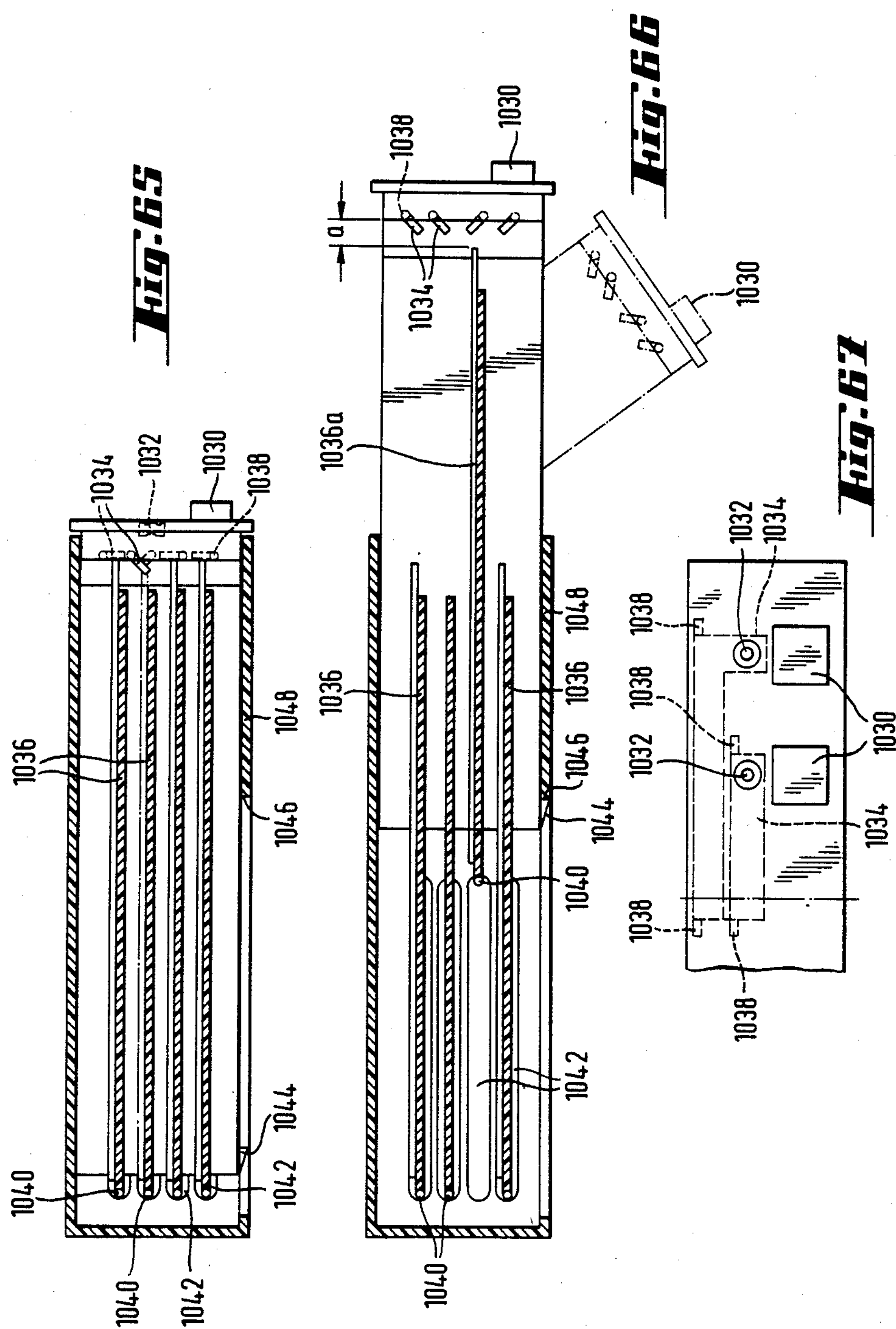
FIGS. 65–67 schematically represent a further manner of providing a disc holder status indication for use in the present invention, FIG. 65 being a cross-sectional side elevation view with the transporter in the inserted state, FIG. 66 being a view similar to FIG. 65 with the transporter in the ejected state and FIG. 67 being a partial front plan view.

FIGS. 65–67 schematically show another embodiment of an indicator system which may be employed in the present invention, and particularly an transport slider member which has a pivotal front wall. FIG. 67 is a partial front view of the slider member front wall which shows selector buttons 1030 which have, associated therewith, lenses 1032. Signal flags 1034 appear behind the lenses 1032 when the disc holders or carrier members associated with the selector button positioned immediately below the lens is carrying a disc. The signal flags 1034 are subjected to an inwardly directed spring bias and, when the slider member is inserted, the signal flags come to rest in the center of their corresponding carrier member against the furthest projecting edge of a disc, if present. Otherwise, the signal flags will pivot inwardly. The signal flags 1034 are pivotal about bearings 1038. FIG. 65 diagramatically depicts the condition where three of the carrier members have been loaded with discs while one of the carrier members remains unloaded.

In order to insure that those signal flags 1034 which are situated above a carrier member **1036*a* which has been moved to the ejected position may drop downwardly when the slider member is in the extended position, the path of travel of the slider member is made to be slightly longer than that of the carrier members. The carrier members are provided with lateral studs 1040 which run in stationary channels 1042 until they contact stops. The slider member, on the other hand, is provided with a stop 1044 which arrests movement of the slider member when it contacts a counterstop 1046 in the floor of the housing 1048**.

Figure 68:
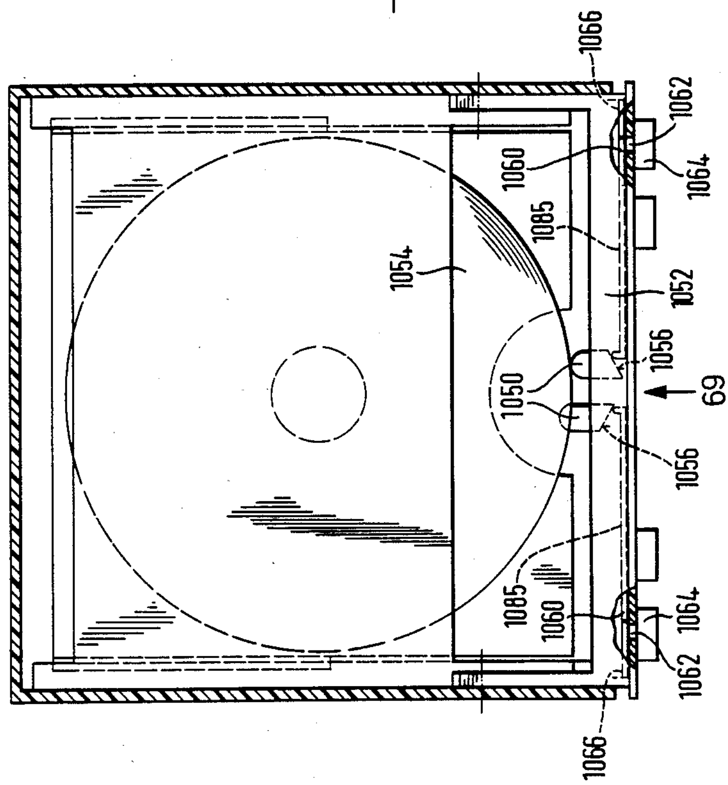
FIGS. 68 and 69 show another technique for providing a disc holder status indication in accordance with the present invention, FIG. 68 being a schematic cross-sectional top plan view and FIG. 69 being a schematic front elevation view.
Figure 69:
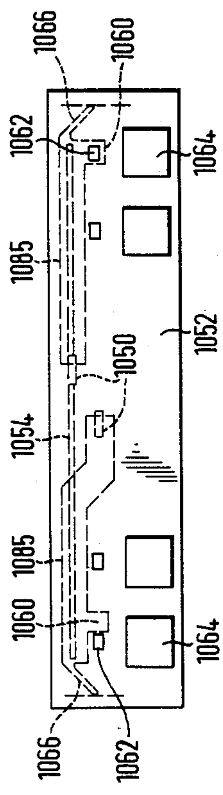

FIGS. 68 and 69 schematically represent an alternative possibility for providing an indication of the state of loading of the carrier members. In this further alternative feeler fingers 1050 are supported so as to be inwardly displaceable in the slider member front wall 1052. Thus, when the inwardly disposed ends of the feelers 1050 contact the edge of a disc 1054, the feelers will be moved toward the front face of front wall 1052. This forward movement will be transmitted to a flag 1050 via the wedge surface 1056 of the feeler. The flag 1058 will thus be caused to move in a direction transverse to the direction of movement of the slider member whereupon the signal portion 1060 of the flag 1058 will appear behind a window 1062. The windows 1062 will be positioned immediately above the selector button 1064 for the corresponding carrier member. Return springs 1066 bias the feelers 1050 to the "empty" position. As in the above-described embodiments, the front wall 1052 of the slider member may pivot downwardly without disrupting the ability to provide an indication of the loading state of the carrier members.

Figure 70:
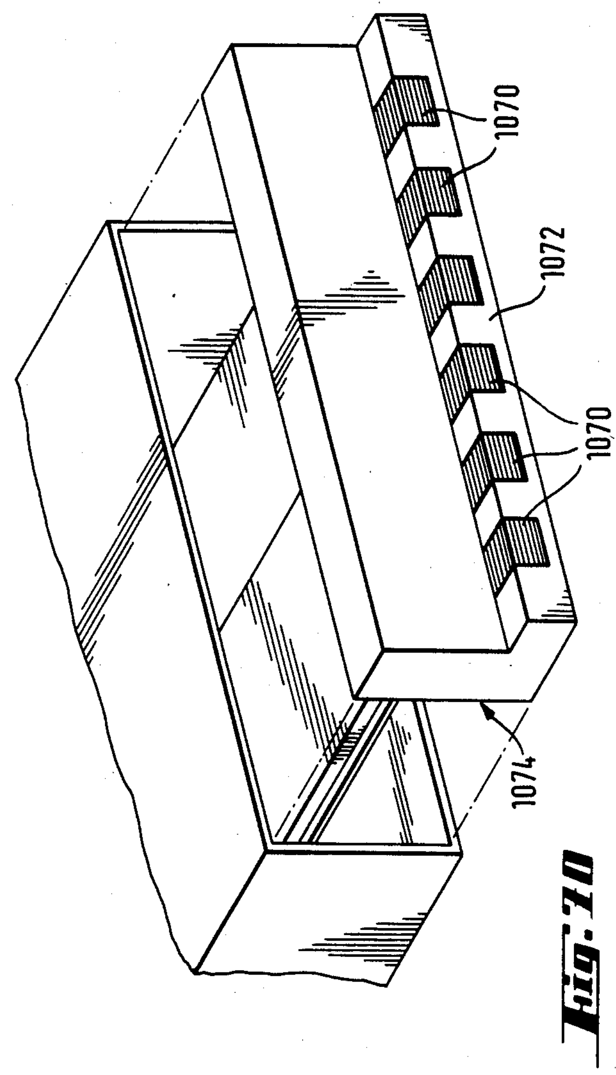
FIG. 70 is a perspective view of an alternative selector panel arrangement in accordance with the present invention.

When the storage apparatus is closed by pushing the slider member inwardly, care must be taken to insure that a selector button is not accidentally actuated. One way to minimize the possibility of accidental actuation of a selector button is shown in FIG. 70. In the construction depicted in FIG. 70 the selector buttons 1070 are embedded in a ledge 1072 which projects from the front wall 1074 of the transport slider member. Thus, during insertion, the user can press on the front face of the ledge 1072 with the flat of the hand whereas, to cause ejection of a carrier member, the appropriate selector button 1070 must be identified and operated with a finger.

Figure 71:
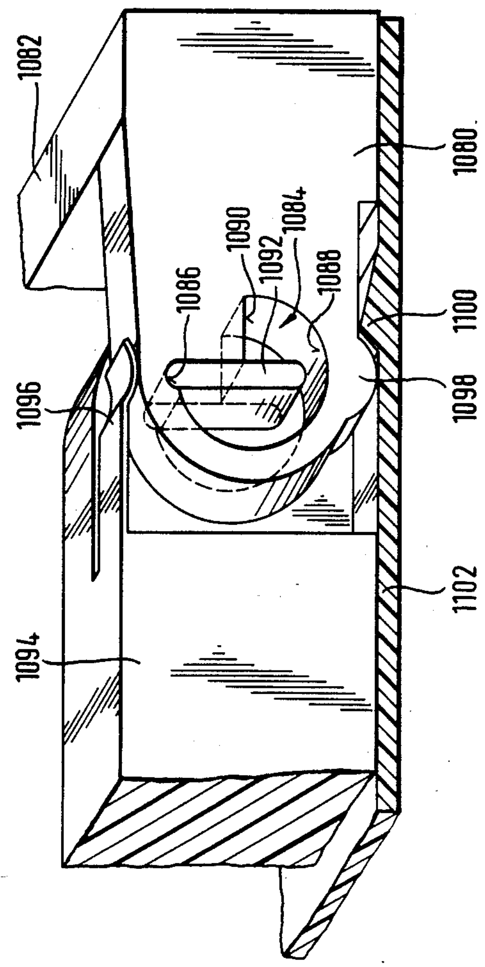
FIG. 71 is a partial perspective view of a pivot arrangement which may be employed in those embodiments of the present invention wherein the transporter has a movable front panel.

In the above description of the embodiments of FIGS. 55–69 the manner in which the pivotal slider member front wall was articulated to the side walls thereof was not described in detail. FIG. 71 is a partial perspective view of a preferred articulated connection between the arms 1080 of the front wall 1082 of a transport slider member and the side walls 1094 of the slider member. The articulated connection of FIG. 71 has the characteristic that, when the front wall is raised so as to be in alignment with the housing access opening, it will remain in the raised position.

To discuss FIG. 71 in detail, the articulated arm 1080 extending from the front wall 1082 of the slider member is provided with an aperture 1084 which defines a locking groove 1086, a "roll" path 1088 and a stop 1090. The bearing block 1092, which extends outwardly from the side wall 1094 of the slider member, is constructed so as to have a shape which complements that of the locking groove 1086, i.e., bearing block 1092 is elongated and has rounded ends. A spring 1096, which may be integral with side wall 1094, biases the arm 1080 downwardly so that the bearing block 1092 will be seated in the locking groove 1086 as shown. Thus, to free the arm 1080 from the locked position in which it is shown, the bias of spring 1096 must be overcome. This is accomplished by provision of a control cam 1098 on the lower exterior of arm 1080. Control cam 1098 cooperates with a control wedge 1100 which is formed on the housing 1102. As the slider member moves in the ejection direction, the inwardly disposed end of arm 1080 will be cammed upwardly against the bias of spring 1096 and, since the cam 1098 exerts a braking effect, the arm 1080 will begin to pivot downwardly as the front wall 1082 moves out of the housing entrance aperture in the ejection direction. With the bearing block 1092 unlocked from the locking groove 1086, the front wall 1082 is free to rotate downwardly. During such rotation the roll path 1088 of the aperture 1084 will move along the rounded ends of the bearing block 1092 until such time as the stop 1090 contacts the broad side face of bearing block 1092. When front wall 1082 is lifted manually, to begin reinsertion, the groove 1086 will be caused to again engage bearing block 1092 and thus the front wall 1082 will remain in the raised position during reinsertion.

Figure 72:
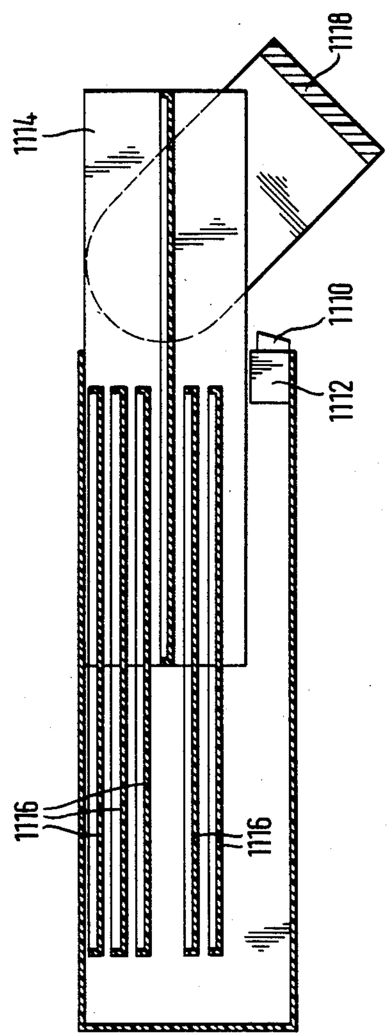
FIG. 72 is a schematic cross-sectional side elevation view of another embodiment of the present invention.
Figure 73:
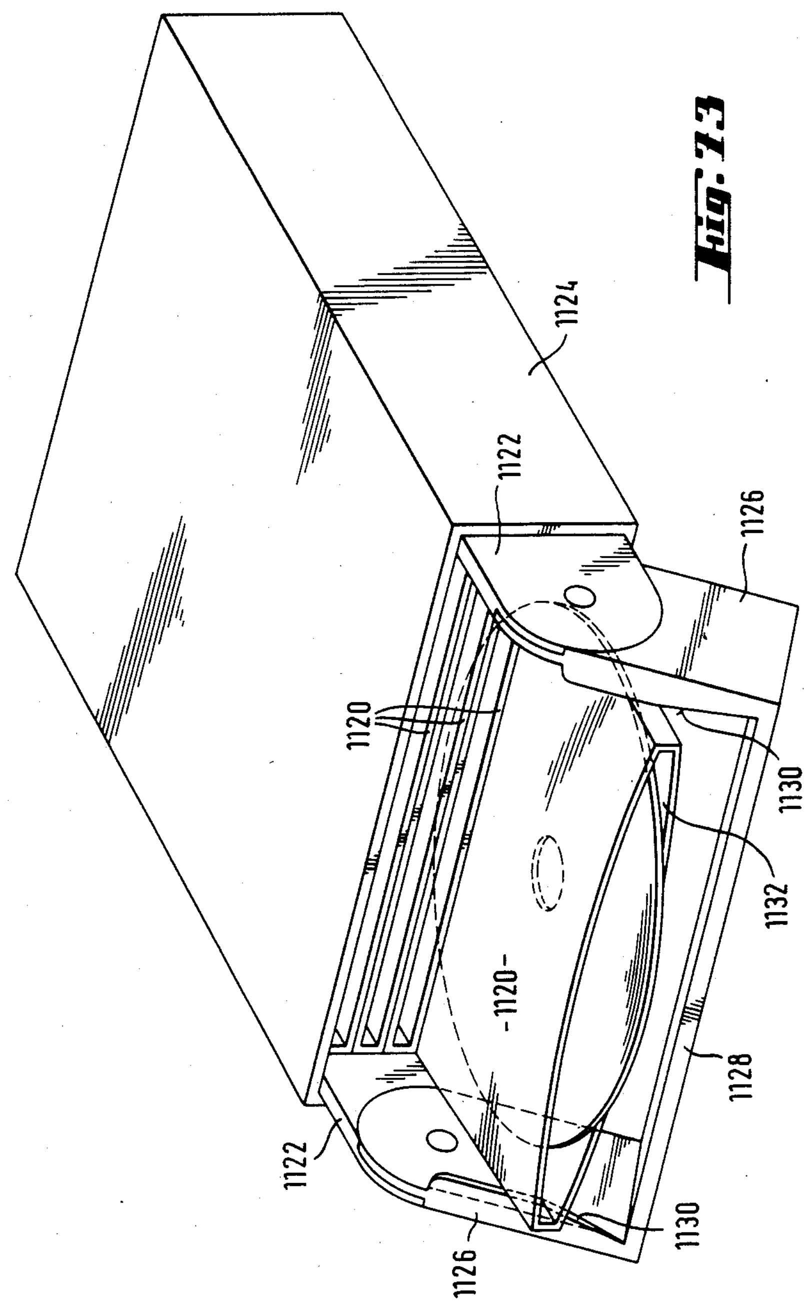
FIG. 73 is a perspective view of still another embodiment of the present invention.

As should now be obvious to those.skilled in the art, in the interest of convenience of use a record disc storage container in accordance with the present invention may be provided with a front wall which can pivot downwardly. The provision of a pivotal front wall, which carries the selector buttons and may also include loading signal indicators, does however add some complexity to the apparatus. In the embodiment of FIG. 72 the selector buttons 1110 are arranged in a housing plinth 1112 which is situated below the base of the slider member 1114, the slider member having a drop down front wall 1118 and, in the manner described above, being selectively coupled to carrier members 1116. The arrangement shown generally in FIG. 72 may be implemented in the above-described embodiments and thus means for unlocking and means for coupling the slider member to a chosen carrier member in response to operation of a selector button will not be described herein. It is to be noted that the arrangement of FIG. 72 is particularly well-suited for use with a storage magazine of the type shown in FIG. 73, the housing plinth and bank of selector buttons not being visible in FIG. 73. Each carrier member 1120 of the FIG. 73 embodiment is constructed as a pocket defined by elastically deformable material. The slider member 1122 transports the selected pocket out of the housing 1124. The slider member is provided with a pair of articulated arms 1126 which are joined by a front wall or bar 1128. The arms 1126 have wedge-shaped cam portions 1130 which, when the front wall 1128 is pivoted downwardly, exert lateral pressure on the carrier member 1120 to spread open its insertion slot 1132 which guides a compact disc into the pocket.

The employment of a pocket constructed of a resilient material, i.e., a "funnel", to facilitate insertion of a disc is particularly desirable when the storage apparatus is to be employed in a "standing" position, i.e., when the slider member and/or the carrier members are to be moved vertically.

Figure 46:
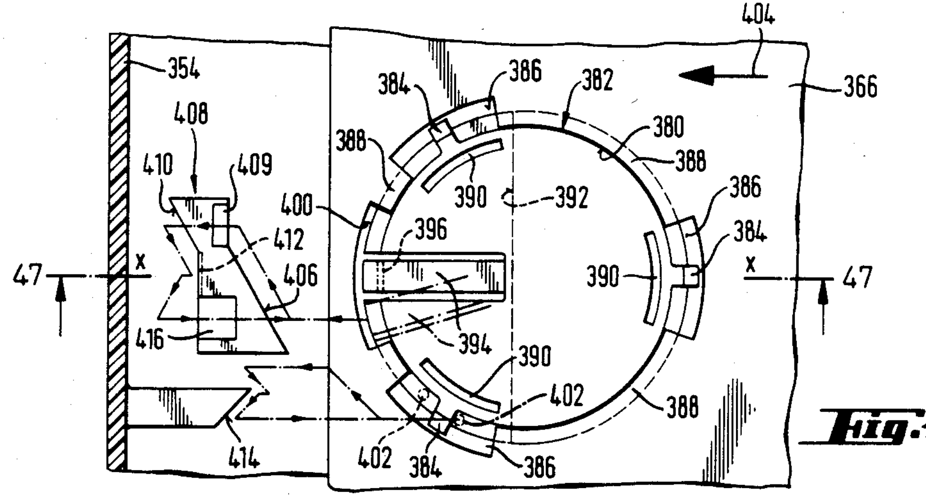
Figures 74, 75, 76, 77:
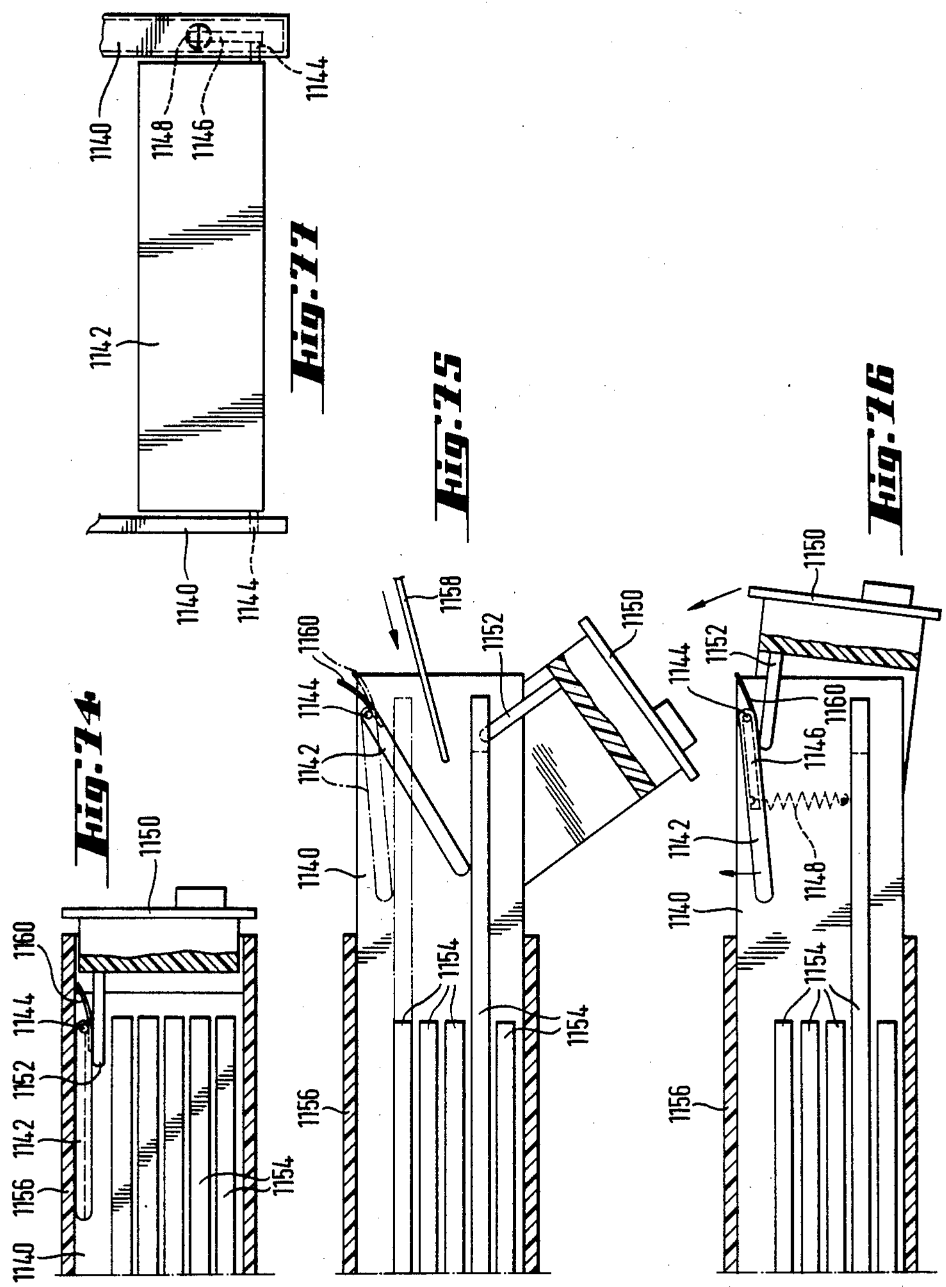
FIGS. 74–77 schematically represent the provision of a guide for aiding disc insertion which may be incorporated in the present invention, FIG. 74 being a partial view with the transporter inserted, FIG. 75 being a partial view with the transporter ejected, FIG. 76 being a partial view similar to FIG. 74 and 75 with the transporter front panel in an intermediate position, and FIG. 77 being a partial top plan view.

The guiding of discs during their insertion onto a carrier member can also be implemented in the manner depicted in FIGS. 74–46. FIGS. 74–76 are schematic, partial vertical section views of a disc storage container in accordance with the present invention with the slider member being shown in different positions. FIG. 77 is a schematic plan view of the slider member of the embodiment of FIGS. 74–76 with the front wall removed.

The slider member of the embodiment of FIGS. 74–77 includes side plates 1140 and a guide plate 1142 which is pivotally supported, by means of journals 1144, from walls 1140. Guide plate 1142 is supported so that it may pivot about an axis which is parallel to the upper edge of the front wall 1150 of the slider member. Guide plate 1142 is biased, by a traction spring 1148, in the direction of the lower edge of the front wall 1150 of the slider member. The side of the guide plate which faces toward the inside of the housing has a concave disc-supporting surface as discussed above.

With the slider member in the inserted or storage position, a lever 1152 mounted on front wall 1150 of the slider member holds the guide plate 1142 against its spring bias parallel to the disc carrier members 1154. Accordingly, in the storage position the guide plate 1142 rests against the inside of the cover panel 1156 of the housing. When the front wall 1150 is pivoted downwardly, lever 1152 will pass through a slot in the carrier member or members thereby freeing the guide plate 1142. The thus freed guide plate will, under the influence of its biasing spring 1148, pivot until it comes to rest on the carrier member which has been conveyed out of the housing with the slider member. With the guide plate in this position, as shown in FIG. 75, a disc 1158 can be easily inserted with the guide plate 1142 defining a "funnel" which guides the insertion.

By comparison of the solid and broken line showings of FIG. 75 it may be seen that the "funnel" defined by the selected carrier member and the guide plate 1142 becomes narrower as successively higher carrier members in the stack are selected. It is therefore preferable for an additional guide plate 1160, which has been omitted from FIG. 77, to be provided. The additional guide plate 1160 opens resiliently outwardly and forms an extension of guide plate 1142.

When the slider member front wall 1150 is raised again, as shown in FIG. 76, the guide plate 1142 will be pivoted back into its rest position and the slider member can be reinserted in the housing together with the carrier members.

Figures 78, 79:
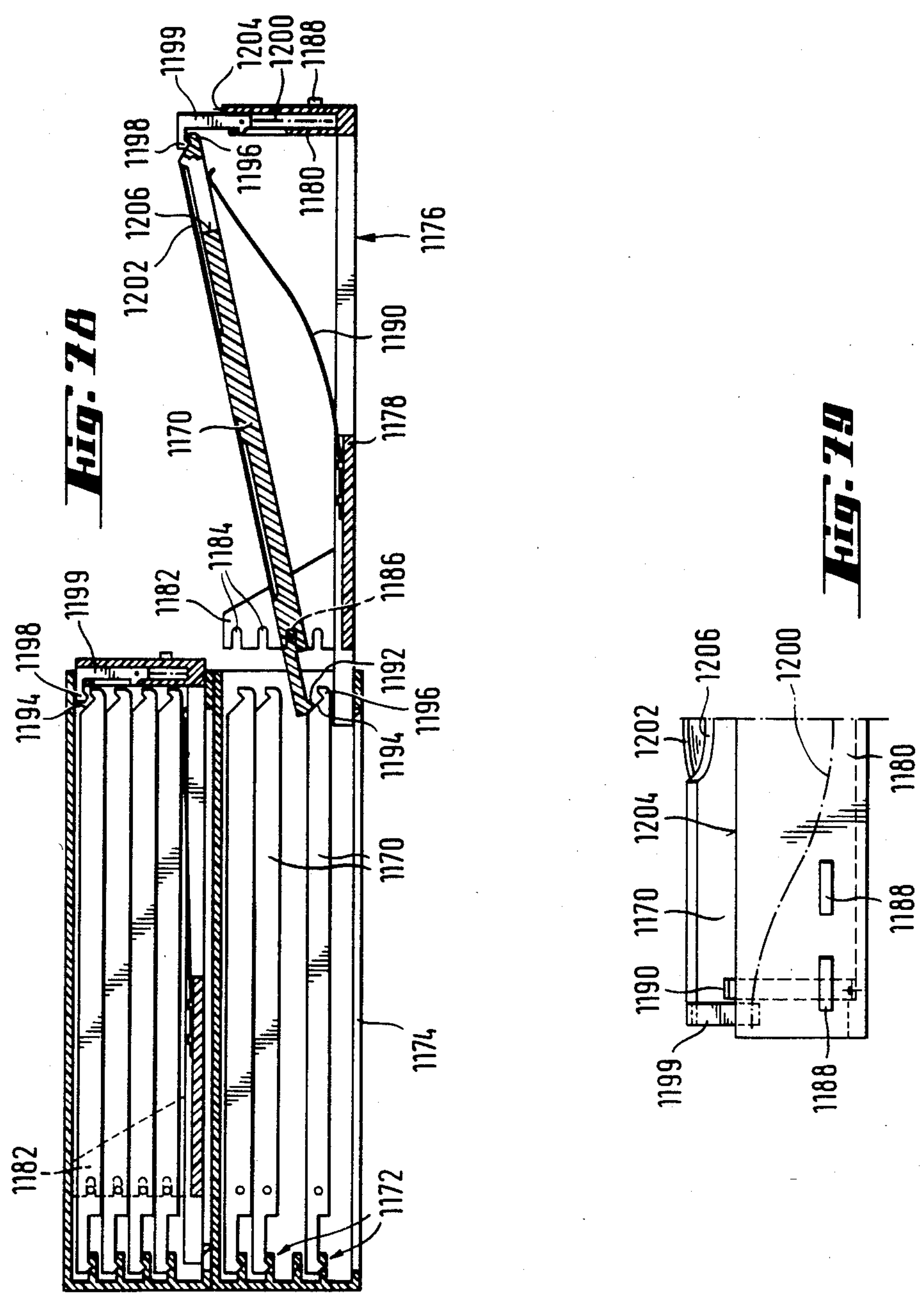
FIGS. 78 and 79 represent another embodiment of the present invention wherein the selected disc holder is pivotal, FIG. 78 being a schematic cross-sectional side elevation view and FIG. 79 being a partial front elevation view.

FIG. 78 and 79 schematically show a further embodiment of the present invention, respectively in longitudinal section and partial front sectional views. A the disc storage system is depicted in FIG. 78, two containers are stacked on top of one another, the slider member being in the inserted position in the upper container or housing and the slider member of the lower housing being in the ejected or disc removal position. The disc holders 1170 are generally platter-like and are held in housing 1174 by means of a frictional coupling system 1172 of the type described above. The slider member 1176 comprises a base 1178 and a front wall 1180. An ejector spring arrangement, not shown, engages the end face of the slider member base 1178 and urges the slider member in the ejection direction. The base 1178 of the slider member also supports, adjacent its most inwardly disposed end and a side thereof, a bearing block 1182 with bearing "eyes" 1184 which open toward the back of the carrier member. The carrier members are provided with bearing studs 1186 which are received in the "eyes" 1184.

The selector buttons 1188, mounted on front wall 1180, may be actuated to couple a selected carrier member to the slider member in, for example, the manner described above in the discussion of FIGS. 62–64. Thus, in the embodiment of FIGS. 78 and 79 the carrier members 1170 may be pivoted in an upward direction. This pivoting movement is produced by a leaf spring 1190 mounted on the base 1178 of the slider member. The pivoting motion occurs as soon as the end edge 1192 of the selected carrier member 1170 moves downwardly along a sloping surface 1194 of the underlying carrier member or, in the case of the lowermost carrier member, on a corresponding sloped surface in the floor of the housing (not shown). Lateral hooks 1196 on the front end of the carrier member, as a result of the pivoting motion thereof, will engage complementary shaped hooks 1198 formed on stop pieces 1199 that can be raised upwardly from inside of the slider member front wall 1180. The lateral stop pieces 1199 are biased into their retracted position by a spring 1200 which has been indicated by a broken line in FIG. 79. It is to be understood that the force of spring 1200 is matched to that of the leaf spring 1190. A disc 1202, carried by the ejected carrier member 1170, may be grasped on both sides above the upper edge 1204 of the front wall 1180 of the carrier member since the carrier member is provided with a cut-out 1206. Once grasped, the disc 1202 can be pulled forwardly from the carrier member. When the slider member is pushed back into the housing 1174 all of the above-described components return to their initial positions.

Figure 80:
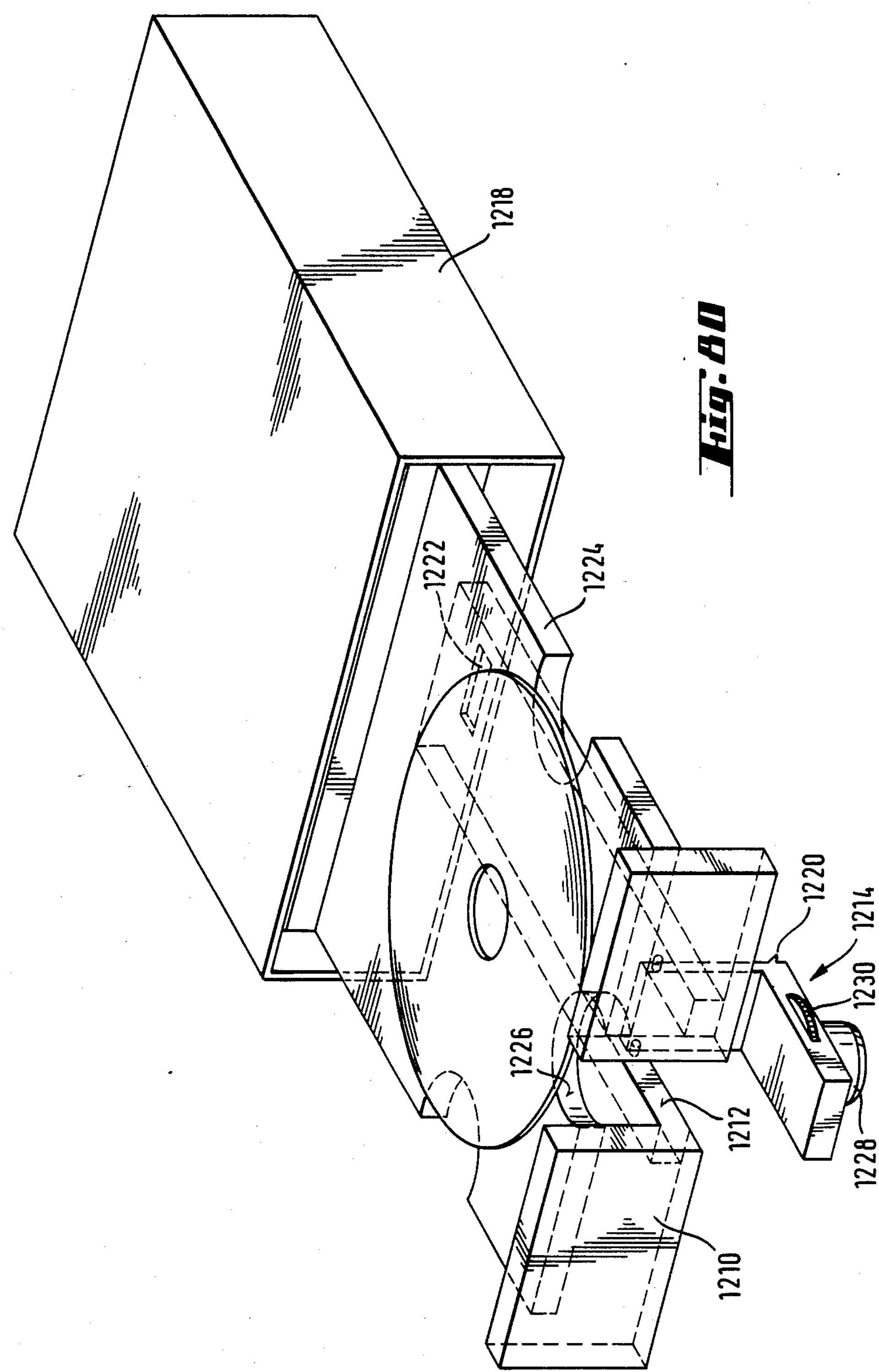
FIGS. 80–82 depict apparatus in accordance with another embodiment of the present invention.
Figures 81, 82:
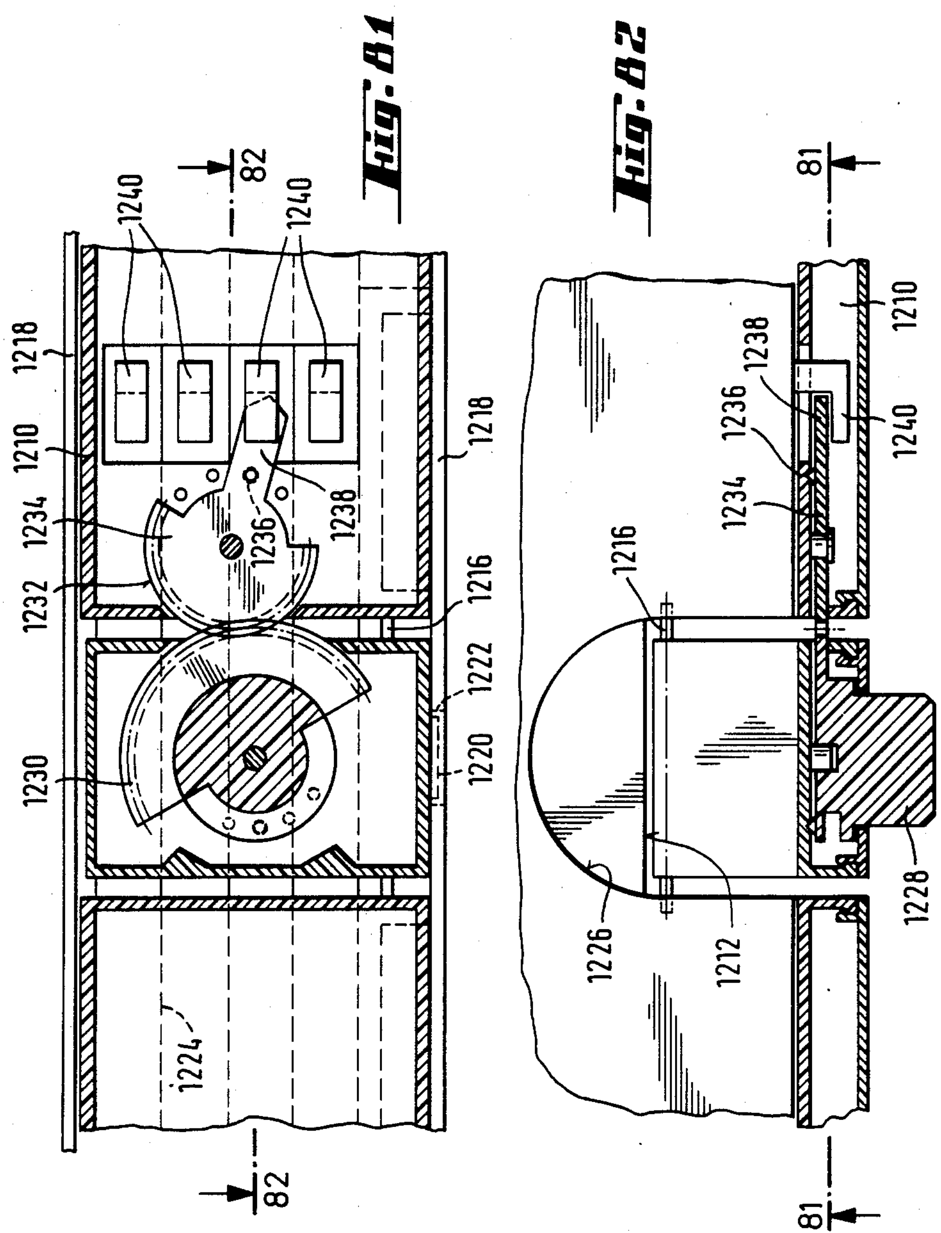
Figure 83:
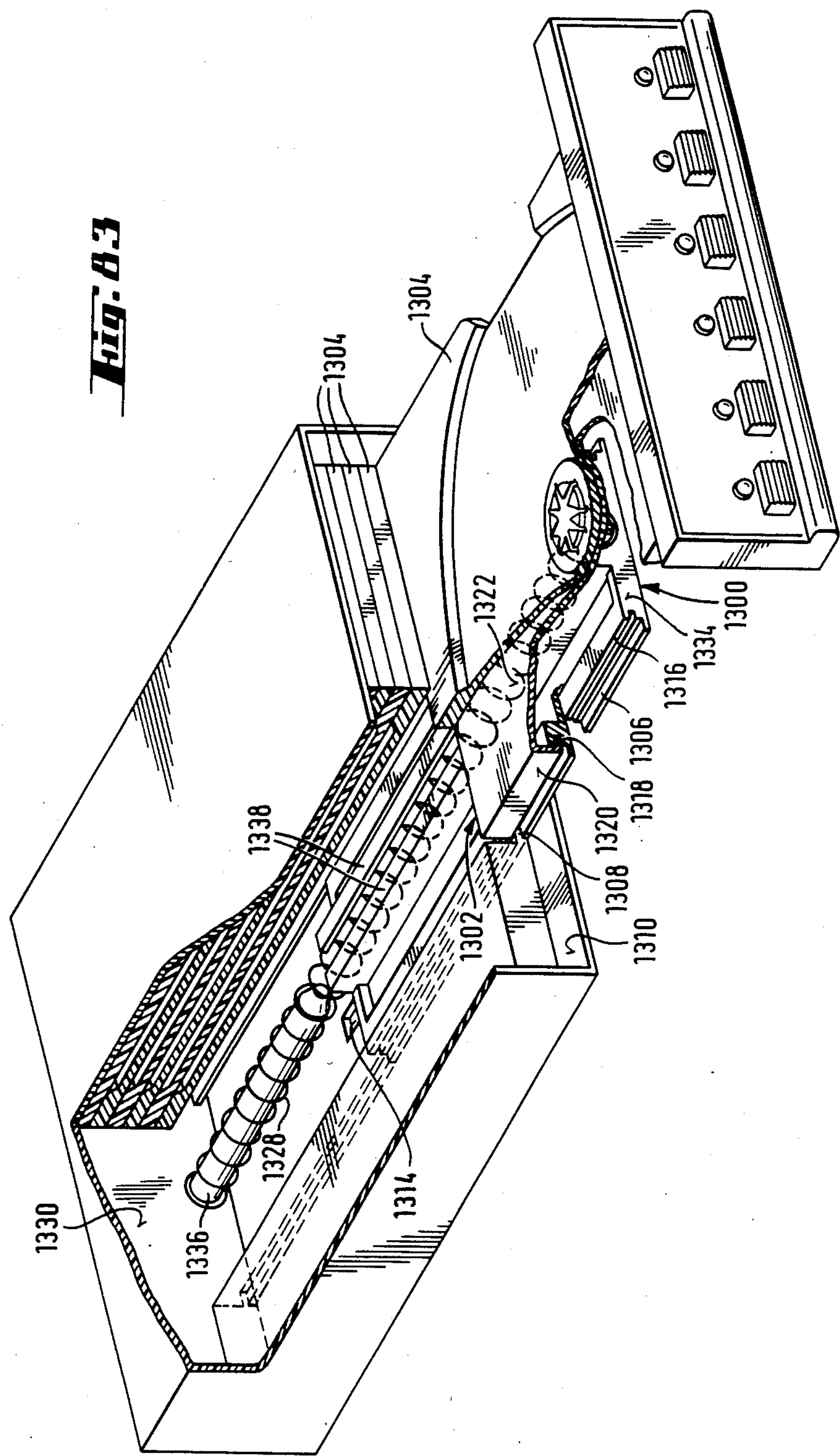
FIGS. 83–86 depict a transporter guide system which may be employed in the present invention.
Figures 84, 85, 86:
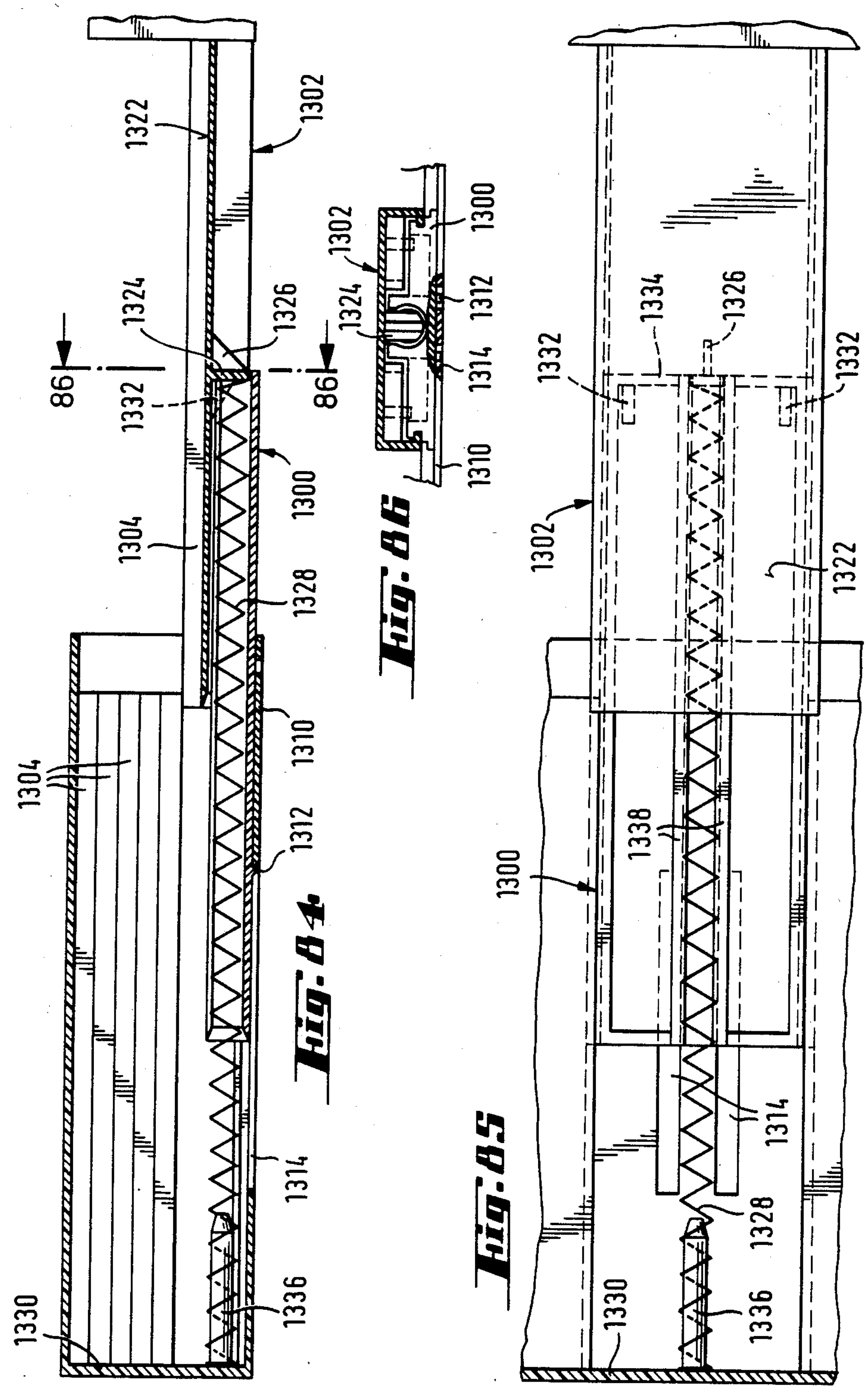

Referring now to FIGS. 80–82, another embodiment of the present invention is shown wherein the front wall 1210 of the transport slider member has a central cut-out portion which extends rearwardly into the base of the slider member, the rearward extension defining a slot 1212. A release button, indicated generally at 1214, in the form of an L-shaped insert is received in the cut-outs of the front wall and base of the slider member, the insert being hinged to the base of the slider member as indicated at 1226. When the button 1214 is in its raised position, and the slider member is pushed into the housing 1218, a locking lug 1220 in the base of button 1214 will engage a recess 1222 provided in the floor of the housing. The cooperation between locking lug 1220 and recess 1222 will lock the slider member against the bias of an ejection spring, not shown. The slider member is unlocked by manually urging the button 1214 upwardly. As the unlocked slider member moves out of housing 1218, the button 1214 will swing downwardly. A disc positioned on a carrier member which is moved out of housing 1218 along with the slider member may be grasped, and lifted upwardly, by reaching inwardly through the space which had been occupied by the button 1214. It will be understood, of course, that the carrier members will also each include a slot which is commensurate in size and shape with the slot 1212 in the base of the slider member.

In the embodiment of FIGS. 80–82 the selector arrangement comprises a selector knob 1228 which is mounted on the button 1214. The selector knob 1228 is rotatable into various locking positions. As may be seen from FIGS. 81 and 82, the selector knob 1228 is coupled to a toothed quadrant 1230. The toothed quadrant 1230, when the button 1214 is in its raised position, meshes with a toothed section 1232 of a pinion 1234 supported in the adjacent section of the front wall 1210 of the slider member. The pinion 1234 is provided with a detent 1236. A pointer 1238 will engage, from behind, a hook 1240 of a carrier member in each of the possible locking positions of selector knob 1228. Accordingly, the rotation of selector knob 1228 will couple the disc carrier members individually to the front wall 1210 of the transport slider member. When the button 1214 pivots downwardly, the quadrant 1230 will be disengaged from the pinion 1234 but both members will remain in position. Accordingly, when the button 1214 is again raised the quadrant and pinion will be reengaged.

FIGS. 83–99 show several guide and stop arrangements which may be employed in the present invention. These guide and stop arrangements, which will be described below, provide enhanced stability eve in the presence of components formed of thin-walled thermoplastic material.

Referring now to FIGS. 83–86, a telescopic guide arrangement is shown. This telescopic guide arrangement comprises an inner slider member 1300 and an outer slider member 1302. The inner slider member 1300 is, under the influence of the ejection spring arrangement, pushed approximately half way out of the housing when unlocked. The outer slider member 1302 travels a path which has a length of approximately twice that traveled by the inner slider member 1300. The outer slider member 1302 will be selectively coupled to the carrier members 1304 by means of one of the selector systems discussed above. The means by which the carrier members 1304 are guided in the housing is also as described above.

The inner slider member 1300 comprises a carriage which, by means of lateral runners 1306, engages guide rails 1308 formed on the floor 1310 of the housing. A pair of stop lugs 1312 project into slots 1314 in the housing floor from the runners 1306 and determine the limit of ejection travel of the inner slider member 1300. The inner slider member is also provided with guide rails 1316 which engage lateral runners 1318 on the outer slider member 1302. The guide rails 1316 are staggered slightly inwardly with respect to the guide rails 1308 on the housing floor. The lateral runners 1318 extend inwardly from low side walls 1320 of outer slider member 1302. The side walls 1320 are connected by means of a bridge member 1322. A lug 1324, which may be stiffened by a reinforcing angle 1326, projects downwardly from bridge 1322. A helical compression spring 1328 extends between lug 1324 and the rear wall 1330 of the housing. The ejection travel of the outer slider member 1302 is determined by means of a pair of stop lugs 1332 which cooperate with the inside of an end wall 1334 of the inner slider member 1300.

The spring 1328 is supported by means of an inner mandrel 1336 which projects forwardly from the rear wall 1330 of the housing. Spring 1328 is further supported by lateral ribs 1338 provided on the inner slider member 1300. Additional support for spring 1328 is provided by means of the bridge 1322 of the outer slider member 1302. It is thus virtually impossible for the spring 1328 to buckle and, accordingly, the force of the spring will be converted into linear motion of the slider member.

Figure 87:
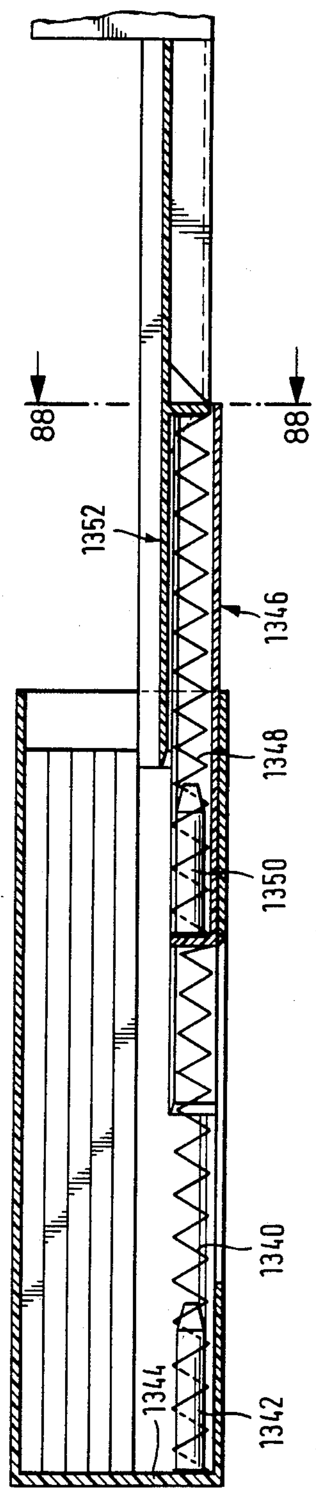
FIGS. 87–89 depict an alternative to the guide system of FIGS. 83–86.
Figure 88:
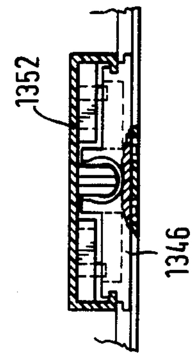
Figure 89:
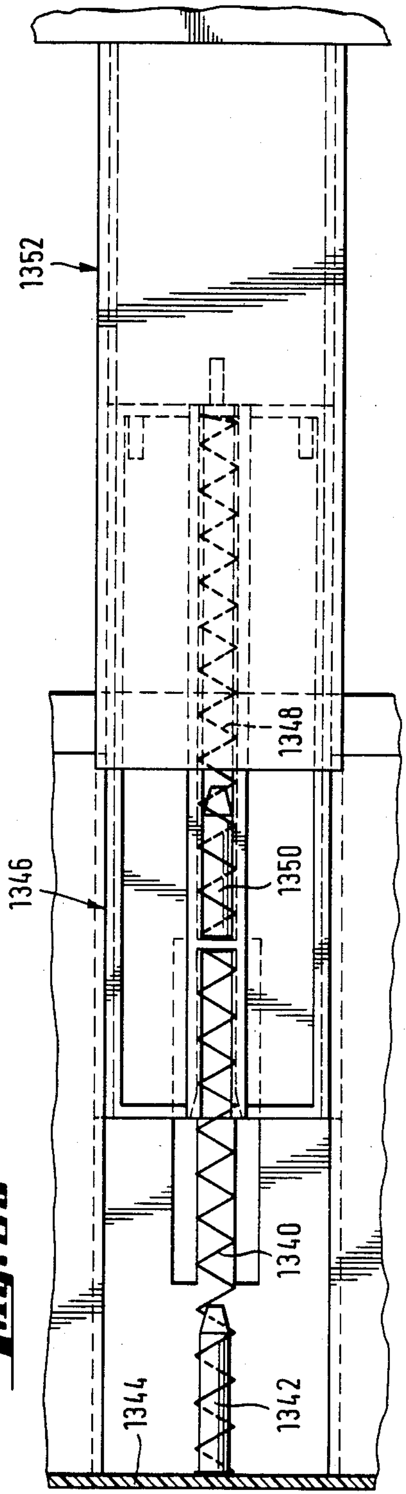

FIGS. 87–89 show a construction similar to that described above in the discussion of FIGS. 84–86. However, rather than employ a single ejection spring, the embodiment of FIGS. 87–89 employs a first spring 1340 supported on a mandrel 1342 and extending between the rear wall 1344 of the housing and the inner slider member 1346. The embodiment of FIGS. 87–89 further includes a second ejection spring 1348, supported on a mandrel 1350 which forms part of the inner slider member 1346. The spring 1348 extends between the rear wall of the inner slider member and a lug on the outer slider member 1352.

Figures 90, 91, 92:
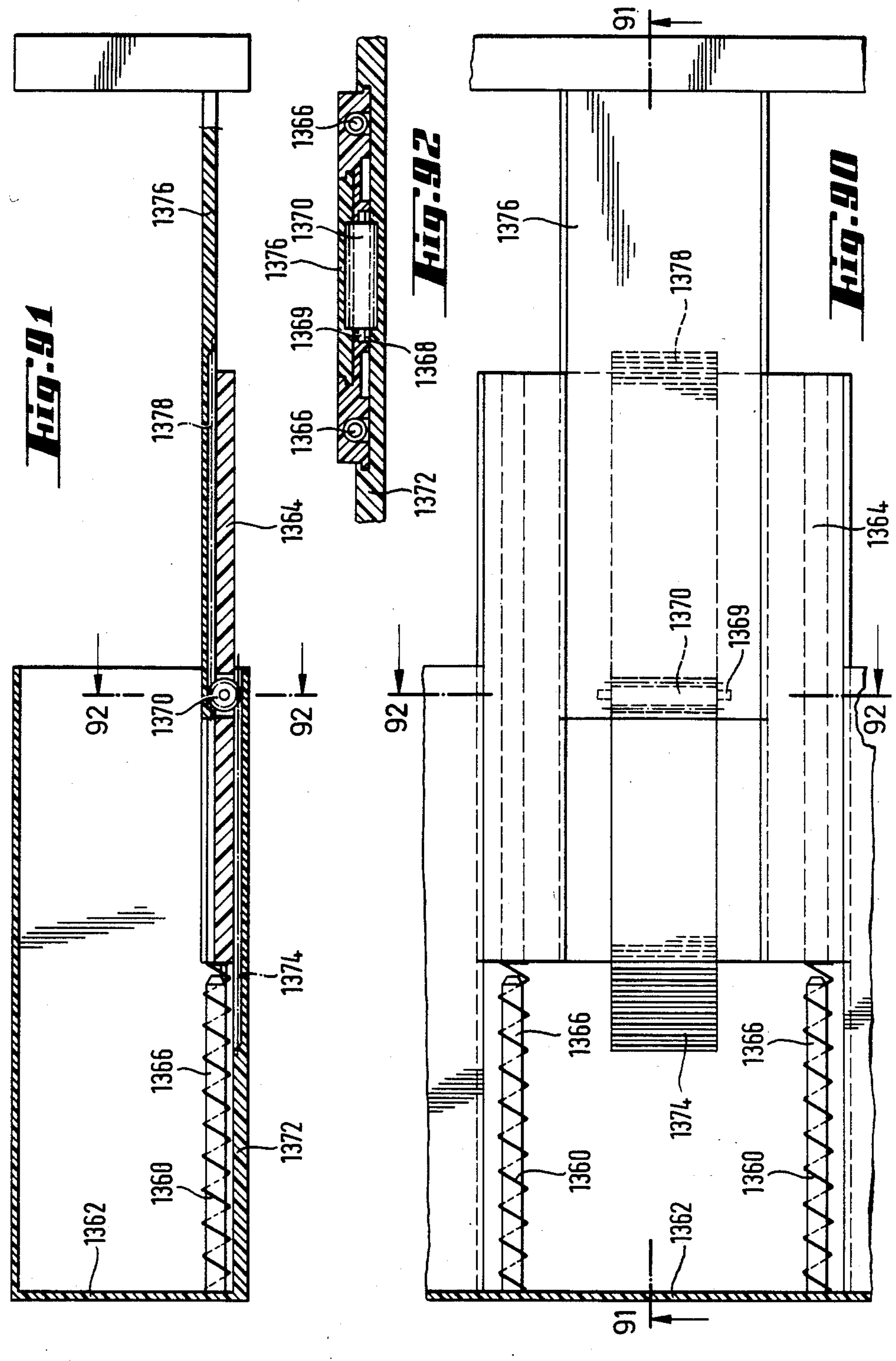
FIGS. 90–92 show yet another transporter guide system which may be employed in the present invention.

FIG. 90 shows, in a partial plan view, a further embodiment of the present invention. FIG. 91 is a vertical section through the embodiment of FIG. 90 while FIG. 92 is a partial cross-sectional view taken perpendicular to the view of FIG. 91, FIG. 92 being a view through the pinion axis of the apparatus. In the embodiment of FIGS. 90–92 a pair of helical compression springs 1360 extend between the rear wall 1362 of the housing and the facing rear wall of the inner slider member 1364. The springs 1360 are supported on mandrels 1366. The inner slider member has, near its center, a seat 1368 which receives the journals 1369 of a pinion 1370. The pionion 1370 meshes with a rack 1374 provided in the floor 1372 of the housing and with a further rack 1378 formed on the underside of the outer slider member 1376. The ejection travel limits are determined by the pinion reaching the end of the two racks with which it engages. The longitudinal guides, which include runners and rails, may be seen from FIG. 92.

In the above-described arrangements for guiding the transport slider member during its movement between the inserted and ejected positions, the various components which determine the path of motion are designed to resist bending and twisting and which securely determine the limits of the travel. FIGS. 93–96 show a further embodiment which retains these desirable characteristics and which has the further attributes of being easy to manufacture and having improved slider member mobility. FIG. 93 is a vertical section, with the disc carrier members omitted, FIG. 94 is a partial plan view, FIG. 95 is a sectional view taken along line 95—95 of FIG. 93 and FIG. 96 is a sectional view taken along line 96—96 of FIG. 95.

Continuing to refer to FIGS. 93–96, the housing 1380 and the transport slider member 1382 are moulded from relatively inexpensive plastic material which, accordingly, is characterized by relatively poor sliding characteristics, i.e., comparatively high friction. A sliding block 1384, comprised of a plastic material having a coeffecient of friction, is imbedded in the floor 1388 of the housing. During manufacture, the sliding block 1384 will be pushed in from on edge of the housing and will be anchored, by means of integral lugs 1386 which engage recesses 1390 in the housing floor. The sliding block 1384 defines guide rails 1394 which engage complementary shaped guide runners 1394 which extend from the base 1396 of the slider member 1382. The limit of ejection travel of the slider member is determined by a stop lug 1398 which strikes a plinth 1400 which projects upwardly from the forward end of the sliding block 1384. The ejection spring system comprises a helical traction spring 1402 which extends between a stud 1404 provided on the end of the sliding block 1384 which is opposite to plinth 1400 and a stud 1408 which projects downwardly from the slider member. As may best be seen from FIG. 94, the spring 1402 passes around a pulley 1406, the axis of rotation of the pulley being positioned forwardly with respect to stud 1408. The pulley 1406 is mounted on a journal bearing 1410 which is also formed integrally with the sliding block 1384.

The arrangement of FIGS. 93–96 is particularly wellsuited to automated assembly. Thus, a pre-assembled unit of the sliding block and slider member may be manufactured and inserted into a housing in which the carrier members have previously been fitted.

Figures 97, 98, 99:
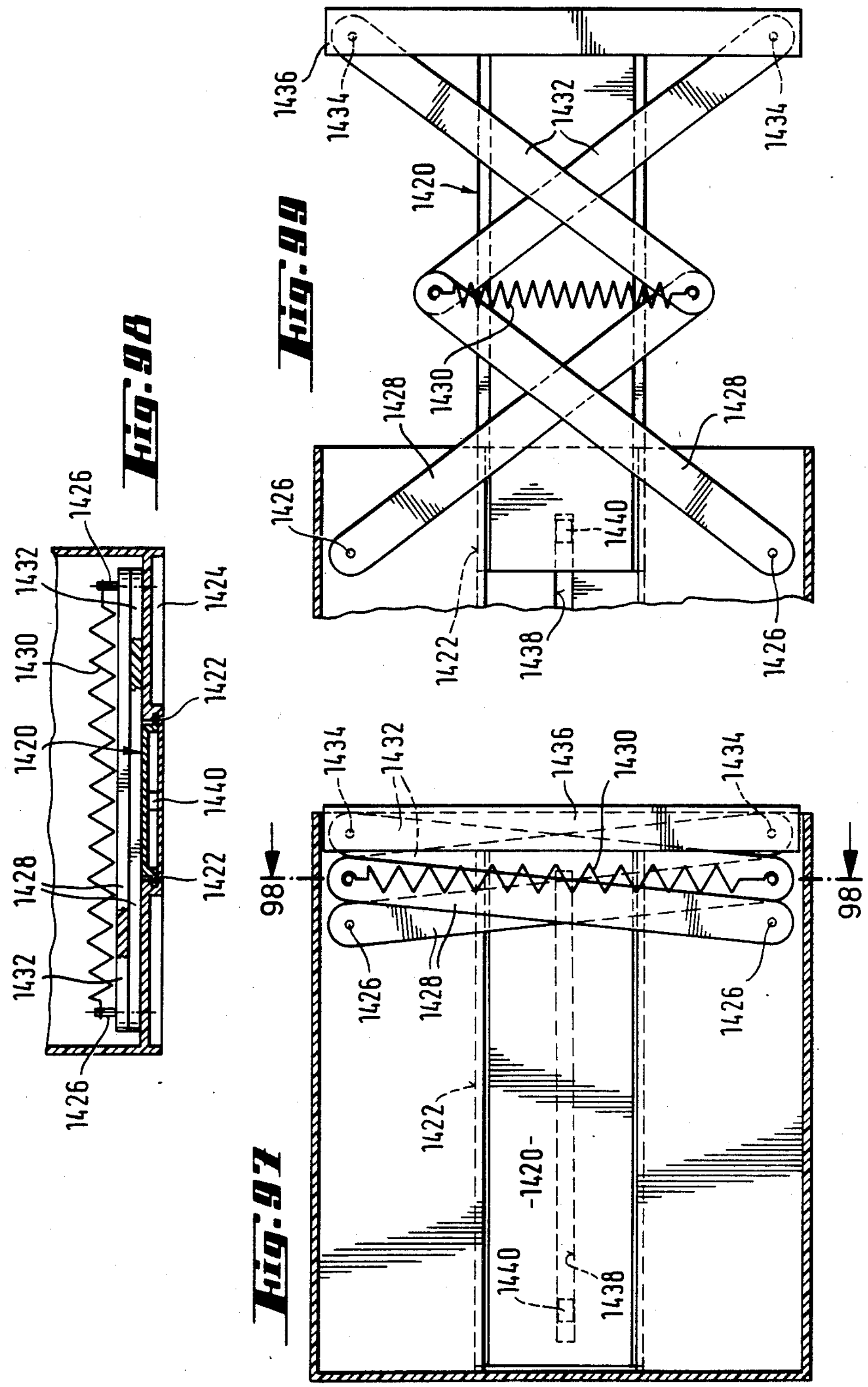
FIGS. 97–99 depict a scissor-type tensioning system which may be employed in the present invention.

FIGS. 97–99 show an embodiment of the invention wherein a scissors-type tensioning system is employed. In the embodiment of FIGS. 97–99 the slider member 1420 is guided longitudinally by means of a runner/rail arrangement 1422 in the housing floor 1424. Connecting bars 1428 are linked to the housing a indicated at 1426. The free ends of the connecting bars 1428 are pulled toward one another by means of a traction spring 1430. Further connecting bars 1432 extend from the ends of the connecting bars 1428 which are interconnected by spring 1432. The free ends of the connecting bars 1432 are coupled to the slider member front wall 1436 as indicated at 1434. The ejection travel is limited by the downwardly directed lug 1440 of the slider member which travels in a groove 1438 in the floor 1424 of the housing. The scissors-type mechanism of FIGS. 97–99 has the advantage of occupying very little vertical space and thus it may easily be positioned beneath the lowest disc carrier member in the stack which is received in the housing.

While preferred embodiments has been shown and described, various modifications and substitutions may be made thereto without departing from the spirit and scope of the invention. Accordingly, it is to be understood that the present invention has been described by way of illustration and not limitation.

What is claimed is:

1. Apparatus for use in the storage of recording media, the recording media having a plate-like form with a narrow width, said apparatus comprising:

housing means, said housing means defining a storage enclosure, said housing means having an enclosure access opening at one side thereof;

transporter means, said transporter means being supported from said housing means for movement relative thereto between an inserted position wherein said transporter means is located entirely within said housing means and an ejected position wherein said transporter means in part extends through said housing means access opening and is partly located outside of said housing means;

a plurality of holder means, said holder means receiving and supporting plate-like recording media, said holder means each being supported in said housing means for individual movement relative to said housing means and to the other of said holder means between a storage position wherein said holder means is located entirely within said housing means and a removal position wherein said holder means at least in part extends through said housing means access opening to enable removal of a plate-like recording media therefrom;

selector means mounted on said transporter means, said selector means selectively coupling at least one of said holder means to said transporter means whereby the selected holder means may be caused to move with said transporter means, movement of said transporter means from the inserted to the ejected position causing a selected holder means to move from the storage position toward the removal position;

means for resiliently biasing said transporter means and holder means toward the exterior of said housing means; and releasable locking means for holding said transporter means in the inserted position against the bias of said biasing means.

2. The apparatus of claim 1 wherein said housing means has a basically cuboid shape and the recording media lie in the housing means on said holder means with their major surfaces parallel to a side of the housing.

3. The apparatus of claim 2 wherein said holder means define a prescribed distance between the recording media associated with them.

4. The apparatus of claim 2 wherein said holder means are constructed to support the recording media in the areas where they are free of any recording.

5. The apparatus of claim 4 wherein said holder means have a trough-shaped support profile.

6. The apparatus of claim 4 wherein said holder means are so constructed that the recording media are held at a distance from a base surface by means of spacers and fit with an aperture on a hub.

7. The apparatus of claim 1 wherein said holder means are movable parallel to a major surface of the recording media.

8. The apparatus of claim 7 wherein said holder means are rotatable about an axis normal to the major surface of the recording medium.

9. The apparatus of claim 7 wherein said holder means are guided in the housing.

10. The apparatus of claim 7 wherein said holder means are guided in said transporter means.

11. The apparatus of claim 7 wherein said holder means can be moved out of said housing means to a position where the recording media can be removed from said holder means by lifting in a direction generally transverse to the direction of movement of said transporter means.

12. The apparatus of claim 11 wherein said holder means have cut-away portions to expose at least one point on the recording medium at which the latter can be grasped.

13. The apparatus of claim 12 wherein said holder means each have a pair of said cut-away portions situated opposite each other.

14. The apparatus of claim 7 wherein said holder means have cut-away portions to expose at least one point on the recording medium at which the latter can be grasped.

15. The apparatus of claim 1 wherein said transporter means comprises at least a first slider member supported in said housing means so that it can slide.

16. The apparatus of claim 1 wherein said transporter means is hinged to said housing means.

17. The apparatus of claim 16 wherein said transporter means has a front wall covering the open front side of said housing means.

18. The apparatus of claim 15 wherein said slider member has a front wall covering at least a portion of the open front side of said housing means with said transporter means in the inserted position.

19. The apparatus of claim 15 wherein said transporter means comprises a telescopic guiding arrangement.

20. The apparatus of claim 18 wherein said front wall is movably connected to guide members of the transporter means.

21. The apparatus of claim 20 wherein said front wall is hinged to the guide members.

22. The apparatus of claim 15 wherein said slider member, said housing means and said holder means are provided with interconnected control members, said control members causing the selected holder means to be automatically opened when the said selected holder means is transported out of said housing means by the slider member.

23. The apparatus of claim 1 wherein said selector means comprises at least one operating element which is accessible from the exterior of said housing means, said operating element being in registration with said access opening.

24. The apparatus of claim 23 wherein said operating element comprises a rotary knob.

25. The apparatus of claim 23 wherein said operating element comprises a sliding knob.

26. The apparatus of claim 24 wherein a locking position is provided for the knob for each of said carrier means.

27. The apparatus of claim 23 wherein each of said carrier means is provided with its own operating element.

28. The apparatus of claim 23 wherein said operating elements each comprise a push-button.

29. The apparatus of claim 7 wherein said selector means will couple the selected holder means to all of the holder means situated beneath the selected holder means in said housing means.

30. The apparatus of claim 29 wherein said selector means comprises a coupling member which mechanically couples said transporter means to the selected holder means.

31. The apparatus of claim 1 further comprising:

means establishing a frictional connection between said holder means and said housing means, the resilient bias of said biasing means being sufficient to overcome the frictional connection between a selected holder means and said housing means.

32. The apparatus of claim 31 wherein said selector means comprises:

a selector slider which is displaceably arranged in said transporter means.

33. The apparatus of claim 32 wherein said selector slider is resiliently biased toward the position where said selector means is not coupled to a holder means.

34. The apparatus of claim 33 wherein a common selector slider is associated with every two carrier means.

35. The apparatus of claim 7 wherein each of said holder means is provided with at least first prong means which engages a guide groove in an adjacent holder means, said prong means being pivotable about an axis which is transverse to the ejection direction of said holder means to define a guide funnel which faces in the direction of said access opening when the said holder means is in the removal position.

36. The apparatus of claim 7 wherein said transporter means includes a front wall which may be pivoted downwardly and wherein said selector means includes at least a first actuating member mounted in said transporter means front wall.

37. The apparatus of claim 36 further comprising means for resiliently biasing each of said holder means toward said transporter means.

38. The apparatus of claim 36 wherein said selector means comprises coupling members for mechanically connecting said transporter means to said holder means, said coupling members upon downward pivoting of said transporter means front wall placing said coupling members in a disconnected state.

39. The apparatus of claim 36 further comprising:

an indicator arrangement housed in said front wall.

40. The apparatus of claim 39 wherein said indicator arrangement comprises spring-biased feelers positioned to contact the edge of recording media positioned on said holder means, and wherein the travel of said transporter means between said inserted and ejected positions is greater than the travel of said holder means between said storage and removal positions.

41. The apparatus of claim 36 wherein said transporter means front wall is connected by way of pivot joints to the remainder of said transporter means, and wherein said transporter means further comprises a locking system for said front wall, said locking system being unlocked by means of the movement of said transporter means relative to said housing means.

42. The apparatus of claim 7 wherein said selector means includes at least a first actuating member supported from said housing means and wherein said transporter means includes a front wall, said transporter means front wall being pivotally connected to said transporter means whereby said front wall may be pivoted downwardly, said first actuating member being positioned beneath said transporter means front wall.

43. The apparatus of claim 36 wherein at least some of said holder means each further comprise a guide plate, said guide plates in part defining a funnel-like recording media insertion slot when said transporter means front wall has been pivoted downwardly and the associated holder means is in the removal position.

44. The apparatus of claim 7 wherein said transporter means has a front wall and further includes spring-biased stops for said holder means.

45. The apparatus of claim 24 wherein said transporter means includes a front wall, at least a first part of said front wall being movable relative to the remainder of said transporter means and a second part of said front wall, said rotary knob being mounted on said first relatively movable part of said transporter means front wall, and wherein said selector means further comprises means for transmitting movements of said rotary knob to said holder means to selectively couple said transporter means to said holder means, said movement transmitting means, being positioned in the said second part of said transporter means front wall, said rotary knob being disconnected from said movement transmitting means when said first front wall portion is moved relative to said second front wall portion.

46. The apparatus of claim 45 wherein said first part of said transporter means front wall comprises a part of said locking means.

47. The apparatus of claim 19 wherein said transporter means comprises an inner slider member and an outer slider member, the inner slider member being guided in said housing means and the outer slider member being guided on the inner slider member, said transporter means further comprising a compression spring arrangement for biasing said slider members apart into an extended position.

48. The apparatus of claim 47 wherein said resilient biasing means includes a second compression spring arrangement positioned between the interior of said housing means and the outer slider member.

49. The apparatus of claim 47 wherein said resilient biasing means comprises a second compression spring arrangement positioned between said housing means and said inner slider member.

50. The apparatus of claim 47 wherein said resilient biasing means comprises a second compression spring arrangement positioned between said housing means

UNITED STATES PATENT AND TRADEMARK OFFICE

CERTIFICATE OF CORRECTION

PATENT NO. : 4,647,117

DATED : March 3, 1987

INVENTOR(S) : Peter Ackeret

It is certified that error appears in the above-identified patent and that said Letters Patent is hereby corrected as shown below:

Claim 1, lines 10 and 21 (Column 27, lines 38 and 49) cancel "entirely".

Claim 34, line 1, change "33" to -- 32 --.

Signed and Sealed this

Twenty-ninth Day of March, 1988

Attest:

DONALD J. QUIGG

*Attesting Officer*

*Commissioner of Patents and Trademarks*